United States Patent
Ponomarev et al.

(10) Patent No.: US 10,735,598 B2
(45) Date of Patent: Aug. 4, 2020

(54) SYSTEM AND METHOD FOR PROVIDING VOICE COMMUNICATION BETWEEN SENDER USERS, RECIPIENT USERS AND EXTERNAL NETWORK ENTITIES

(71) Applicant: Echo SmartLab LLC., Santa Clara, CA (US)

(72) Inventors: Vladimir Dmitriyevich Ponomarev, Monte Sereno, CA (US); Dmitrii Maksimovich Ponomarev, La Colle (MC); Sergei Vladimirovich Drozhilkin, Zurich (CH); Nikolay Nikolayevich Mikhaylov, Vjazniki (RU)

(73) Assignee: Echo SmartLab LLC., Santa Clara, CA (US)

( * ) Notice: Subject to any disclaimer, the term of this patent is extended or adjusted under 35 U.S.C. 154(b) by 74 days.

(21) Appl. No.: 16/150,695

(22) Filed: Oct. 3, 2018

(65) Prior Publication Data

US 2020/0112639 A1   Apr. 9, 2020

(51) Int. Cl.
| | |
|---|---|
| *H04M 7/00* | (2006.01) |
| *G06F 21/32* | (2013.01) |
| *G06Q 30/02* | (2012.01) |
| *H04M 11/10* | (2006.01) |

(52) U.S. Cl.
CPC ....... *H04M 7/0066* (2013.01); *H04M 7/0075* (2013.01)

(58) Field of Classification Search
CPC .......... H04M 7/0066; H04M 7/0075
See application file for complete search history.

(56) References Cited

U.S. PATENT DOCUMENTS

| | | | |
|---|---|---|---|
| 6,035,217 A | 3/2000 | Kravitz | |
| 6,892,083 B2 | 5/2005 | Shostak | |
| 9,270,931 B2 | 2/2016 | Frankel et al. | |
| 2008/0256209 A1* | 10/2008 | Carro | H04M 11/10 709/206 |
| 2010/0124218 A1* | 5/2010 | Bredikhin | G06Q 30/0271 370/352 |
| 2018/0061402 A1 | 3/2018 | Devaraj et al. | |
| 2018/0068317 A1* | 3/2018 | Gilbey | G06F 21/32 |
| 2018/0124225 A1 | 5/2018 | Boesen et al. | |

* cited by examiner

*Primary Examiner* — Kiet Tang
(74) *Attorney, Agent, or Firm* — Fleit Intellectual Property Law; Jose Gutman

(57) ABSTRACT

A system and method for voice communication between sender users and recipient users, and the sender users and external network entities is provided. The system includes a plurality of voice communication domains interacting with each other and with network entities, and a cross-domain coordinator configured to coordinate interaction between the voice communication domains over Internet. Each voice communication domain includes a plurality of personal communication devices (PCDs) associated with the corresponding users, and a voice communication server deployed within the voice communication domain to control operation of the PCDs. Each PCD is controlled and operated by voice user commands provided verbally, and is configured to provide voice communication between a sender user and a recipient user within the same voice communication domain, between the users of different voice communication domains, and between the sender user and the external network entities.

36 Claims, 20 Drawing Sheets

SYSTEM AND METHOD FOR PROVIDING VOICE COMMUNICATION BETWEEN SENDER USERS, RECIPIENT USERS AND EXTERNAL NETWORK ENTITIES

FIELD OF THE INVENTION

This invention relates to the field of wireless communication, and in particular, to a system and method for operating wireless personal devices providing voice communication of users of the devices over communication networks.

BACKGROUND OF THE INVENTION

Wireless communication makes it possible to connect people everywhere. Today, wireless communication devices, such as mobile phones, have become almost indispensable for people on the road, at home and at work.

Majority of mobile phone users today use smartphones, which are rather sophisticated mobile phone devices that enable the users not only to place and receive phone calls and text messages, but they also provide features that are more advanced. In particular, modern mobile smartphones enable web browsing and allow running various software applications. Moreover, smartphones also offer capabilities such as support for biometrics, video chatting, digital assistance and much more. Many consumers use their smartphones to engage with friends, family and brands on social media. Most of social media platforms have mobile applications (apps), which make it easier for mobile phone users to post personal updates and photos. Smartphones can be associated with a home automation system in order to control lighting, climate, entertainment systems, and other appliances. It may also be used for home security to access control and alarm systems.

However, smartphones are not easy or simple to use for a large segment of population. For example, placing a call through a cellular communication device can still present a daunting task for young children, aged people, and especially for the physically and/or mentally disabled. This may be especially true for the children who do not yet recognize numbers on the dialing keypad or the functions of the buttons on a smartphone. Likewise, an aged person suffering from eye maladies may not be able to dial a number by sight.

The smartphone communication devices are rather expensive. Accordingly, the owner of such expensive item can face a problem that there is a relatively high probability of it being stolen. An operating system on the stolen device carrying identity of the owner can be replaced, and thus the stolen device can be used by the thief or by another user.

Another drawback of the current smartphone is the weight of the devices, since they use rather heavy batteries to provide power for several hours of continuous use. Current smartphone devices have relatively short periods of exploitation until the battery of the device requires recharging. Especially, the battery can drain rather fast when several apps are run on the device. As a result, the users need to purchase additional chargers for use outside the home, at work, and in cars.

Wireless communication is often required for use in various commercial and industrial businesses, deployed in a certain relatively small area, including hospitals, air and sea ports, marine communication on ships, etc. Usually, walkie-talkie devices operating on the same radio frequency are used for this purpose. Walkie-talkie devices provide voice communication of the users without dialing a call each time. However, functionality of these devices is limited to voice communication between specific users. These devices do not provide a large spectrum of applications available for the users of smartphones.

GENERAL DESCRIPTION OF THE INVENTION

There is a need in the art to provide a wireless personal communication device, method, and system providing a platform for communication, so that the personal communication devices could provide many features of sophisticated smartphone devices, but at the same time, they could be easily used by people of all ages, conditions, and technical experience.

It would be useful to have a miniature and convenient personal communication device that enables the user to communicate with other users and to access information services available online while being involved in some other activities. Thus, it would be beneficial to have a personal communication device which can be controlled and operated only by voice dialogues of the user with the device that would be interpreted by the personal communication device as instructions for particular actions.

These provisions could be most useful in the situations when the user's hands are busy and/or the user's visual attention is involved in certain activities, and therefore it would not be practical or even not possible for the user to hold the communicator device in hands during communication sessions and/or to perceive requested information visually by looking at the screen of the device.

It would also be advantageous if such a personal communication device would be relatively inexpensive and would have enhanced personal identification security features, so it would not represent a target for stealing and/or security breaking.

It would also be advantageous if such a personal communication device would have relatively small size and weight.

It would still be advantageous if such a personal communication device would be designed as a decorative item to be used as a pendant wearable over the user's neck or as a badge or pin attachable to a upper part of the user's garment by a clip or clamp.

It would also be beneficial to have a system that could provide a platform for operation of a plurality of the personal communication devices within a wireless local area network deployed in a predetermined area. For example, the voice communication between the users of the personal communication device can take place in an area of premises having a limited physical coverage by a local wireless network. In this case, the voice traffic can stay inside this area without travelling outside far away outdoors as it occurs in the case of the traditional cellular communication. This factor could increase security and privacy of the user voice communications.

It would also be beneficial to have a system that could provide a platform for voice communication between the personal communication devices deployed in different not overlapping areas which can be located far away from each other.

It still would also be beneficial to have a system that could provide a platform for voice communication between the personal communication devices, which can communicate with external network entities that represent people, organizations, other communication systems, computer systems, etc.

The present application partially eliminates limitations and inconveniences of conventional systems and methods for operating wireless personal devices. Thus, according to one general aspect, the present invention provides a novel voice communication system and method for providing voice communications between users, and voice communications of the users with at least one external network entity.

According to some embodiments of the present invention, the voice communication system includes a plurality of voice communication domains, which are interconnected and coordinated over an external global communication network, e.g., the global Internet, for interaction with each other and with one or more external network entities. The voice communication system also includes a cross-domain coordinator configured to coordinate interaction between the voice communication domains over the external global communication network.

According to some embodiments of the present invention, the coordination of interaction between the voice communication domains is achieved by exchanging cross-domain coordination signals between cross-domain coordinator and the voice communication domains, and by exchanging cross-domain communication control signals between the voice communication domains. The cross-domain coordination signals may include domain registration signals, user registration signals, and user discovery signals.

The cross-domain coordinator can, for example, be implemented as a cloud based service. Alternatively, the cross-domain coordinator can be implemented on the basis of a stand-alone computer system having a combination of a dedicated hardware and software.

The cross-domain coordination signals and the cross-domain communication control signals can, for example, be implemented as information messages carrying a specific cross-domain coordination protocol data.

According to some embodiments of the present invention, the functionality of the voice communication domains within the voice communication system can be expanded by providing interaction of the voice communication domains with various external network entities. Each voice communication domain can be expanded differently than other domains. For the purpose of the present application, the term "external network entity" refers to an external source and/or a recipient of communication signals from the voice communication domains. The network entities is an external system environment of the voice communication domains which can, generally, represent people, organizations, and services using various communication platforms, computer systems, other interface apparatuses, and other communication and/or control systems that can communicate with the voice communication domains. The network entities can be implemented through any suitable combinations of hardware, software, and/or firmware; and include computing devices that can be integrated with the corresponding voice communication domain by means of a suitable gateway system.

According to one embodiment of the present invention, the external network entity can be deployed as a "cloud-based" system communicating with the system of the present invention over the Internet. For example, network entities can be associated with existing cloud based voice interaction information systems, e.g. smart voice assistants such as Apple Ski, Microsoft Cortana, Google Voice Assistant, Amazon Alexa, IBM Watson, etc.

According to another embodiment, the external network entity can be implemented on the basis of a stand-alone computer system communicating with the system of the present invention over a local area communication network and/or the Internet.

According to an embodiment of the present invention, interaction of the gateway systems with the corresponding voice communication domain may be provided through an open interface of the voice communication domain. The open interface can include a protocol that allows the voice communication domain to access a functionality of external network entities through the corresponding gateway systems. The gateway systems can act as proxy in interaction between the voice communication domains and the corresponding external network entities.

According to another embodiment of the present invention the open interface can allow external systems to access a functionality of the corresponding voice communication domain. According to this embodiment, the open interface allows third-party developers to integrate external systems that can provide communication applications, control applications, information applications, etc, with the communication system.

According to some embodiments of the present invention, each voice communication domain includes a plurality of personal communication devices (PCD) associated with corresponding users for the voice communication therebetween, and a voice communication server (VCS) deployed within this voice communication domain. Each voice communication domain has a corresponding unique domain identifier (ID), and configured (i) to provide voice communication between the users associated with the voice communication domain over a local area communication network, (ii) to provide voice communication between the users of different domains over the external global communication network (e.g. Internet), and (iii) to interact with one or more external network entities coupled to the voice communication domain.

According to some embodiment of the present invention, the voice communication domains can be associated with certain premises deployed in a predetermined area, and be related to certain businesses or households.

According to an embodiment, at least some of the voice communication domains configured to operate for their own predetermined application, which may have a purpose different from the purposes of other voice communication domains. In particular, different voice communication domains may provide communication platforms for the users participating in different types of business or households. Likewise, the voice communication domains can differ from each other by variety of the external network entities that can be integrated with the voice communication domains.

According to some embodiments of the present invention, the system is configured to provide voice communication (i) between the users of the PCDs associated with the same voice communication domain over the local area communication network, (ii) between the users of the PCDs associated with different voice communication domains over the Internet, and/or (iii) between the users of the PCDs and one or more external network entities coupled to the corresponding voice communication domains over the local area communication network and/or the external global communication network (e.g., Internet).

According to some embodiments of the present invention, each personal communication device can be controlled and operated by voice user commands provided verbally that would be interpreted by the personal communication device as instructions for particular actions. The instructions may, for example, be directed for providing voice messages and/or voice calls between the users of the PCDs. The instructions may also be directed to provide access of the user to the network entities that may include cloud based voice interaction information systems, e.g. smart voice assistants such as Apple Siri, Microsoft Cortana, Google Voice Assistant, Amazon Alexa, IBM Watson, etc.

According to some embodiments, in the transmitting operation mode, each PCD is configured to receive audio signals including voice signals produced by the user and other audio signals originated from environment surrounding the user, to process these audio signals, in order to separate the voice signals from collateral noise and echo signals, and to generate corresponding encoded voice information signals of the user of the device. According to some embodiments, the user voice signals include voice command signals of the user that correspond to user commands provided verbally, and voice communication signals of the user provided verbally that correspond to a user voice communication (i.e., a user utterance) during a call session or to a user voice message. Such voice communication signals include voice call communication signals and voice message communication signals.

In operation, a sender PCD transmits the encoded voice information signals to the voice communication server of its voice communication domain over the local area communication network to provide: (i) voice communication of a certain PCD with one or more other PCDs of the same voice communication domain via the voice communication server, (ii) voice communication between the PCDs associated with different domains via the corresponding voice communication servers of these domains, and/or (iii) voice communication between the sender PCDs and one or more network entities.

It should be noted that the main part of the functionality of the system, which deals with the voice communications between the users and/or external entities, is implemented at the voice communication server, rather than at the PCDs themselves. According to the present invention, the PCDs include only a minimum of the functionality, which is only necessary for exchanging of sound voice signals with the corresponding user, and transferring the encoded voice information signals indicative of the sound voice signals to the corresponding voice communication server(s).

Such a technical approach for construction of the voice communication system, allows for constructing the personal communication devices to be relatively simple, cost-effective, small and lightweight. For example, the personal communication device of the present invention can be designed as a wearable item that can be attached to an upper part of the user's garment by a clip or clamp. Likewise, the personal communication device can be designed as a pendant wearable over the user's neck on a chain or a cord. It should be understood that other designs of the personal communication device are also contemplated.

The technical approach of the present invention provides for comfortable wearing and usage of the personal communication devices, and thus provides an essential advantage in practical use of such communication devices in comparison to smartphones and other smart devices known from the art.

According to some embodiments, in the receiving operation mode, each PCD is configured to receive and process encoded voice information signals from the voice communication server. Such information signals can be originated from other personal communication devices associated with the same voice communication domain, from the personal communication devices associated with other domains, and from one or more external network entities. The encoded voice information signals received by the PCD are transferred over the local area communication network corresponding to the voice communication domain via the voice communication server.

According to some embodiments, the voice communication server (VCS) associated with the corresponding voice communication domain is configured to control operation of the PCDs associated with this voice communication domain. The control is carried out by using a PCD control protocol operating by exchange of PCD control protocol signals between said plurality of personal communication devices and voice communication server within the same domain.

According to some embodiments, the voice communication server (VCS) of the voice communication domain is configured to receive the encoded voice information signals originated from the personal communication devices (PCD) and separate them into encoded voice command signals and encoded voice communication signals.

In operation, the VCS processes the encoded voice command signals received from a sender PCD in order to recognize the corresponding user voice commands carried by the encoded voice command signals. Then, the VCS executes the user voice commands. The executing of the user voice commands by the VCS can include generating control instructions of several types, in accordance with the user voice commands, and relaying the generated control instructions to the corresponding internal components which are responsible for execution of the corresponding control instructions.

According to some embodiments, the types of the control instructions can include PCD control instructions, which are aimed at providing control and coordination of the PCDs in the corresponding voice communication domain. The types of the control instructions can also include voice call establishment instructions, which are aimed at providing voice call communications between the users within the voice communication system and with the external entities. The types of the control instructions can also include voice message dispatching instructions, which are aimed at providing exchange of voice messages between the users within the voice communication system and with the external entities.

Specifically, in order to execute the PCD control instructions, the VCS generates corresponding control request signals according to the PCD control protocol and transmits the control request signals to the sender PCD (which was the sender of the corresponding user voice commands) over the local area communication network. The sender PCD receives these control request signals, processes them in accordance with the PCD control protocol, and executes control requests carried in these control request signals.

According to some embodiments, the sender PCD can also generate control feedback signals and transmit the control feedback signals back to the voice communication server. The VCS can receive the control feedback signals from the sender PCD and process them.

In order to execute the voice call establishment instructions, the VCS establishes a voice call between the users of the system. The establishment of the voice call depends on a current location of a recipient user of the voice call. Specifically, when the recipient user is located in the voice communication domain of the sender user, the voice call is a local voice call. In case when the recipient user is located in a different voice communication domain, the voice call is a cross-domain voice call. The recipient user may also be a user of a communication system of the external network entity.

In order to execute the voice message dispatching instructions, the VCS dispatches a corresponding voice message depending on the current location of the recipient user.

During the execution of the user voice commands, the VCS forwards the encoded voice communication signals to a recipient system. According to one embodiment, the recipient system can be a recipient PCD of the same voice communication domain that is common to the sender PCD and the recipient PCD. According to another embodiment, the recipient system is a VCS of another voice communication domain. According to yet an embodiment, the recipient system is the gateway system of the external network entity.

According to some embodiments of the present invention, the VCS of the voice communication domain is also configured to coordinate interaction of this voice communication domain with other voice communication domains of the voice communication system. Such coordination is carried out by the VSC in cooperation with the cross-domain coordinator and with the VCSs of other voice communication domains by employing a cross-domain coordination protocol and a cross-domain communication control protocol accordingly. The cross-domain coordination protocol operates by exchanging cross-domain coordination signals between the cross-domain coordinator and the VCS of the voice communication domain. The cross-domain communication control protocol operates by exchanging cross-domain communication control signals between the VCS of the voice communication domain and the VCSs of other voice communication domains.

According to some embodiments of the present invention, the voice communication server (VCS) is configured to register new users joining the voice communication domain and their corresponding PCDs.

According to some embodiments of the present invention, the voice communication server (VCS) of the voice communication domain is also configured to control interaction of the voice communication domain with one or more external networked entities. The control is carried out by exchanging corresponding entity information signals with the external networked entities over the local area communication network and/or over the Internet. The entity information signals can include entity coordination signals.

According to another general aspect of the present invention, there is provided a method for providing voice communication between sender users and recipient users and/or between the sender users and one or more network entities. The method includes configuring the voice communication system described above.

According to some embodiments of the present invention, the configuring of the voice communication system includes configuring the cross-domain coordinator and the plurality of the voice communication domains. The configuring of the cross-domain coordinator is performed in order to coordinate interaction between the voice communication domains over the Internet. The configuring of the plurality of the voice communication domains is performed in order to provide interaction of the domains with each other and with the cross-domain coordinator.

According to some embodiments of the present invention, the method for providing the voice communication also includes activating a sender personal communication device (sender PCD) of the voice communication domain by a sender user. After activation, the sender PCD of the sender user generates encoded voice information signals. The encoded voice information signals can include encoded voice command signals carrying user voice commands of the sender user and encoded voice communication signals carrying user voice communications of the sender user.

According to some embodiments of the present invention, the method for providing the voice communication also includes transmitting the encoded voice information signals from the sender PCD to the voice communication server of this voice communication domain. The voice communication server of the voice communication domain receives the encoded voice information signals, and separates the received encoded voice information signals into the encoded voice command signals and the encoded voice communication signals. Then, the voice communication server processes the encoded voice command signals in order to extract information carried by the encoded voice command signals about the user voice commands, and executes the user voice commands.

The actions during the execution of the voice commands by the voice communication server can depend on the voice commands of the sender user and on a current location of a recipient user. In particular, the recipient user can be located within the same voice communication domain as the sender user, or within another domain.

For example, the execution can include one or more such actions as: controlling functionality of the sender PCD, providing voice communications between the sender user and the recipient user of the same voice communication domain, providing voice communications between the sender user of the sender domain and the recipient user of the recipient domain, and providing voice interaction between the sender user of a sender domain and the external network entities.

According to some embodiments of the present invention, the providing of the voice communications between the sender user and the recipient user of the same voice communication domain, includes at least one of the following actions: (i) establishing a local voice call between the sender PCD and at least one recipient PCD, (ii) terminating the local voice call between the PCDs, and local dispatching a local voice message from the sender PCD to said at least one recipient PCD.

According to some embodiments of the present invention, the providing of the voice communications between the sender user of the sender domain and the recipient user of the recipient domain includes at least one of the following procedures: (i) establishing a cross-domain voice call between the sender PCD of the sender domain and at least one recipient PCD of the recipient domain, (ii) terminating the cross-domain voice call between the PCDs of different domains, and (iii) cross-domain dispatching a cross-domain voice message from the sender PCD of said sender domain and said at least one recipient PCD of the recipient domain.

Provided below are several examples of additional applications of the communication system of the present invention that can leverage the technology of the present invention. Specifically, the system of the present invention can be used in control of smart home systems. Moreover, the system of the present invention can be used to apply for access of the personal communication devices to smart voice assistants, such as Apple Ski, Amazon Alexa, Microsoft Cortana, etc. Furthermore, the system of the present invention can be used to provide voice communication between the users of the personal communication devices of the system of the present invention with users of external communication systems, such as PSTN (public switched telephone network) systems, cellular communication systems, satellite communication systems, etc. Moreover, the system of the present invention can be used to provide communication of the users of the personal communication devices of the system of the present invention with users of various social network services that operate via websites and mobile apps.

There has thus been outlined, rather broadly, the more important features of the invention in order that the detailed description thereof that follows hereinafter may be better understood. Additional details and advantages of the invention will be set forth in the detailed description, and in part will be appreciated from the description, or may be learned by practice of the invention.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

LIST OF REFERENCE NUMERALS

Figure 1:
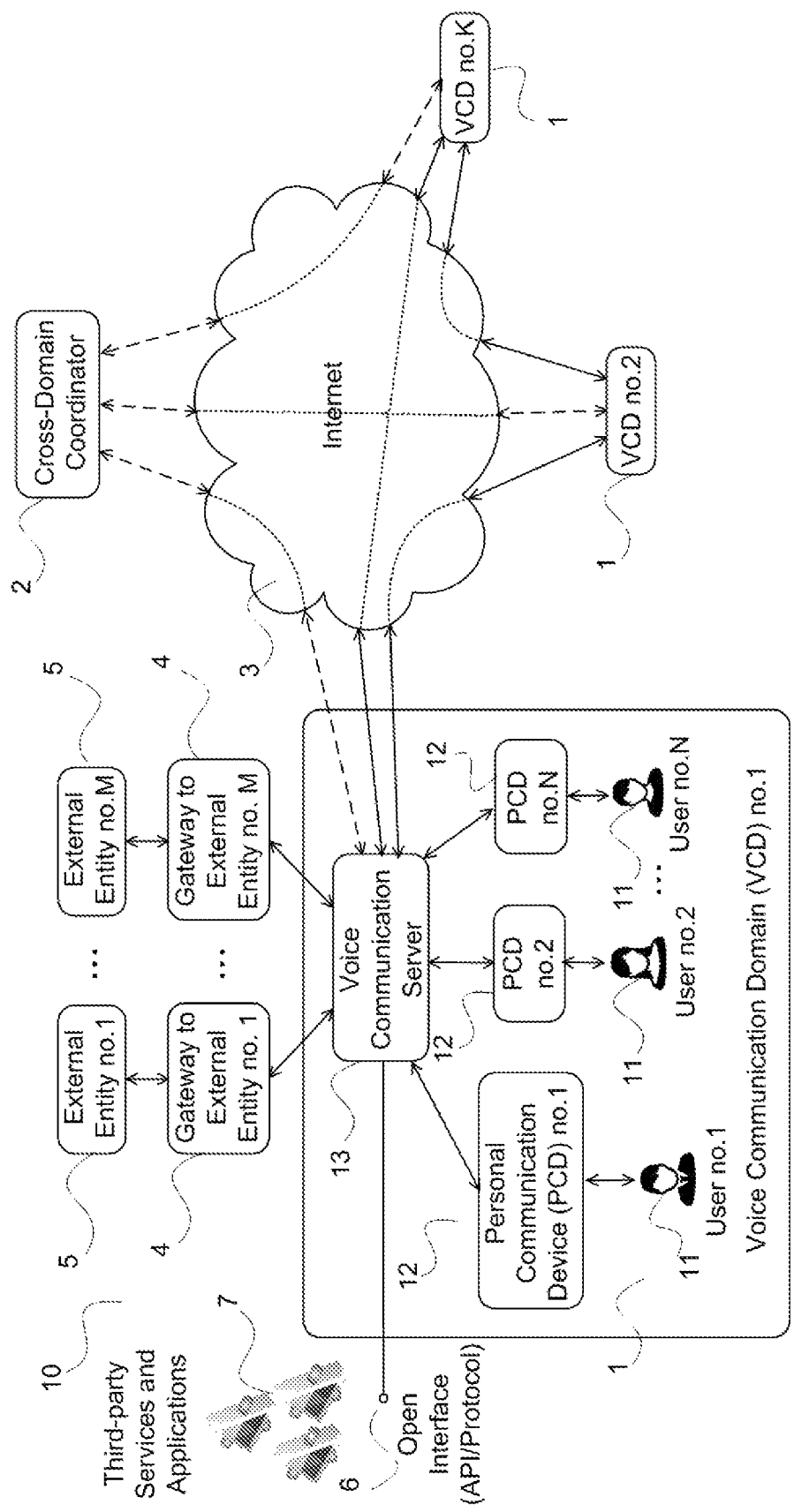
FIG. 1 illustrates a general schematic block diagram of a system for providing communication of users between each other and with one or more external entities, according to an embodiment of the present invention.

1—Voice communication domain
2—Cross-domain coordinator
3—Internet
4—Gateway to an external network entity
5—External network entity
6—Open Interface
7—Third-party services and applications
8—Local area communication network
10—Voice communication system
11—User
12—Personal communication device
13—Voice communication server 21—Network connector of cross-domain coordinator
22—IP network communicator of cross-domain coordinator
23—Cross-domain coordination protocol handler
24—System registrator
25—Central registry
26—Discovery engine
80—Network infrastructure of a local area communication network
81—Wired segment of a local area communication network
82—Wireless access point
83—Internet gateway
84—Wired links
85—Wireless segment of a local area communication network
86—Wireless links
121—Housing
122—Control button
123—Opening for acoustic access to the microphone(s)
124—Opening for acoustic access to the speaker(s)
125—Clip for attaching the personal communication device 12 to the user's garment
126—Chain or cord for wearing the personal communication device 12
1201—Manual trigger
1202—Microphone subsystem
1203—Speaker subsystem
1204—Audio signals processing device
1205—IP network communicator of personal communication device
1206—Wireless network connector
1207—Voice activation trigger
1208—Device function controller
1209—PCD control protocol handler
1210—Local configuration manager
1211—Local configuration storage
1301—Network connector of voice communication server
1302—IP network communicator of voice communication server
1303—Voice command recognizer
1304—VCS central controller
1305—Audio feedback generator
1306—Voice message dispatcher
1307—PCD controller
1308—Call traffic dispatcher
1309—Call session controller
1310—Voice communication domain registry
1311—Cross-domain communicator
1312—External interface handler

DETAILED DESCRIPTION OF EMBODIMENTS

The principles and operation of the system and method for providing voice communication between users, and voice communication of the users with at least one external network entity, according to the present invention may be better understood with reference to the drawings and the accompanying description, it being understood that these drawings and examples in the description are given for illustrative purposes only and are not meant to be limiting. Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

System, device and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

The same reference numerals and alphabetic characters will be utilized for identifying those components which are common in the system for providing voice communication and its components shown in the drawings throughout the present description of the invention. It should be noted that the blocks in the drawings illustrating various embodiments of the present invention are intended as functional entities only, such that the functional relationships between the entities are shown, rather than any physical connections and/or physical relationships.

Some portions of the detailed descriptions, which follow hereinbelow, are presented in terms of algorithms and/or symbolic representations of operations on data represented as physical quantities within registers and memories of a computer system. An algorithm is here conceived to be a sequence of steps requiring physical manipulations of physical quantities and leading to a desired result. Usually, although not necessarily, these quantities take the form of electrical or magnetic signals capable of being stored, transferred, combined, compared, and otherwise manipulated. In the present description, these signals can be referred to as values, elements, symbols, terms, numbers, or the like.

Referring to FIG. 1, a general schematic block diagram of a voice communication system 10 for providing voice communication between users 11, and voice communication between the users 11 with at least one external network entity 5 is illustrated, according to one embodiment of the present invention. The voice communication system 10 includes a plurality of voice communication domains 1, which are interconnected and coordinated over an external global communication network 3, e.g., the Internet, for interaction with each other and with one or more external network entities 5, and a cross-domain coordinator 2 configured to coordinate interaction between the voice communication domains 1 over the external global communication network 3.

The coordination of interaction between the voice communication domains 1 is achieved by exchanging cross-domain coordination signals between cross-domain coordinator and the voice communication domains 1 and by exchanging cross-domain communication control signals between the voice communication domains 1. According to some embodiments of the present invention, the cross-domain coordination signals may include domain registration signals, user registration signals, and user discovery signals.

The cross-domain coordinator 2 can, for example, be implemented as a cloud based service. Alternatively, the cross-domain coordinator can be implemented on the basis of a stand-alone computer system having a combination of a dedicated hardware and software.

The cross-domain coordination signals and the cross-domain communication control signals can, for example, be implemented as information messages carrying a specific cross-domain coordination protocol data. The data can be represented, for example, by using a known standard data format, such as JSON (JavaScript Object Notation), XML (Extensible Markup Language), CSV (Comma-Separated Values), etc. The exchanging of the cross-domain coordination signals can be implemented, for example, in accordance with a REST (Representational State Transfer) architectural style, a SOAP based web services technology, etc.

For the purpose of the present application, the term "external network entity" refers to an external source and/or a recipient of communication signals from the voice communication domains 1. The network entities 5 is an external system environment of the voice communication domains 1 which can, generally, represent people, organizations, and services using various communication platforms, computer systems, other interface apparatuses, and other communication and/or control systems that can communicate with the voice communication domains 1.

According to one embodiment of the present invention, the external network entity can be deployed as a "cloud-based" system communicating with the system of the present invention over the Internet. For example, network entities 5 can be associated with existing cloud based voice interaction information systems, e.g. smart voice assistants such as Apple Ski, Microsoft Cortana, Google Voice Assistant, Amazon Alexa, IBM Watson, etc.

According to another embodiment, the external network entity can be implemented on the basis of a stand-alone computer system communicating with the system of the present invention over a local area communication network (not shown in FIG. 1) and/or the external global communication network (e.g., Internet) 3.

The network entities 5 can be implemented through any suitable combinations of hardware, software, and/or firmware; and include computing devices that can be integrated with the corresponding voice communication domains by means of gateway systems 4. The network entities 5 may, for example, be implemented as servers that are configured to operate data tools, and to permit access to the information stored in various databases. The network entities 5 may, for example, include personal computers and/or workstations. When desired, one or more network entities 5 may be associated with suitable handheld devices, such as mobile communication systems, home control devices or any other systems that are capable of operating over the local area communication network or the global Internet.

According to an embodiment of the present invention, interaction of the gateway system 4 with the corresponding voice communication domain 1 may be provided through an open interface 6 of the voice communication domain 1. The open interface 6 can include a protocol that allows external systems to access a functionality of the corresponding voice communication domain 1. The open interface 6 allows third-party developers to integrate external systems that can provide communication applications, control applications, information applications, and other applications with the communication system 10.

According to some embodiments of the present invention, each voice communication domain 1 includes a plurality of personal communication devices (PCD) 12 associated with corresponding users 11 for the voice communication therebetween, and a voice communication server (VCS) 13 deployed within this voice communication domain 1. Each voice communication domain 1 has a corresponding unique domain identifier (ID), and configured (i) to provide voice communication between the users associated with the same voice communication domain over the local area communication network (not shown), (ii) to provide voice communications between the users of different domains over the external global communication network (e.g., Internet), and (iii) to interact with one or more external network entities.

According to an embodiment, the voice communication domains 1 can be associated with certain premises deployed in a predetermined area and be related to certain businesses or households. According to an embodiment, at least some of the voice communication domains 1 are configured to operate for their own predetermined application which may have a purpose different from the purposes of other voice communication domains. In particular, different voice communication domains 1 may provide communication platforms for the users participating in different types of business or households. In particular, the voice communication domains 1 can differ from each other by variety of the external network entities that can be associated with the corresponding voice communication domains 1.

According to some embodiments, the system 10 is configured to provide voice communication (i) between the users of the PCDs 12 associated with the same voice communication domain 1 over the local area communication network, (ii) between the users of the PCDs 12 associated with different voice communication domains 1 over the Internet, and/or (ii) between the users of the PCDs 12 and one or more external network entities 5 coupled to the corresponding domains 1 over the local area communication network or the Internet.

According to some embodiments, each user 11 of the corresponding personal communication devices (PCD) 12 is associated with a corresponding user information that includes one or more user identification parameters. Examples of the user identification parameters include, but are not limited to, at least one user name, a unique user identifier (ID), a user phone number, a user electronic mail address, one or more user biometric parameters, etc. The user name may be either a real user name or a user alias.

According to some embodiments of the present invention, each personal communication device can be controlled and operated only by voice dialogues of the user with the device that would be interpreted by the personal communication device as instructions for particular actions. The instructions may, for example, be directed to provide voice messages and/or voice calls between the users of the PCDs 12. The instructions may also be directed to provide access of the users 11 to the network entities 5.

According to some embodiments, in the transmitting operation mode, each PCD 12 is configured to receive audio signals produced by the user and environment surrounding the user, to process these audio signals, and generate corresponding encoded voice information signals of the user of the device. The audio signals produced by the user and the environment surrounding the user may include user voice signals generated by the user of the PCD 12 and other sound signals corresponding to a collateral sound noise originated from the environment and sound echo signals. According to some embodiments, the user voice signals include voice command signals of the user that correspond to user commands provided verbally, and voice communication signals of the user provided verbally that correspond to a user voice communication (i.e., a user utterance) during a call session.

Such voice communication signals can include voice call communication signals and voice message communication signals.

In operation, a sender PCD 12 transmits the encoded voice information signals to the voice communication server 13 of its voice communication domain 1 over the local area communication network to provide: (i) voice communication of a certain PCD 12 with one or more other PCDs 12 of the same voice communication domain 1 via the voice communication server 13, (ii) voice communication between the PCDs 12 associated with different domains 1 via the corresponding voice communication servers 13 of these domains, and/or (iii) voice communication between the sender PCDs 12 and one or more network entities 5 coupled to the corresponding voice communication domains 1.

It should be noted that the PCDs 12 do not communicate directly with each other, but rather exchange the encoded voice information signals only via the corresponding voice communication server(s) 13. As is shown herein below, the main functionality of the system 10, which deals with the voice communications between the users and/or external entities, is implemented at the voice communication server 13, rather than at the PCDs themselves. According to the present invention, the PCDs include only a minimum of the functionality, which is only necessary for exchanging of sound voice signals with the corresponding user, and transferring the encoded voice information signals indicative of the sound voice signals to the corresponding voice communication server(s) 13.

Figure 2A:
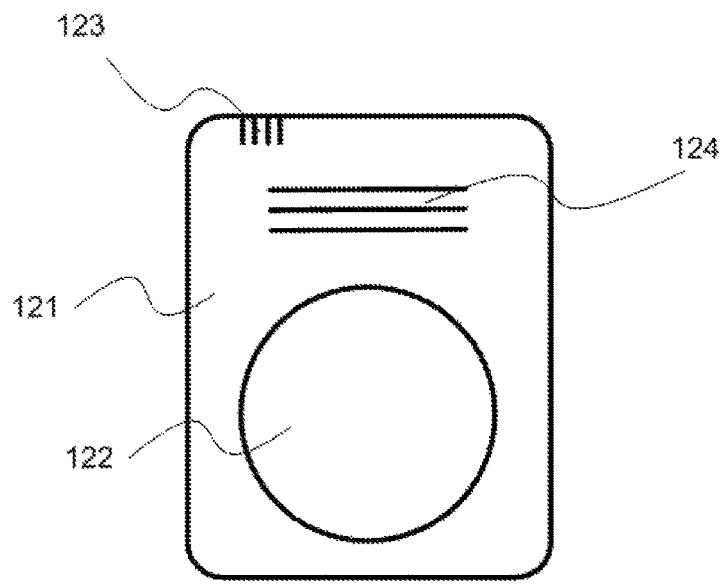
FIGS. 2A and 2B illustrate front and side external views, correspondingly, of a personal communication device, according to one example of design of the present invention.
Figure 2B:
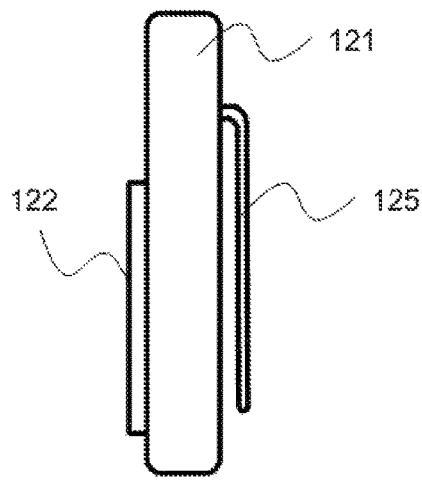
Figure 2C:
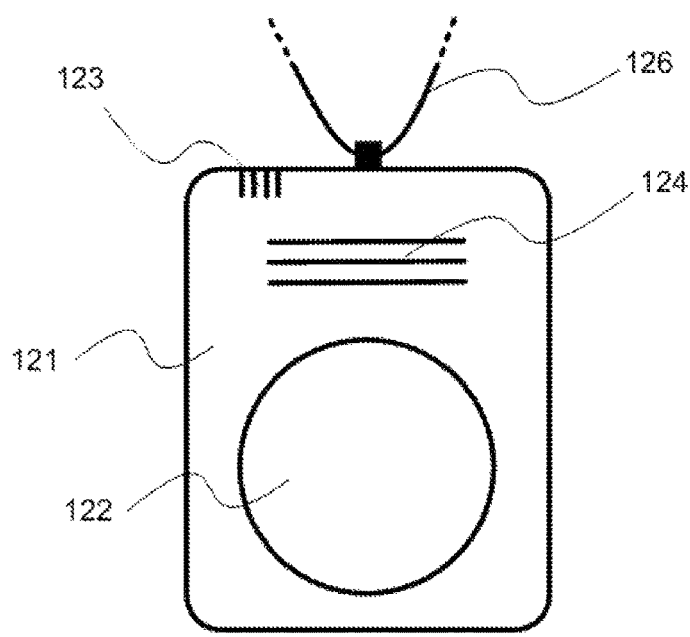
FIGS. 2C and 2D illustrate front and side external views, correspondingly, of a personal communication device, according to another design example of the present invention.
Figure 2D:
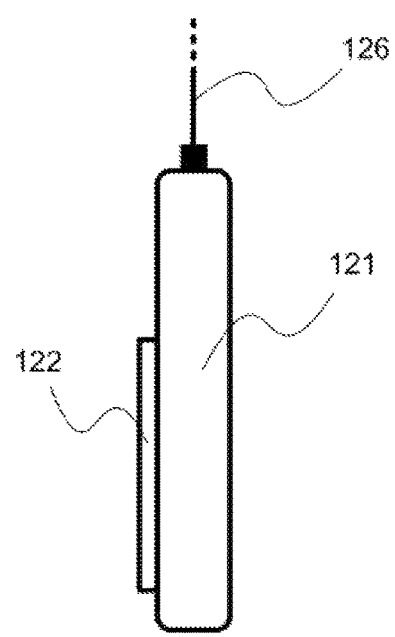

Such a technical approach for construction of the voice communication system 10, allows for constructing the personal communication devices 12 to be relatively simple, cost-effective, small and lightweight. FIGS. 2A and 2B illustrate correspondingly front and side external views of a personal communication device 12, according to one example of the present invention. FIGS. 2C and 2D illustrate correspondingly front and side external views of a personal communication device 12, according to another example of the present invention. As shown in FIGS. 2A through 2D, the personal communication device 12 includes a housing 121 that feature a control button 122 that allows the user to manually interact with the personal communication device 12, as will be described herein below. The housing 21 features on openings 123 and 124 that provide acoustic access to microphone(s) and speaker(s) of the personal communication devices 12, correspondingly.

In the example shown in FIGS. 2A and 2B, the personal communication device 12 is designed as a wearable item that can attached to an upper part of the user's garment by a clip or clamp 125. Likewise, in the example shown in FIGS. 2C and 2D, the personal communication device 12 is designed as a pendant wearable over the user's neck on a chain 126. It should be understood that other designs of the personal communication device 12 are also contemplated.

The technical approach of the present invention provides for comfortable wearing and usage of personal communication devices 12, and thus provides an essential advantage in practical use of such communication devices in comparison to smartphones and other smart devices known from the art.

Turning back to FIG. 1, according to some embodiments, in the receiving operation mode, each PCD 12 is configured to receive and process encoded voice information signals from the voice communication server 13. Such information signals can be originated from other personal communication devices associated with the same voice communication domain 1, from the personal communication devices associated with other domains 1, and from one or more external network entities 5. The encoded voice information signals received by the PCD 12 are transferred over the local area communication network corresponding to the voice communication domain 1 via the voice communication server 13.

According to some embodiments, the voice communication server (VCS) 13 associated with the voice communication domain 1 is configured to control operation of the PCDs 12 associated with this voice communication domain 1. The control is carried out by using a PCD control protocol operating by exchange of PCD control protocol signals between the PCDs 12 and the VCS 13 within the same domain 1.

The PCD control protocol signals can, for example, be implemented as information messages carrying information data represented using a known standard data format, such as JSON (JavaScript Object Notation), XML (Extensible Markup Language), CSV (Comma-Separated Values), etc. The exchange of PCD control protocol signals can be implemented, for example, in accordance with a REST (Representational State Transfer) architectural style, a SOAP (Simple Object Access Protocol) based web services technology, or any other suitable technology, etc.

According to some embodiments, the voice communication server (VCS) 13 of the voice communication domain 1 is configured to receive the encoded voice information signals originated from the personal communication devices (PCD) 12 and separate them into encoded voice command signals and encoded voice communication signals.

In operation, the VCS 13 processes the encoded voice command signals received from a sender PCD in order to recognize the corresponding user voice commands carried by the encoded voice command signals. Then, the VCS 13 executes the user voice commands.

The executing of the user voice commands by the VCS 13 includes generating control instructions of several types, in accordance with the user voice commands. Then the generated control instructions are relayed to corresponding internal components (not shown) for execution. Each of the internal components is responsible for executing of control instructions of a particular type.

According to some embodiments, the types of the control instructions can include PCD control instructions, which are aimed at providing control and coordination of the PCDs 12 in the corresponding voice communication domain 1. The types of the control instructions can also include voice call establishment instructions, which are aimed at providing voice call communications between the users 11 within the voice communication system 10 and with the external entities 5. The types of the control instructions can also include voice message dispatching instructions, which are aimed at providing exchange of voice messages between the users 11 within the voice communication system 10 and with the external entities 5. A configuration and operation of the VCS 13 is described hereinbelow in more details.

Examples of the PCD control instructions include, but are not limited to, instructions to turn up or down the volume level of the sound provided to the users 11 by PCDs 12; instructions to switch between the supporting operating modes of the PCDs, such as a switch from an active mode, to a silent mode of operation, or a switch from the silent mode back to the active mode of operation, etc.

An example of the voice call establishment instructions includes, but is not limited to, instructions to establish a voice call between a sender user (e.g. the user No. 1 in FIG.

1), who was the initiator of the corresponding voice command and a recipient user (e.g., the user No. 2 in FIG. 1), where the recipient user's name or alias, is provided by the sender user in the corresponding voice command.

An example of the voice message dispatching instructions includes, but is not limited to, instructions to dispatch a voice message from a sender user, who was the initiator of the corresponding voice command, to the recipient user, where the recipient user's name or alias, provided by the sender user in the corresponding voice command.

Specifically, in order to execute the PCD control instructions, the VCS 13 generates corresponding control request signals according to the PCD control protocol and transmits the control request signals to the sender PCD (which was the sender of the corresponding user voice commands) over the local area communication network.

As is described hereinbelow in detail, the sender PCD 12 receives these control request signals, processes them in accordance with the PCD control protocol, executes control requests carried in these control request signals.

According to some embodiments, the sender PCD 12 can also generate control feedback signals and transmit the control feedback signals back to the VCS 13. The VCS 13 can receive the control feedback signals from the sender PCD and process them.

In order to execute the voice call establishment instructions, the VCS 13 establishes a voice call between the users of the system. The establishment of the voice call depends on a current location of the recipient user of the voice call. Specifically, when the recipient user is located in the voice communication domain of the sender user, the voice call is a local voice call. In case when the recipient user is located in a different voice communication domain, the voice call is a cross-domain voice call. The recipient user may also be a user of a communication system of the external network entity.

In order to execute the voice message dispatching instructions, the VCS 13 dispatches a corresponding voice message depending on the current location of the recipient user.

During the execution of the user voice commands, the VCS 13 forwards the encoded voice communication signals to a recipient system. According to one embodiment, the recipient system can be a recipient PCD 12 of the same voice communication domain 1 that is common to the sender PCD and the recipient PCD. According to another embodiment, the recipient system is a VCS 13 of another voice communication domain. According to yet an embodiment, the recipient system is the gateway system (not shown) of the external network entity 5.

According to some embodiments of the present invention, the VCS 13 of the voice communication domain 1 is also configured to coordinate interaction of this voice communication domain 1 with other voice communication domains 1 of the voice communication system 10. Such coordination is carried out by the VSC 13 in cooperation with the cross-domain coordinator 2 and with VCSs 13 of other voice communication domains 1 by employing a cross-domain coordination protocol and a cross-domain communication control protocol accordingly. The cross-domain coordination protocol operates by exchanging cross-domain coordination signals between the cross-domain coordinator 2 and the VCS 13 of the voice communication domain 1. The cross-domain communication control protocol operates by exchanging cross-domain communication control signals between the VCS 13 of the voice communication domain 1 and the VCSs 13 of other voice communication domains 1.

According to some embodiments of the present invention, the voice communication server (VCS) 13 is configured to register new users 11 joining the voice communication domain 1 and their corresponding PCDs 12. The registration includes (i) storing user information about the new users, a unique device identifier ID for the corresponding PCDs of the new users; a user-friendly identification name of the corresponding PCDs, and an IP address on which the corresponding PCDs are available within the local area communication network; and (ii) sending corresponding cross-domain coordination signals to the cross-domain coordinator 2 instructing the cross-domain coordinator 2 to register the new users 11 in the voice communication system 10.

According to some embodiments of the present invention, the voice communication server (VCS) 13 of the voice communication domain 1 is also configured to control interaction of the voice communication domain 1 with one or more external networked entities 5 by exchanging entity information signals with the external networked entities 5 over the local area communication network and/or over the Internet. The entity information signals can include entity coordination signals.

It should be understood that the personal communication devices 12, the voice communication servers 13 and the cross-domain coordinator 2 of the voice communication system 10 include electronic components and are implemented as computer systems including corresponding hardware, software, and/or firmware. In particular, the hardware of the voice communication servers 13 and the cross-domain coordinator 2 can be configured as a corresponding system including such main component as a central processing unit (CPU), a main memory (RAM), a read only memory (ROM), a non-volatile memory (NVM) or persistent storage device, an external memory, etc. The processor(s) of the personal communication devices 12, the voice communication servers 13 and the cross-domain coordinator 2 are preprogrammed by suitable software models capable of analyzing the corresponding input information during signal exchanges between the personal communication devices 12 and the corresponding voice communication servers 13, and between the voice communication servers 13 and the cross-domain coordinator 2. The software components can be stored in the ROM, a rewritable persistent storage device like a hard disk, a solid state memory device like a flash memory, an external memory device or the like, and when required can be loaded into the RAM, and executed by the processor(s). Accordingly, the processor(s) can perform a number of data processing steps, calculations, or estimating functions, some of which will be discussed hereinbelow.

Figure 3:
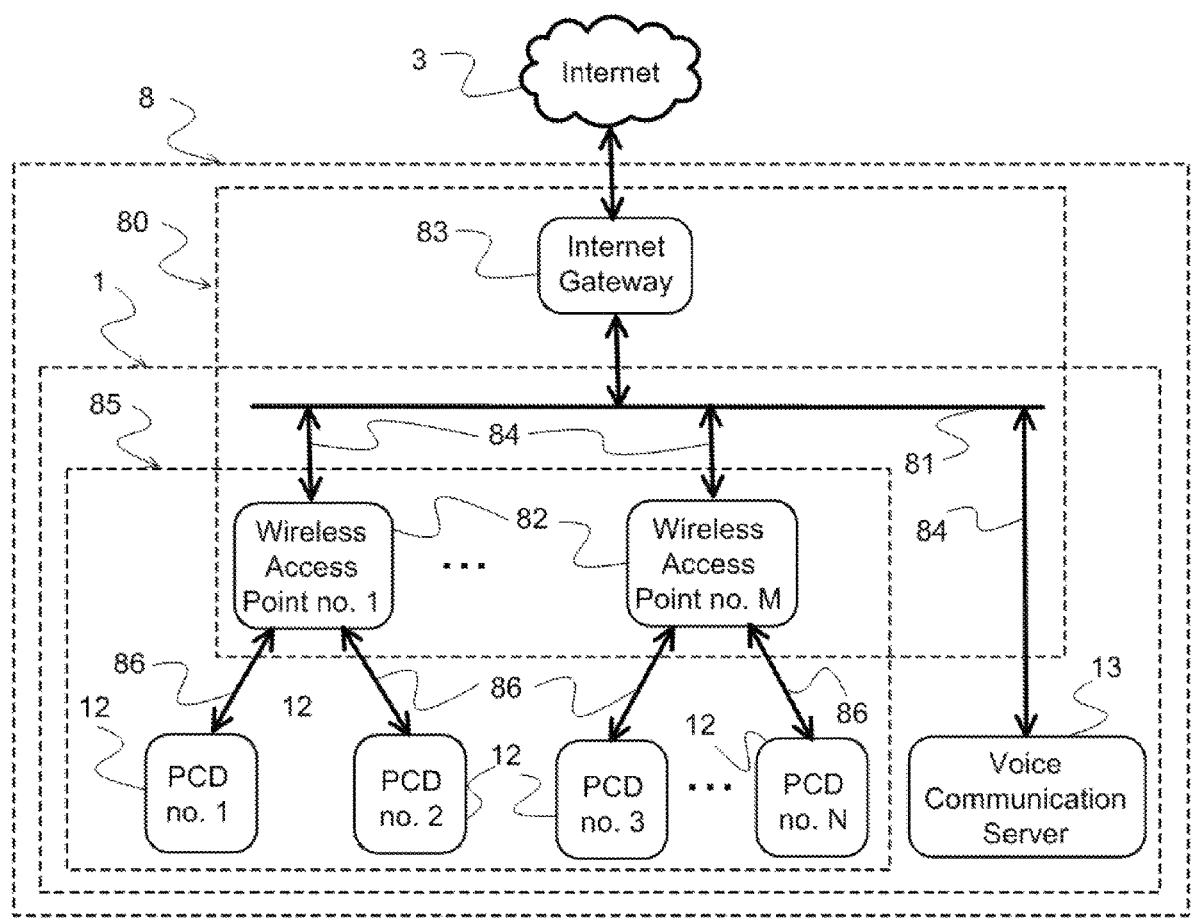
FIG. 3 illustrates a schematic functional block diagram of implementation of the voice communication domain within the local area communication network of the system of FIG. 1, according to some embodiments of the present invention.

Referring to FIG. 3, a schematic functional block diagram of implementation of the local voice communication domain 1 within the local area communication network 8 is illustrated, according to an embodiment of the present invention. According to this embodiment, the local area communication network 8 of the voice communication domain 1 includes a network infrastructure 80 deployed within a predetermined area (not shown) and such domain elements as the plurality of PCD 12 and the voice communication server 13, interacting through the network infrastructure 80.

The network infrastructure 80 includes a wired segment 81, one or more wireless access points 82 coupled to the wired segment 81 in order to provide wireless access of the PCDs 12 to the voice communication server 13, and an internet gateway 83 coupled to the wired segment 81 to provide access of the voice communication domain 1 to the Internet 3. The access point(s) 82 and the internet gateway 83 are coupled to the wired segment 81 by corresponding wired links 84. It should be understood that the network infrastructure 80 may also include other known hardware and software resources that enable network connectivity, communication, operations and management. For example, the wired segment 81 can include one or more interconnected network switches (not shown) for interconnecting the wireless access points 82, internet gateway 83 and the voice communication server 13.

According to an embodiment of the present invention, the wired segment 81 of the local area communication network 8 can be implemented on the basis of an IP based local area network (LAN) technology. An example of such technology includes, but is not limited to, the Ethernet technology based on the IEEE 802.3 standard.

The local area communication network 8 of the voice communication domain 1, further includes a wireless segment 85 that is provided by the wireless access points 82. The personal communication devices 12 of the voice communication domain 1 are coupled to the wireless segment 85 via wireless links 86.

According to an embodiment of the invention, the wireless segment 85 of the local area communication network 8 is implemented on the basis of an IP based wireless local area network (WLAN) technology. An example of such technology includes, but is not limited to, the Wi-Fi technology based on the IEEE 802.11 family of standards. When desired, the wireless access points 82 can also be integrated with the corresponding network switches in one common device.

According to the embodiment shown in FIG. 3, the voice communication server 13 is coupled to the wired segment 81 of the local area communication network 8 by the corresponding wired link 84 through the corresponding network switch (not shown on the figure). According to another embodiment of the present invention (not shown), the voice communication server 13 is coupled to the wireless segment 85 of the local area communication network 8 by the corresponding wireless link 86.

Figure 4:
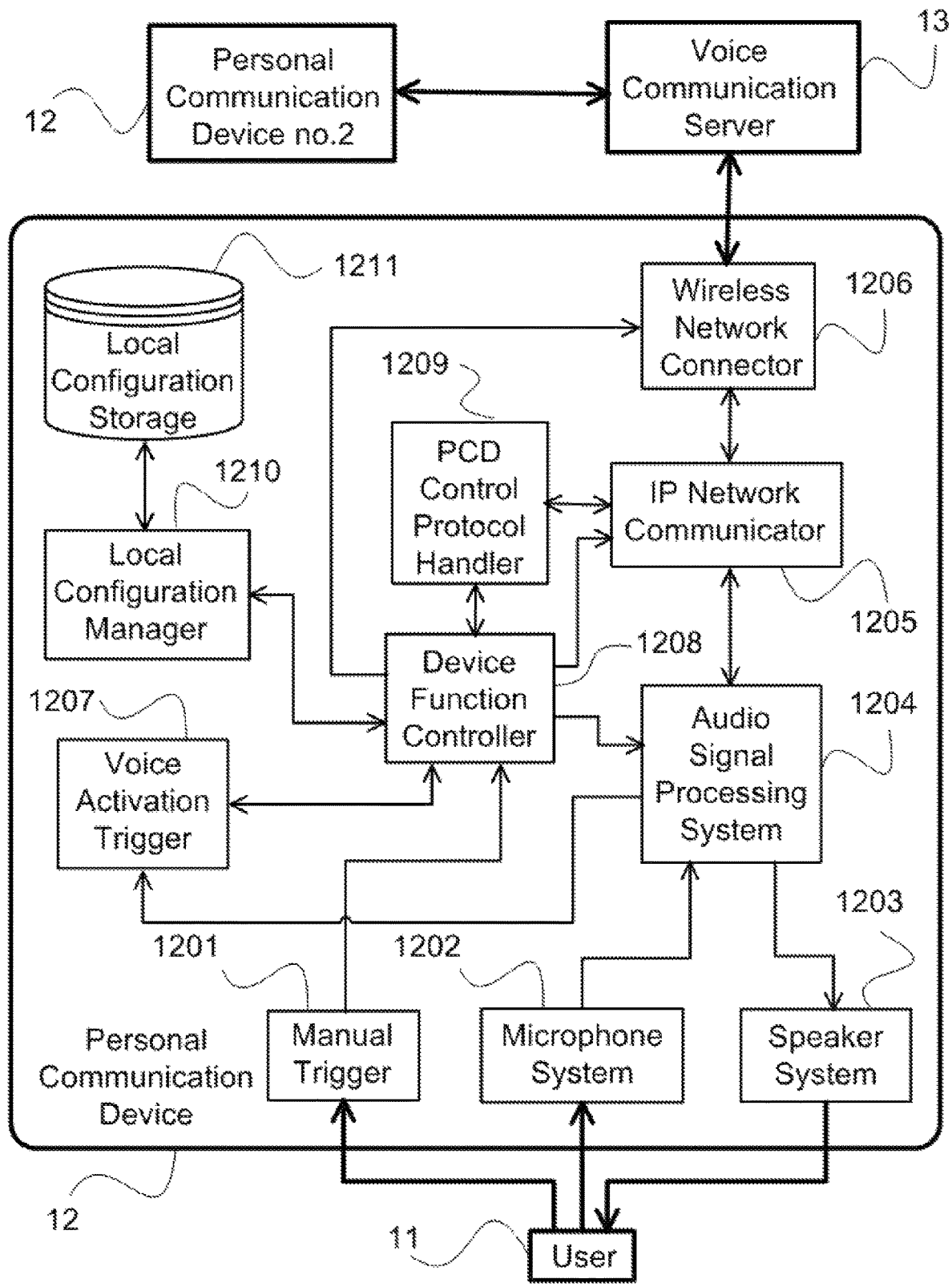
FIG. 4 illustrates a schematic block diagram of the personal communication devices (PCD) of the voice communication system of FIG. 1, according to some embodiments of the present invention.

Referring to FIG. 4, a schematic block diagram of the personal communication devices (PCD) 12 of the voice communication system 10 is illustrated, according to some embodiments of the present invention. Each PCD 12 is configured to provide communication between the sender user of the PCD 12 and recipient users of other PCDs 12, and between the sender user of the PCD 12 and one or more external networked entities 5.

According to an embodiment of the present invention, each PCD 12 is implemented through any suitable combinations of hardware, software, and/or firmware, and includes: a device function controller 1208, a manual trigger 1201 coupled to the device function controller 1208, a microphone system 1202, an audio signal processing system 1204 coupled to the microphone 1202, a speaker system 1203 coupled to the audio signal processing system 1204, a control protocol handler 1209 coupled to the device function controller 1208, an IP network communicator 1205 coupled to the audio signal processing system 1204 and to the control protocol handler 1209, a wireless network connector 1206 coupled to the IP network communicator 1205 and to the device function controller 1208, a local configuration manager 1210 coupled to the device function controller 1208, and a local configuration storage 1211 coupled to the local configuration manager 1210 and configured for non-volatile storing the configuration data including a set of configuration data items.

According to an embodiment of the present invention, the device function controller 1208 includes a circuitry and embedded software configured to control the configuration and functionality of the personal communication device.

According to some embodiments of the present invention, the manual trigger 1201 includes the control button (122 in FIG. 2). The control button allows the user for manual interaction with the personal voice communication device in order to generate user manual alert signals and transmit the user manual alert signals to the device function controller 1208. The device function controller 1208 is responsive to the user manual alert signals for generating activation signals for corresponding activation and/or deactivation of operational functions of the microphone system 1202, the speaker system 1203, the audio signals processing device 1204, the IP network connector 1205, the wireless network connector 1206, the PCD control protocol handler 1209, the local configuration manager 1210, and the local configuration storage 1211.

According to one example, the activation signals may be turn-on and/or turn-off signals for switching electrical power of the personal voice communication device on or off, correspondingly. According to another example, the activation signals may be wake-up signals for awaking the personal communication device from a sleep mode. According to a further example, the activation signals may be call management signals for accepting, declining and/or terminating voice calls.

According to some embodiments of the present invention, the microphone system 1202 includes one or more microphones to receive the audio signals produced by the user and by the environment surrounding the user by one or more channels, and to convert the audio signals into corresponding analog electrical audio signals.

According to some embodiments of the present invention, the audio signal processing system 1204 is configured to receive and process the analog electrical audio signals, and to generating encoded voice information signals. The audio signal processing system 1204 is coupled to the device function controller 1208 for receiving the wake-up and sleep signals.

According to some embodiments of the present invention, the speaker system 1203 includes one or more speakers coupled to the audio signal processing system 1204, and configured to receive analog electrical audio signals from the audio signal processing system 1204 and to output the analog electrical audio signals in the form of sound. Such analog electrical audio signals may be originated from other personal voice communication devices and/or from the network entity 5 and delivered to the PCD 12 via the voice communication server.

The audio signal processing system 1204 includes a transmission path and a receiving path. According to some embodiments, the transmission path of the audio signal processing system 1204 includes an analog-to-digital (AD) converter (not shown), a filter arranged downstream of AD converter (not shown) and an encoding device (not shown).

The analog-to-digital (AD) converter is configured to convert the analog electrical audio signals into a digital format in order to produce digital audio signals. The filter is configured to filter the digital audio signals.

According to some embodiments, the filter includes an echo cancelation device arranged downstream of analog-to-digital (AD) converter and configured for removing spurious echo signals component originated by the speaker system from the digital audio signals. The filter can also include a noise suppression device arranged downstream of the echo cancelation device and configured for separation of the user voice signals in the digital audio signals from collateral sound noises, thereby to increase quality of the user voice signals.

The encoding device is arranged downstream of the noise suppression device and configured to encode filtered digital voice signals and to generate the encoded voice information signals related to the digital voice signals. For implementation of the encoding device, any suitable standard codecs for encoding audio signals can be used. Examples of the suitable standard audio codecs include, but are not limited to, G.711, G.722, G.723.1, G.726, iLBC, Speex, SILK, etc.

According to some embodiments of the present invention, the receiving path of the audio signal processing system 1204 includes a decoding device (not shown), a digital-to-analog (DA) converter (not shown) arranged downstream of decoding device, and an output audio amplifier (not shown).

The decoding device is configured to receive and decode encoded voice information signals transmitted from the voice communication server in order to restore digital audio signals originated from the other PCDs 12 of the same voice communication domain 1, from the other PCDs 12 associated with other domains 1 and/or from the external network entities. For implementation of the decoding device, any suitable standard codecs for decoding audio signals can be used. Examples of the suitable standard audio codecs include, but are not limited to, G.711, G.722, G.723.1, G.726, iLBC, Speex, SILK, etc.

The digital-to-analog (DA) converter is configured to convert the digital audio signals received from the decoding device into analog electrical form. The output audio amplifier is configured to amplify the analog audio signals generated by the DA converter for outputting thereof to the speaker system 1203.

According to some embodiments of the present invention, the control protocol handler 1209 is configured to provide exchange of the PCD control protocol signals between the PCD 12 and the voice communication server (VCS) 13 within the voice communication domain 1. The PCD control protocol signals include control request signals generated by the voice communication server. The control request signals carry control commands and corresponding parameters of the control commands for coordination of the functionality of the PCD 12. The PCD control protocol signals also include control feedback signals. The control feedback signals can carry feedback information corresponding to the results of execution of the control commands. The control feedback signals can also carry information corresponding to notification of events that occurred on the side of PCD 12. For example, when a user accepts or declines an incoming voice call by interacting with a manual trigger 1201, the PCD 12 can generate a corresponding PCD control feedback signal carrying the notification of acceptance or declining of the voice calls, and transmit the generated PCD control feedback signals to the VCS 13.

In operation, the device function controller 1208 is responsive to the control commands to generate corresponding instruction signals during execution of the control commands, and to generate the feedback information for relaying the feedback information to the control protocol handler 1209.

According to some embodiments of the present invention, in order to coordinate functionality of the personal communication device, the generating of the corresponding instruction signals by the device function controller 1208 during execution of the control commands includes providing program function calls to the audio signal processing system 1204, to the local configuration manager 1210 and to the voice activation trigger 1206. For example, such program function calls can be provided to the audio signal processing system 1204 for increasing a volume of the sound outputted by the PCD, to the local configuration manager 1210 for adding additional configuration data items into the local configuration storage 1211, to the voice activation trigger 1206 for switching it on/off, etc.

According to some embodiments of the present invention, the providing of the exchange of the PCD control request signals, by the control protocol handler 1209, between the PCD 12 and the VCS 13 includes receiving the PCD control request signals carrying the control commands and corresponding parameters of this control commands from the VCS 13, analyzing the control request signals, and extracting control commands and the corresponding parameters of the control commands. After the extraction, the extracted control commands and the corresponding parameters are transferred to the device function controller 1208.

According to some embodiments of the present invention, the providing of the exchange of the PCD control feedback signals between the PCD 12 and the VCS 13 by the control protocol handler 1209 includes: (i) receiving, from the device function controller 1208, the feedback information corresponding to results of execution of the control commands, and the feedback information corresponding to notifications of the events that occurred on the side of PCD; and (ii) generating the control feedback signals carrying the feedback information in accordance with the PCD control protocol. After the generation, the control feedback signals are transmitted to the VCS 13.

According to some embodiments of the present invention, the feedback information corresponding to the results of execution of the control commands can include information data representing the current internal state of the PCD 12, e.g., whether the PCD is ready to receive incoming calls and/or incoming voice messages.

According to some embodiments, the IP network communicator 1205 is configured to provide exchange of the encoded voice information signals between the audio signal processing system 1204 and the voice communication server 13. The IP network communicator 1205 is also configured to provide exchange of the PCD control protocol signals between the control protocol handler 1209 and the voice communication server 13 in both directions, in accordance with TCP/IP protocols.

According to some embodiments of the present invention, the IP network communicator 1205 of the PCD 12 is further configured to provide security and privacy features for all communications of the PCD 12 with the VCS 13 within the voice communication domain 1. The security and privacy of a transport connections provided by the TCP transport protocol over IP networks can, for example, be achieved by applying symmetric and asymmetric cryptographical procedures, for example, by using known Secure Socket Layer (SSL) or Transport Layer Security (TLS) standards.

The IP network communicator 1205 can, for example, be implemented as a software component of a software operating environment (not shown), which is a part of the firmware of the PCDs 12.

According to some embodiments, the wireless network connector 1206 can provide MAC (Media Access Control) and PHY (physical) layer functionality for the PCD 12 to operate within wireless networks. Thus the wireless network connector 1206 is configured to provide wireless signal exchange of the encoded voice information signals and the PCD control protocol signals between the PCD 12 and the VCS 13 over the wireless segment (85 in FIG. 3) of the local area communication network (8 in FIG. 3) within the voice communication domain 1.

For implementation of the wireless network connector 1206, any suitable combination of available hardware and software can be used. For example, known Wi-Fi chipsets available from Realtek Semiconductor Corporation and Qualcomm Company can be used for implementation of the wireless network connector 1206.

According to some embodiments, the local configuration manager 1210 is configured to control access to configuration data of the PCD 12.

According to some embodiments, the local configuration storage 1211 is configured for non-volatile storing the configuration data that include a set of configuration data items. Examples of the configuration data items include, but are not limited to, wireless network parameters for access to the wireless segment (85 in FIG. 3) of the local area communication network (8 in FIG. 3), a unique device ID of the corresponding PCD 12 and a PCD name. For example, when the wireless segment 85 of the local area communication network 8 is implemented as a Wi-Fi wireless communication network, such network parameters include SSID (service set identifier) of the network, a password phrase for authentication and a type of the supported standard Wi-Fi security mechanism. The unique device ID of the PCD can, for example, be implemented as GUID (Globally Unique Identification) number. The PCD name can, for example, be any user-friendly identification name of the given PCD.

When desired, the configuration data stored in the local configuration storage 1211 can also include an identification code including a hash value for unique identification of voice biometric parameters of the user of the personal communication device 12 paired with the unique device ID.

When desired, one or more configuration data items can be cryptographically protected from tampering and illegal copying. The cryptographical protection can for example, be carried out by using known technologies based on asymmetric cryptography, which can also include digital signature.

According to some embodiments, the personal communication device (PCD) 12 further includes a voice activation trigger 1207 coupled to the device function controller 1208 and to the audio signal processing system 1204. The voice activation trigger 1207 is configured to receive and recognize a user communication signal from the audio signal processing system 1204, and to generate an wake-up alert signal for relaying the wake-up alert signal to the device function controller 1208. The device function controller 1208 is responsive to the wake-up alert signal for awaking the personal device from a sleep mode.

Figure 5:
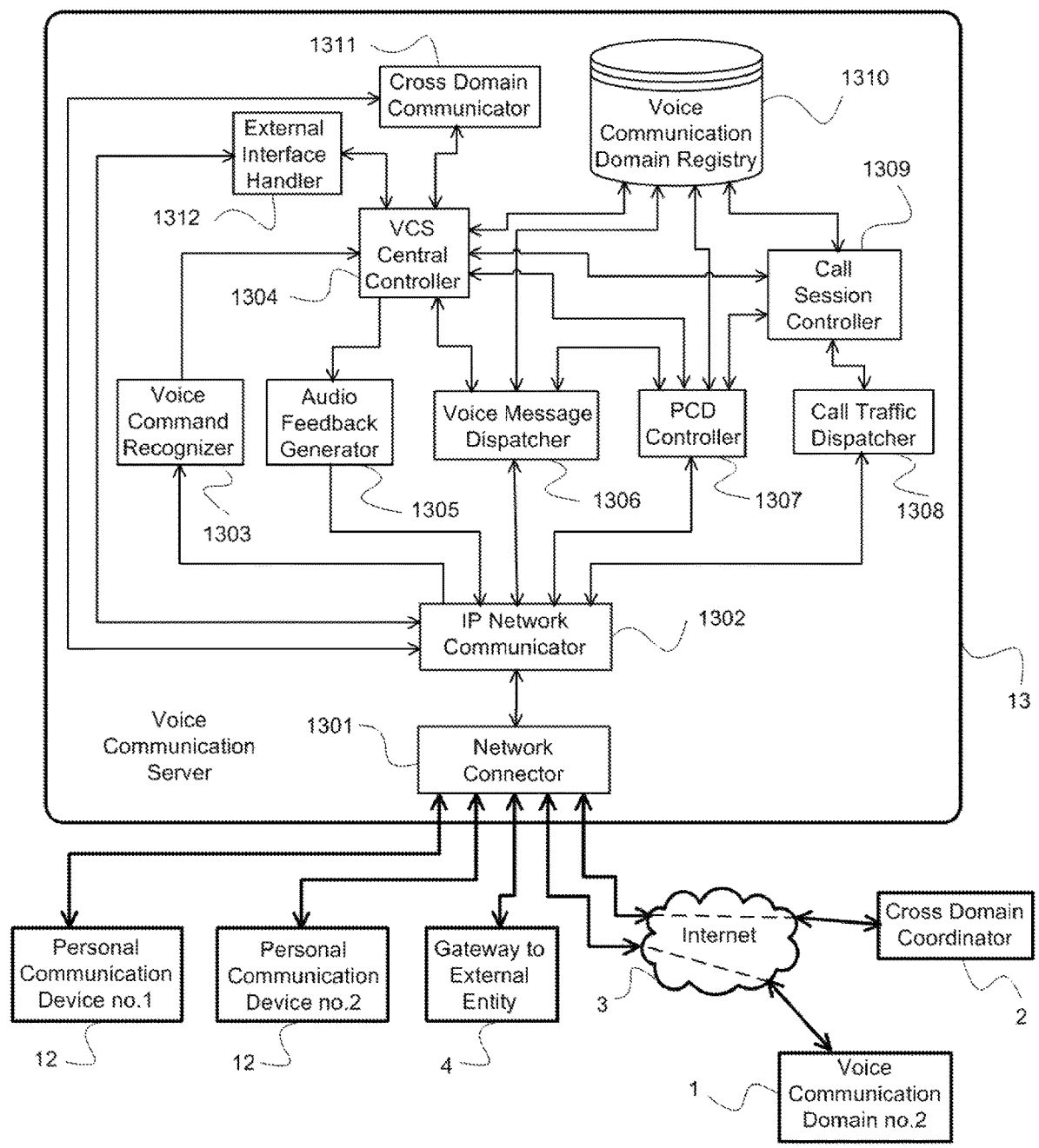
FIG. 5 illustrates a schematic block diagram of the voice communication server (VCS) deployed in each voice communication domain of the voice communication system of FIG. 1, according to some embodiments of the present invention.

Referring to FIG. 5, a schematic block diagram of the voice communication server (VCS) 13 deployed in each voice communication domain 1 of the voice communication system 10 is illustrated, according to some embodiments of the present invention. The VCS 13 includes electronic components and is implemented as a computer system including corresponding hardware, software, and/or firmware.

As shown in FIG. 5, the VCS 13 includes: a network connector 1301; an IP network communicator 1302 coupled to the network connector 1301; a voice command recognizer 1303 coupled to the IP network communicator 1302; a VCS central controller 1304 coupled to the voice command recognizer 1303; a PCD controller 1307 coupled to the VCS central controller 1304 and to the IP network communicator 1302; a call session controller 1309 coupled to the VCS central controller 1304 and to the PCD controller 1307; a voice communication domain registry 1310 coupled to the call session controller 1309, to the PCD controller 1307 and to the VCS central controller 1304; a call traffic dispatcher 1308 coupled to the call session controller 1309 and to the IP network communicator 1302; a voice message dispatcher 1306 coupled to the VCS central controller 1304, to the PCD controller 1307, to the voice communication domain registry 1310, and to the IP network communicator 1302; an audio feedback generator 1305 coupled to the VCS central controller 1304 and to the IP network communicator 1302; a cross-domain communicator 1311 coupled to the VCS central controller 1304 and to the IP network communicator 1302; an external interface handler 1312 coupled to the VCS central controller 1304 and to the IP network communicator 1302.

According to some embodiments of the present invention, the network connector 1301 is configured to provide signal exchange of the encoded voice information signals and the PCD control protocol signals within the corresponding voice communication domain 1. Specifically, the signal exchange can be carried out between the voice communication server 13 and at least one personal communication device 12 associated with the corresponding voice communication domain 1. The network connector 1301 can also be configured to provide signal exchange of the cross-domain coordination signals between the voice communication server 13 of the voice communication domain 1 and the cross-domain coordinator 2. The network connector 1301 can also be configured to provide signal exchange of the cross-domain communication control signals and the encoded voice information signals between the voice communication servers 13 of any two different voice communication domains 1 of the system 10. The network connector 1301 can also be configured to provide signal exchange of the entity coordination signals, and the encoded voice information signals with at least one external network entity 5 coupled to the voice communication domain 1.

The aforementioned signal exchanges are performed by the network connector 1301 include receiving incoming signals from the corresponding sources over the local area communication network (8 in FIG. 3) and over the Internet (3 in FIG. 1) and transmitting the outgoing signals to the corresponding destinations over the local area communication network 8 and the Internet 3.

The network connector 1301 is further configured to provide the aforementioned signal exchanges in cooperation with the IP network communicator 1302 by receiving the incoming signals from the local area communication network 8 and the Internet 3, and by further relaying the incoming signals to the IP network communicator 1302. The network connector 1301 receives the outgoing signals from the IP network communicator 1302 and transmits the outgoing signals to the corresponding destinations over the local area communication network 8 and the Internet 3.

According to some embodiments of the present invention, the IP network communicator 1302 is configured to operate in cooperation with the network communicator 1301 to provide signal exchange of the encoded voice information signals and the PCD control protocol signals within the corresponding voice communication domain 1 between the voice communication server 13 and at least one personal communication device 12 associated with this voice communication domain 1 in accordance with TCP/IP protocols. The IP network communicator 1302 can also be configured to provide signal exchange of the cross-domain coordination signals between the voice communication server 13 of the corresponding domain 1 and the cross domain coordinator 2 in accordance with TCP/IP protocols. The IP network communicator 1302 can also be configured to provide signal exchange of the cross-domain communication control signals and encoded voice information signals between the voice communication servers 13 of any two different voice communication domains in accordance with TCP/IP protocols. The IP network communicator 1302 can also be configured to provide signal exchange of the entity coordination signals and the encoded voice information signals with one or more external network entity 5 coupled to the voice communication domain 1 in accordance with TCP/IP protocols.

According to some embodiments of the present invention, the IP network communicator 1302 is further configured to separate the exchanged signals into the encoded voice command signals, the encoded voice communication signals, the PCD control protocol signals, the cross-domain coordination signals, the cross-domain communication control signals, and the entity coordination signals.

The IP network communicator 1302 is also configured to relay the encoded voice command signals to the voice command recognizer 1303, the encoded voice communication signals to the call traffic dispatcher 1308 and/or to the voice message dispatcher 1306, the PCD control protocol signals to the PCD controller 1307, the cross-domain coordination signals to the cross domain communicator 1311, the cross-domain communication control signals to the cross domain communicator 1311, and the entity coordination signals to the external interface handler 1312.

According to some embodiments of the present invention, the voice command recognizer 1303 is configured to receive the encoded voice command signals dispatched by the IP network communicator 1302 and to decode the encoded voice command signals in order to restore the original voice command signals provided verbally by the user. The decoding can be performed by applying a relevant codec in accordance with encoding format in which the voice command signals were encoded. For implementation of the voice command recognizer 1303, any suitable standard codecs for decoding audio signals can be applied. Examples of the suitable standard audio codecs include, but not limited to, G.711, G.722, G.723.1, G.726, iLBC, Speex, SILK, etc.

The voice command recognizer 1303 is also configured to recognize speech of the user carrying the voice command signals, in order to transform the voice command signals from the user's speech into a voice command text. The corresponding text can include command names and parameters associated with command names. For example, the voice command text can be represented by a phrase "Call my mom", where "Call"—is a command name, indicating that a voice call establishment is requested, while "My mom" is the corresponding associated parameter, denoting a name or alias of the recipient user for the given voice call. Likewise, the phrase "Message to John" includes the command name "Message", indicating that a voice message dispatching is requested, and the corresponding associated parameter "John", denoting a name or alias of the recipient user for the given voice message. Moreover, when the user desires to control his PCD, the voice command text can, for example, be represented by a phrase "Switch to silent", where "Switch" is a command name, indicating that switching of the PCD 12 to a different mode of operation is requested, while "Silent" is the corresponding associated parameter, denoting an identification name of the certain mode of operation.

The voice command recognizer 1303 can also be configured to parse the text in order to extract the names of the user voice commands and their associated parameters, which are required for executing the voice commands. The voice command recognizer 1303 is also configured to generate voice command notification signals. The voice command notification signals include the extracted names of the user voice commands, and their associated parameters.

According to some embodiments of the present invention, the VCS central controller 1304 is configured to receive voice command notifications from the voice command recognizer 1303. The VCS central controller 1304 is responsive to the voice command notifications in order to execute voice commands by generating corresponding control instructions, and relaying the generated control instructions to the corresponding internal components of the VCS 13 for execution.

According to some embodiments of the present invention, the control instructions include at least one of the following types:

(i) control instructions of a first type, which are used for controlling the functionality of the PCD 12 from which the voice command is originated. The VCS central controller 1304 relays these control instructions of the first type to the PCD controller 1307;

(ii) control instructions of a second type, which are used for establishment of voice calls between the users within the same voice communication domain, with the users of other voice communication domains, and with the users of other external communication systems associated with the external network entities 5. The VCS central controller 1304 relays the control instructions of a second type to the call session controller 1309;

(iii) control instructions of a third type, which are used for exchange of voice messages between the users within the same voice communication domain 1, with the users of other voice communication domains 1, and with the users of other external communication systems associated with the external network entities 5. The VCS central controller 1304 relays the control instructions of a third type to the voice message dispatcher 1306.

According to some embodiments of the present invention, the PCD controller 1307 is responsive to the control instructions of the first type generated from the VCS central controller 1304 in order to control the functionality of the PCDs 12 of the corresponding domain 1 by generating corresponding PCD control request signals in accordance with the PCD control protocol and by transmitting the generated control request signals to the PCDs 12 through the IP network communicator 1302. The PCD controller 1307 is also configured to receive the control feedback signals originated from the PCDs 12 dispatched by the IP network communicator 1302, to process the received control feedback signals in accordance with the PCD control protocol and to extract the feedback information. The PCD controller 1307 is also configured to relay the extracted feedback information to a corresponding component of the voice communication server 13 from which the corresponding control request signals were originated. For example, the extracted feedback information can be relayed to one or more such component(s) as the VCS central controller 1304, the voice message dispatcher 1306, the call session controller 1309, and the voice communication domain registry 1310, if the corresponding control request signals were originated by the corresponding component(s) Likewise, the extracted feedback information can be relayed to the VCS central controller 1304, if the corresponding control feedback signal was initiated by the PCDs 12.

According to some embodiments of the present invention, the call session controller 1309 is configured to control voice call sessions between the PCDs 12 within the same voice communication domain 1. According to some embodiments of the present invention, the call session controller 1309 can also be configured to participate in the control of call sessions between the PCDs 12 associated with at least two different voice communication domains 1. According to some embodiments of the present invention, the call session controller 1309 can also be configured to control call sessions between the PCD 12 associated with the corresponding voice communication domain 1 and at least one external voice communication system associated with the external network entity 5 that is coupled to the voice communication server 13 of this voice communication domain 1 via a gateway 4.

According to some embodiments of the present invention, the voice communication domain registry 1310 is configured for non-volatile storage and management of information about the users 11 of the personal communication devices 12 registered in the corresponding voice communication domain 1. According to some embodiments of the present invention, the voice communication domain registry 1310 is also configured for non-volatile storage and management of information about the personal communication devices 12 associated with the corresponding users 11 of the voice communication domain 1. Such information can, for example, include the user names and/or the user known aliases, the unique corresponding identifiers (IDs) of the PCDs 12, and the user friendly names of the PCDs 12. According to some embodiments of the present invention, the voice communication domain registry 1310 is configured to provide access to at least a portion of the information under management.

According to some embodiments of the present invention, the call traffic dispatcher 1308 is configured to provide exchange of the encoded voice communication signals between the PCDs 12 associated with the same voice communication domain 1, which participate in the corresponding voice call sessions.

According to some embodiments of the present invention, the call traffic dispatcher 1308 is configured to provide exchange of encoded voice communication signals between the personal communication devices 12 associated with a certain voice communication domain 1 with the PCDs 12 of another voice communication domain 1 via the voice communication server 13 of the another voice communication domain 1 in the corresponding voice call sessions.

According to some embodiments of the present invention, the call traffic dispatcher 1308 is also configured to provide exchange of encoded voice communication signals between the personal communication devices 12 of a certain communication domain 1 and the external entity 5 coupled with this voice communication server 13 of this domain 1 via the gateway 4, in the corresponding voice call sessions.

According to some embodiments of the present invention, the voice message dispatcher 1306 is configured provide exchange of the encoded voice communication signals carrying voice messages between the personal communication devices 12 within the same voice communication domain 1.

According to some embodiments of the present invention, the voice message dispatcher 1306 is configured to provide exchange of the encoded voice communication signals carrying voice messages between the personal communication devices 12 associated with a certain voice communication domain 1 with the PCDs 12 of another voice communication domain 1 via the voice communication server 13 of the another voice communication domain 1.

According to some embodiments of the present invention, the voice message dispatcher 1306 is also configured to provide exchange of the encoded voice communication signals carrying voice messages between the personal communication devices of a certain communication domain 1 and the external entity 5 coupled with this voice communication server 13 of this domain 1 via the gateway 4.

According to some embodiments of the present invention, the audio feedback generator 1305 is configured to generate and transmit encoded audio feedback signals to the PCDs 12 associated with the corresponding voice communication domain 1 for providing notification and audio feedback to users participating in the communication.

According to some embodiments of the present invention, the cross-domain communicator 1311 is configured to exchange the cross-domain coordination signals with the cross-domain coordinator 2 in order to provide a discovery of a remote recipient user and a remote voice communication domain currently associated with the recipient user for delivering either a voice call or a voice message outgoing from the sender user of the PCD 12 associated with the voice communication domain originating the communication. According to some embodiments of the present invention, the cross-domain communicator 1311 is also configured to exchange the cross-domain communication control signals with a remote voice communication server 13 associated with the discovered remote voice communication domain in order to provide voice communications between the user of the voice communication domain that originates the communication and the remote recipient user of the remote domain.

According to some embodiments of the present invention, the external interface handler 1312 is configured to provide interaction of the voice communication server 13 with the external network entity 5. It should be noted that interaction of the voice communication server 13 with the external network entity 5 is carried out via the gateway 4 that allows for integration of the voice communication system 10 with external systems and applications created by third-party developers.

Figure 6:
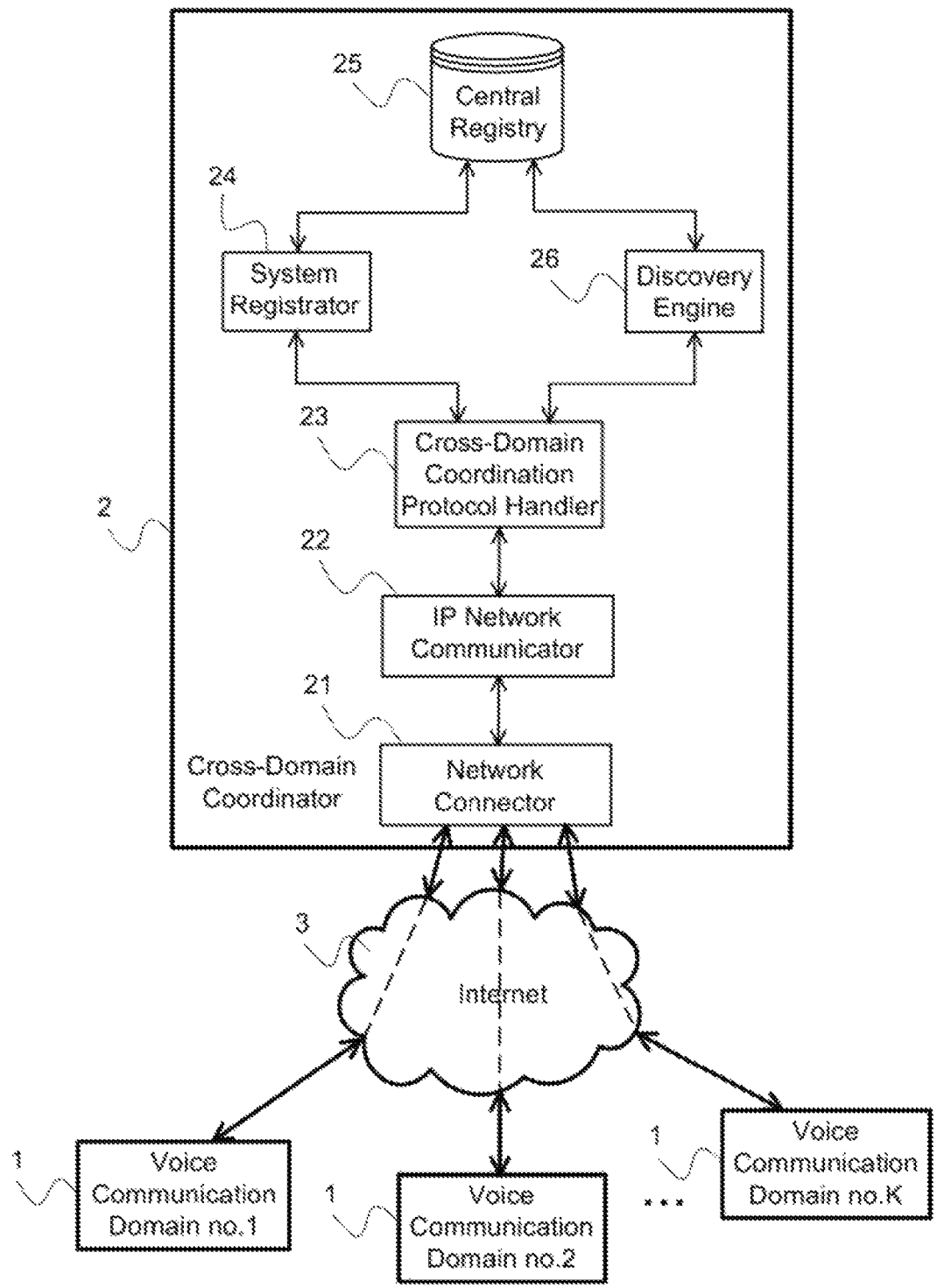
FIG. 6 illustrates, a schematic block diagram of the Cross-domain coordinator of the voice communication system of FIG. 1, according to some embodiments of the present invention.

Referring to FIG. 6, a schematic block diagram of the Cross-domain coordinator 2 of the voice communication system 10 is illustrated, according to some embodiments of the present invention. According to some embodiment of the present invention, the cross-domain coordinator 2 includes a network connector 21, an IP network communicator 22 coupled to the network connector 21, a cross-domain coordination protocol handler 23 coupled to the IP network communicator 22, a system registrator 24 coupled to the cross-domain coordination protocol handler 23, a discovery engine 26 coupled to the cross-domain coordination protocol handler 23, and a central registry 25 coupled to the system registrator 24 and to the discovery engine 26.

According to some embodiments of the present invention, the network connector 21 is configured to provide signal exchange of the cross-domain coordination signals over the Internet between the cross-domain coordinator 2 and the voice communication servers 13 associated with the corresponding voice communication domains 1.

According to some embodiments of the present invention, the cross-domain coordination signals include domain registration signals, user registration signals and user discovery signals. The domain registration signals carry requests for registration of the voice communication domains 1 within the voice communication system 10. The user registration signals can carry user information including the unique domain IDs of the voice communication domains 1 currently associated with corresponding users 11, the unique user IDs of these users, and the user phone numbers and/or the user e-mail addresses of these users. The user discovery signals carry discovery parameters including phone numbers 11 and/or e-mail addresses of desired users 11, information for which is an aim of the corresponding discovery by the cross-domain coordinator 2.

According to some embodiments of the present invention, the IP network communicator 22 is configured to provide signal exchange of the cross-domain coordination signals between the cross-domain coordinator 2 and the voice communication servers 13 associated with corresponding voice communication domains 1 in accordance with TCP/IP protocols.

According to some embodiments of the present invention, the cross-domain coordination protocol handler 23 is configured to exchange the cross-domain coordination signals between the cross-domain coordinator 2 and the voice communication servers 13 associated with the corresponding voice communication domains 1, in accordance with the cross-domain coordination protocol.

According to some embodiments of the present invention, the system registrator 24 is configured to register the voice communication domains 1 and the users 11, associated with the voice communication domains 1 within the voice communication system 10.

According to some embodiments of the present invention, the discovery engine 26 is configured to search the user information about desired users 11 registered by the system registrator 24 and the domain information about voice communication domains 1 where the desired users are currently located.

According to some embodiments of the present invention, the central registry 25 is configured to provide non-volatile storage of the domain information of the voice communication domains 1 registered within the voice communication system 10, and the user information of the users 11 associated with the corresponding voice communication domains 1, and registered within the voice communication system 10.

In operation, the cross-domain coordination protocol handler 23 receives the cross-domain coordination signals from the corresponding voice communication servers 13 of the corresponding voice communication domains 1 over the Internet 3 and via the network connector 21 and the IP network communicator 22. Then, the cross-domain coordination protocol handler 23 processes the received cross-domain coordination signals in accordance with the cross-domain coordination protocol.

The processing of the cross-domain coordination signals includes separating the received cross-domain coordination signals into the domain registration signals, the user registration signals and the user discovery signals, and then applying further processing actions depending on the type of the separated signals.

Specifically, for the domain registration signals, the cross-domain coordination protocol handler 23 extracts, from these signals, the corresponding requests for registration of the voice communication domains 1 within the voice communication system 10, and then acquires, from the IP network communicator 22, current Internet addresses of the voice communication servers 13 of the corresponding voice communication domains 1.

Thereafter, the cross-domain coordination protocol handler 23 generates corresponding control instructions for registration of the voice communication domains 1. The cross-domain coordination protocol handler 23 adds the extracted requests for registration and the acquired current Internet addresses into the control instructions, and then relays the generated control instructions to the system registrator 24 for execution.

Likewise, for the user registration signals, the cross-domain coordination protocol handler 23 extracts, from these signals, the user information, including the unique domain ID of voice communication domains 1 currently associated with the users 11, the unique user IDs of the users 11, and the user phone numbers and/or the user e-mail addresses.

Thereafter, the cross-domain coordination protocol handler 23 generates corresponding control instructions for registration of the users 11, adds the extracted user information into the control instructions, and then relays the generated control instructions to the system registrator 24 for execution.

For the user discovery signals, the cross-domain coordination protocol handler 23 extracts, from these signals, the discovery parameters including phone numbers 11 and/or e-mail addresses of the desired users 11. Thereafter, the cross-domain coordination protocol handler 23 generates corresponding control instructions for discovering the user information about the desired users 11, adds the extracted discovery parameters into the control instructions, and then relays the generated control instructions to the discovery engine 26 for execution.

In operation, the cross-domain coordination protocol handler 23 further receives feedback information from the system registrator 24 and the discovery engine 26 after the execution of the corresponding control instructions. Then, the cross-domain coordination protocol handler 23 generates response signals in accordance with the cross-domain coordination protocol adding the received feedback information into these signals, and transmits the generated response signals via the IP network communicator 22 and the network connector 21 over the Internet to the corresponding voice communication servers 13 from which the corresponding cross-domain coordination signals were originated.

According to some embodiments of the present invention, the system registrator 24 is configured to receive control instructions from the cross-domain coordination protocol handler 23 and to execute these instructions. The received control instructions can be related to (i) registration of new voice communication domains 1 which join the voice communication system 10, (ii) registration of new users 11, associated with the corresponding voice communication domains 1 that join the voice communication system 10, and (iii) updating the user registration information for the users which were already registered with the voice communication system 10 but moved from one voice communication domain 1 to some another voice communication domain 1. It should be noted that the execution of the received control instructions is performed in cooperation with the central registry 25.

According to some embodiments of the present invention, the central registry 25 is configured to provide a non-volatile storage of information about the voice communication domains 1 and the users 11 associated with the corresponding voice communication domains 1 within the voice communication system 10. In cooperation with the system registrator 24, the central registry 25 is also configured to perform the following actions:

To create new information records for the registered voice communication domains, where the new information records can include unique domain IDs for the domains 1 and Internet addresses of the corresponding voice communication servers 13 associated with the domains 1;

To create new information records for registered new users 11, including unique user IDs, mobile phone numbers and/or e-mail addresses, and unique domain IDs of the voice communication domains currently associated with the new users; and To update existing information records for the users 11, including updating of the unique domain IDs of the voice communication domains 1 and updating of the mobile phone numbers and/or the e-mail addresses.

According to some embodiments of the present invention, the discovery engine 26 is configured to receive the control instructions for discovering of the user information about the desired users registered within the voice communication system from the cross-domain coordination protocol handler 23 and to execute these control instructions.

In operation, the executing of the control instructions for the discovering of the user information about the desired users includes generating query requests to a search for the users with the corresponding search parameters and relaying the query requests to the central registry 25. The executing can also include receiving query responses from the central registry 25 containing information about the users in accordance with the provided search parameters. The executing can also include acquiring additional information about the discovered users from the central registry 25. The additional information can include unique IDs of the discovered users and unique domain IDs of the corresponding voice communication domains 1 currently associated with the discovered users 11. The executing can also include acquiring the additional information about the currently associated voice communication domains of the discovered users. Such information can include Internet addresses of the corresponding voice communication servers 13. The executing can also include relaying the acquired information to the cross-domain coordination protocol handler 23 as a feedback information.

According to some embodiments of the present invention, the central registry 25 is further configured to receive the query requests from the discovery engine 26, to process the received query requests by searching for the user information about the desired users in accordance with the corresponding search parameters provided with the query requests, and to relay back the found user information, found during the execution of the query requests, to the discovery engine 26.

Figure 7:
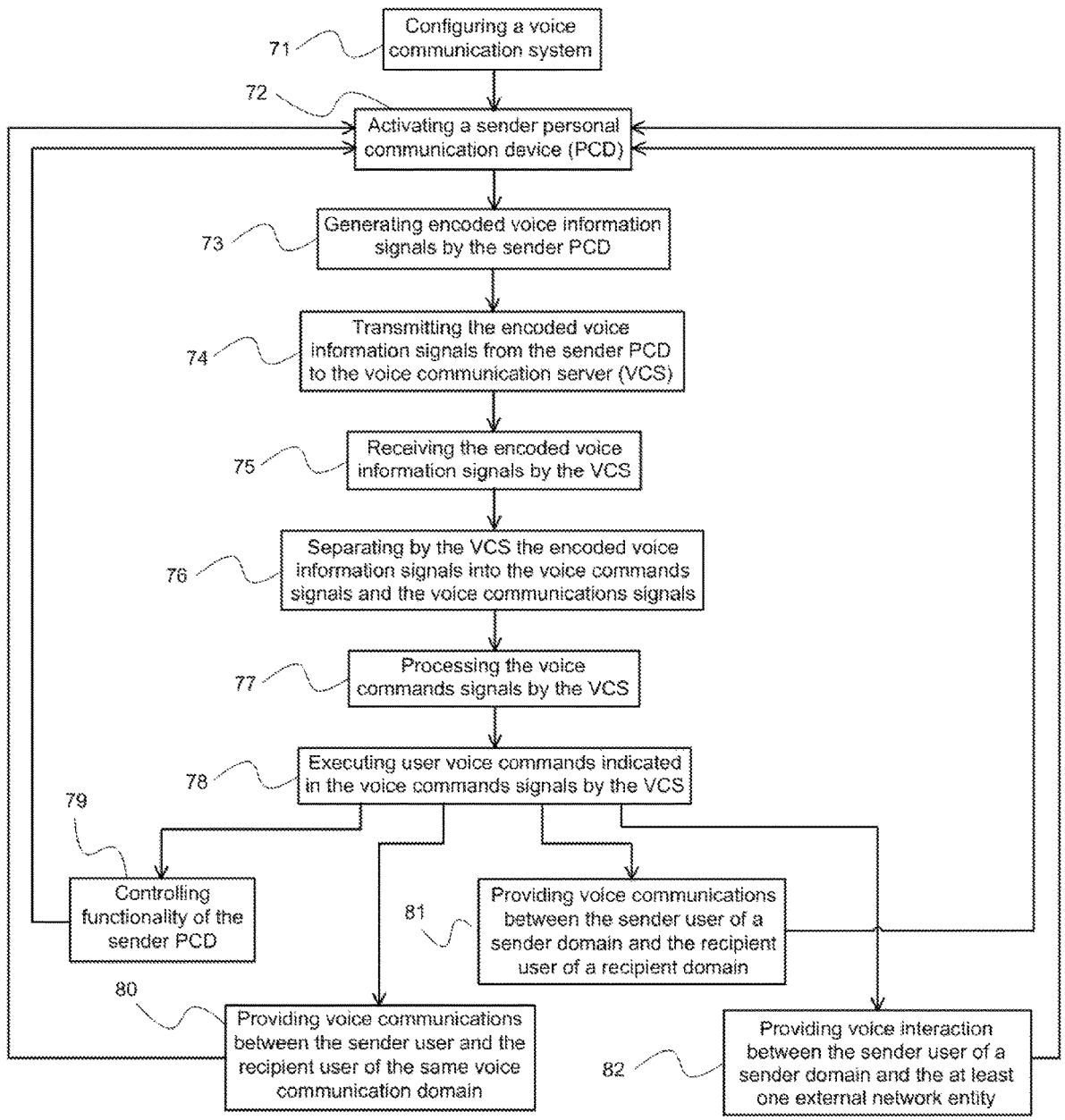
FIG. 7 illustrates a schematic flowchart diagram of the method for providing the voice communication, according to some embodiments of the present invention.

According to another general aspect of the present invention, there is provided a method for providing voice communication between sender users and recipient users and/or between the sender users and one or more network entities. FIG. 7 illustrates a schematic flowchart diagram of the method for providing the voice communication, according to some embodiments of the present invention.

Referring to FIGS. 1 and 7 together, the method includes configuring (Block 71 in FIG. 7) a voice communication system (10 in FIG. 1). According to some embodiments of the present invention, the configuring of the voice communication system includes configuring the cross-domain coordinator 2 and the plurality of the voice communication domains 1. The configuring of the cross-domain coordinator 2 is performed in order to coordinate interaction between the voice communication domains 1 over the Internet 3. It should be understood that the cross-domain coordinator 2 has a predetermined and publicly accessible address in the Internet 3. According to some embodiments of the present invention, the configuring of the cross-domain coordinator 2 can include deployment of a hardware and a software a of the cross-domain coordinator 2, connecting the cross-domain coordinator 2 to the Internet 3, and providing public access to the cross-domain coordinator 2 by assigning at least one publicly accessible Internet address to the cross-domain coordinator 2. The configuring of the plurality of the voice communication domains 1 is performed in order to provide interaction of the domains 1 with each other and with the cross-domain coordinator 2.

The method for providing the voice communication also includes activating (Block 72) a sender personal communication device (PCD) 12 of the voice communication domain 1 by the sender user 11.

Referring to FIGS. 4 and 7 together, the activating of the sender personal communication device 12 includes activating the manual trigger 1201 by the sender user 11. The manual trigger 1201 generates a user manual alert signal and relays the user manual alert signal to the device function controller 1208. The device function controller 1208 is responsive to the user manual alert signal to operate for activate the microphone system 1202, the speaker system 1203, the audio signals processing device 1204, the IP network connector 1205, the wireless network connector 1206, the PCD control protocol handler 1209, the local configuration manager 1210, and the local configuration storage 1211.

After activation, the sender PCD 12 of the sender user 11 generates (Block 73) encoded voice information signals. The encoded voice information signals can include encoded voice command signals carrying user voice commands of the sender user 11 and encoded voice communication signals carrying user voice communications of the sender user 11.

Figure 12:
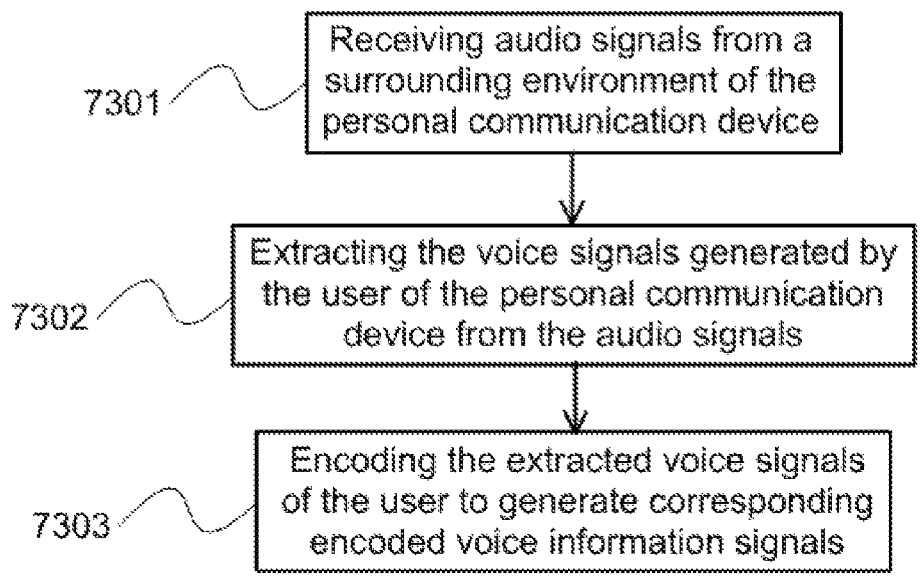
FIG. 12 illustrates a schematic flowchart diagram for the generating of the encoded voice information signals by the PCD, according to some embodiments of the present invention.

Referring to FIG. 12, a schematic flowchart diagram for the generating of the encoded voice information signals by the PCD 12 is illustrated, according to some embodiments of the present invention. In operation, the PCD 12 receives (Block 7301) audio signals from a surrounding environment. The audio signals can include voice signals generated by the user of the PCD 12, collateral sound noise, and echo signals. The voice signals can include voice command signals of the user that correspond to user commands provided verbally, and voice communication signals of the user corresponding to voice communication provided verbally. The voice signals generated by the user of the PCD 12 are extracted (Block 7302) from the audio signals by suppressing the collateral sound noise and cancelling the echo signals. Then, the extracted voice signals are encoded (Block 7303) by applying a suitable audio codec in order to generate corresponding encoded voice information signals of the user 11 of the personal communication device 12.

Turning back to FIG. 7, the method for providing the voice communication also includes transmitting (Block 74) the encoded voice information signals from the sender PCD 12 to the voice communication server 13 of this voice communication domain 1.

According to some embodiments, the transmitting of the encoded voice information signals includes processing the encoded voice information signals in accordance with a TCP/IP protocol to prepare the encoded voice information signals for transmission over the local area communication network, and relaying the encoded voice information signals wirelessly over the wireless segment 85 of the local area communication network 8 to the voice communication server 13 of the voice communication domain 1.

The voice communication server 13 of the voice communication domain 1 receives (Block 75) the encoded voice information signals and separates (Block 76) the received encoded voice information signals into the encoded voice command signals and the encoded voice communication signals. The separating of the received encoded voice information signals into the encoded voice command signals and the encoded voice communication signals by the voice communication server 13 can, for example, utilize known techniques of TCP/IP protocols.

Then, the voice communication server 13 processes (Block 77) the encoded voice command signals in order to extract information carried by the encoded voice command signals about the user voice commands, and executes (Block 78) the user voice commands.

Figure 13:
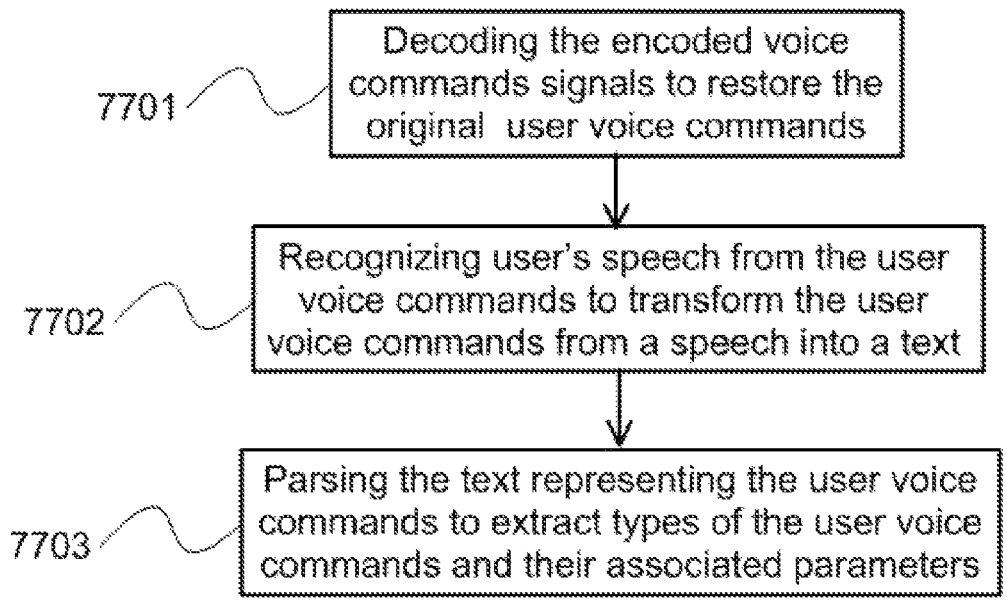
FIG. 13 illustrates a schematic flowchart diagram for the processing of the encoded voice command signals separated from the received encoded voice information signals by the voice communication server, according to some embodiments of the present invention.

Referring to FIG. 13, a schematic flowchart diagram for the processing of the encoded voice command signals separated from the received encoded voice information signals by the voice communication server 13 is illustrated, according to some embodiments of the present invention. Referring to FIGS. 5 and 13 together, the voice command recognizer 1303 decodes (Block 7701) the encoded voice command signals in order to restore the original user voice commands provided verbally by the sender user. The voice command recognizer 1303 recognizes (Block 7702) user's speech from the voice command signals of the user and transforms the voice command signals from a speech into a text phrase. Then the text phrase representing the voice command signals is parsed (Block 7703) in order to extract names of the user voice commands and their associated parameters required for executing the voice commands by the VSC central controller 1304.

Turning back to FIGS. 1 and 7, according to some embodiments of the present invention, actions during the execution (Block 78) of the voice commands by the voice communication server 13 can depend on the voice commands of the sender user and on a current location of the recipient user. In particular, the recipient user can be located within the same voice communication domain as the sender user, or within another domain.

For example, the execution can include one or more such actions as: controlling (Block 79) functionality of the sender PCD 12, providing (Block 80) voice communications between the sender user and the recipient user of the same voice communication domain 1, providing (Block 81) voice communications between the sender user of a sender domain and the recipient user of a recipient domain; and providing (Block 82) voice interaction between the sender user of a sender domain and the external network entities 5.

Figure 14:
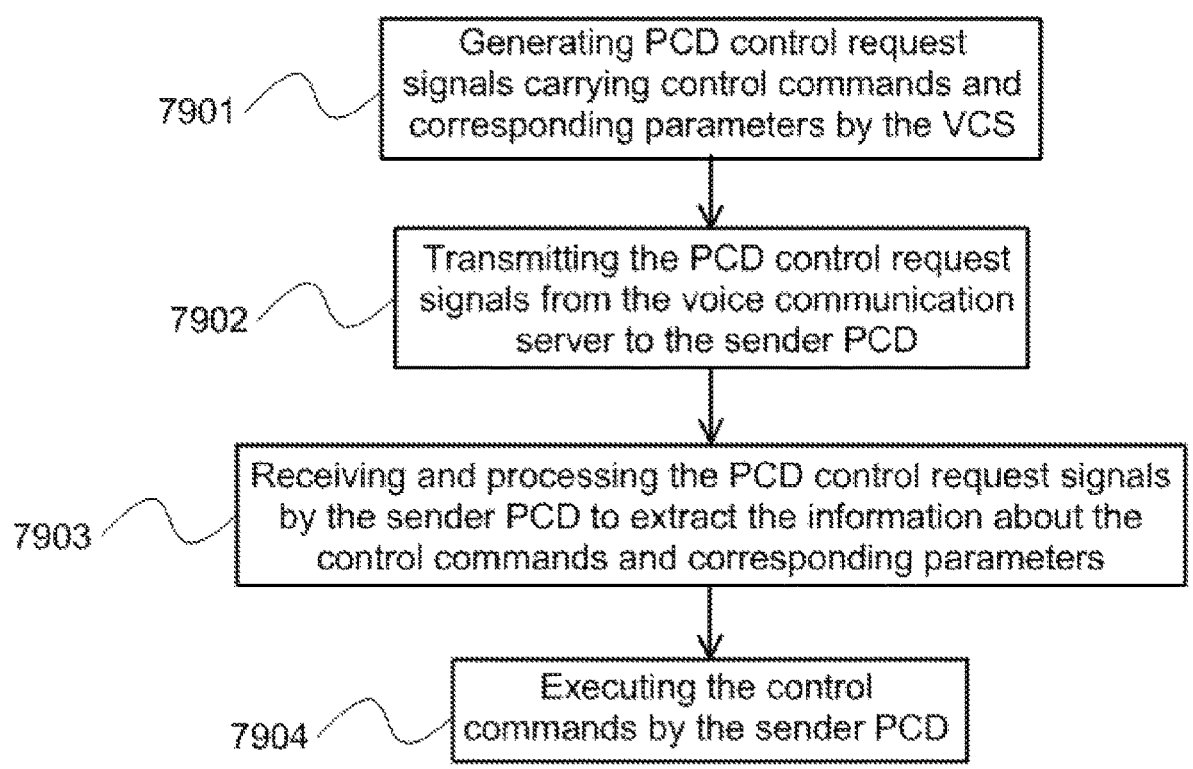
FIG. 14 illustrates a schematic flowchart diagram for the controlling of the functionality of the sender PCD by the voice communication server, according to some embodiments of the present invention.

Referring to FIG. 14, a schematic flowchart diagram for the controlling (Block 79) of the functionality of the sender PCD 12 by the voice communication server 13 is illustrated, according to some embodiments of the present invention. In operation, the voice communication server 13 generates (Block 7901) PCD control request signals in accordance with the PCD control protocol. The PCD control request signals carry control commands and corresponding parameters of the control commands for control and coordination of the functionality of the sender PCD 12. The control commands are indicative of the corresponding user voice commands. The PCD control request signals are transmitted (Block 7902) from the voice communication server 13 to the sender PCD 12 over the local area communication network 8. The sender PCD 12 receives (Block 7903) the PCD control request signals and processes (Block 7903) the PCD control request signals in accordance with the PCD control protocol in order to extract the information about the control commands that the sender PCD 12 needs to execute and the corresponding parameters of the control commands. After extracting the information about the control commands, the sender PCD 12 executes (Block 7904) the control commands.

Examples of the control commands include, but are not limited to, commands to turn up or down the volume level of the sound provided to the users 11 by the sender PCD 12; commands to switch the sender PCD 12 between the supporting operating modes, such as a switch from an active mode, to a silent mode of operation, or a switch from the silent mode back to the active mode of operation, etc.

Figure 8:
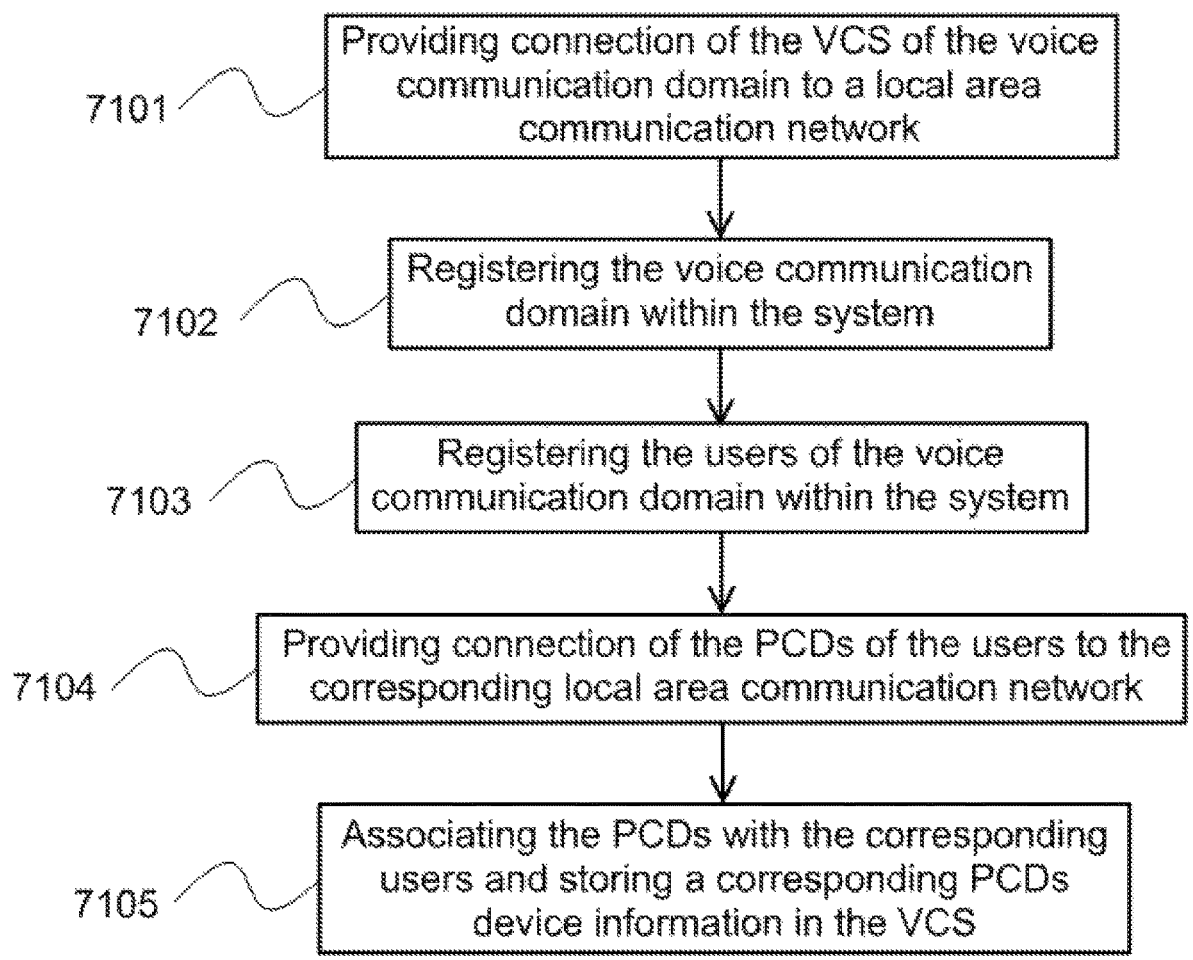
FIG. 8 illustrates a schematic flowchart diagram for the configuring of each voice communication domain, according to some embodiments of the present invention.

Referring to FIGS. 1 and 8 together, a schematic flowchart diagram for the configuring of each voice communication domain 1 is illustrated, according to some embodiments of the present invention. The configuring of the voice communication domain 1 includes providing (Block 7101) connection of the voice communication server 13 of the voice communication domains 1 to a local area communication network 8 of the voice communication domains 1. The voice communication server (VCS) 13 stores the publicly accessible Internet address of the cross-domain coordinator 2. Then, the voice communication domain 1 is registered (Block 7102) within the voice communication system 10. The configuring of the voice communication domain 1 also includes registering (Block 7103) the users 11 of the voice communication domain 1 within the voice communication system 10, and providing (Block 7104) connection of the PCDs 12 of the users 11 of the voice communication domain 1 to the corresponding local area communication network 8.

The configuring of the voice communication domain 1 also includes associating (Block 7105) the PCDs 12 of the voice communication domains 1 with the corresponding users 11 of the voice communication domain 1, and storing corresponding device information of the PCDs 12 in the voice communication server 13. Examples of the corresponding device information include, but are not limited to, unique device IDs of the PCDs 12, PCD names of the PCDs 12 (which are user friendly), unique user IDs of corresponding users 11 currently associated with the devices 12, and current local IP addresses of the devices 12 within the local area communication network 8.

Figure 9:
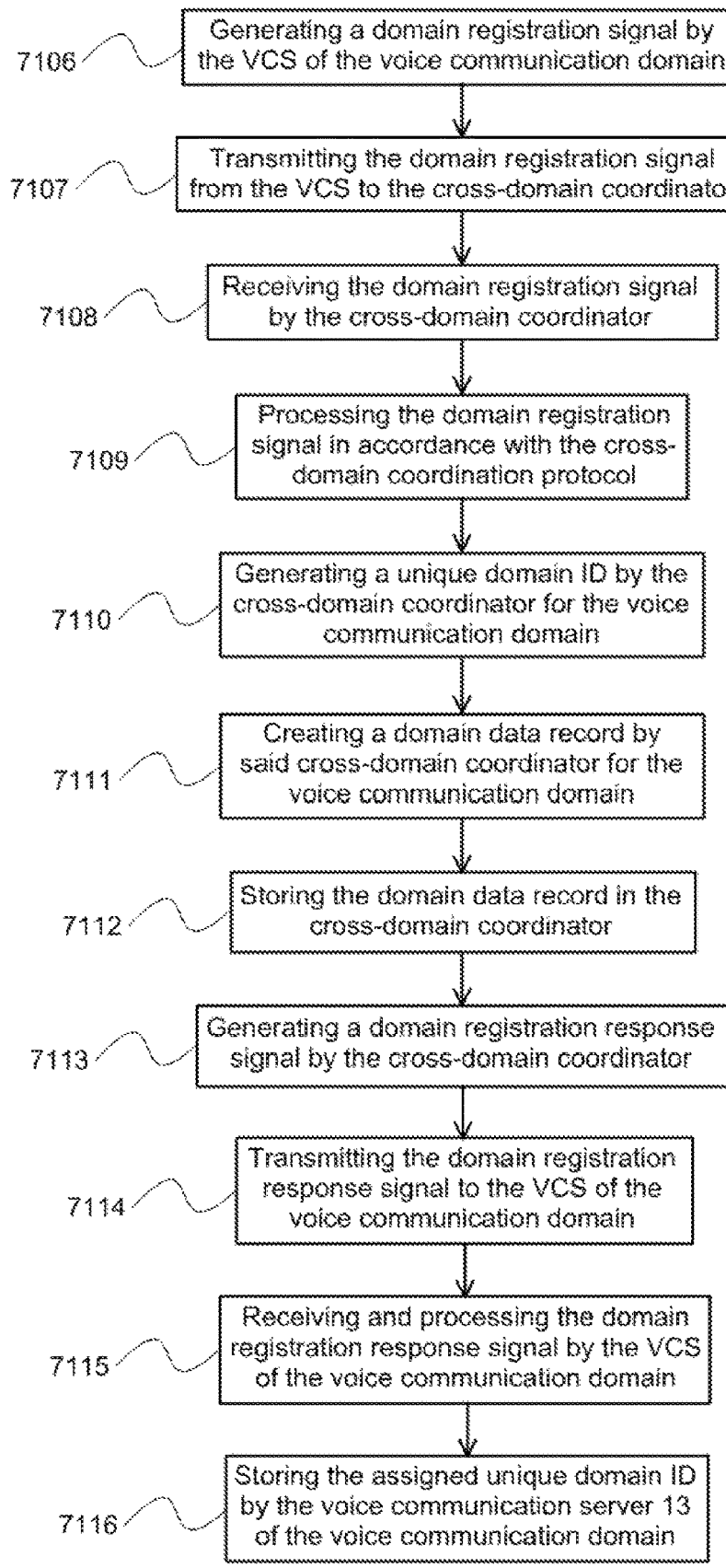
FIG. 9 illustrates a schematic flowchart diagram for the registering of the voice communication domain within the voice communication system, according to some embodiments of the present invention.

Referring to FIGS. 1 and 9 together, a schematic flowchart diagram for the registering (Block 7102) of the voice communication domain 1 within the voice communication system 10 is illustrated, according to some embodiments of the present invention. The registering of the voice communication domain 1 includes generating (Block 7106) a domain registration signal by the voice communication server 13 of the voice communication domain 1. The domain registration signal carries a request for registration of the voice communication domain 1 within the voice communication system 10. Then, the domain registration signal is transmitted (Block 7107) to the cross-domain coordinator 2 over the Internet 3.

The cross-domain coordinator 2 receives (Block 7108) the domain registration signal from the voice communication server 13 of the voice communication domain 1, and processes (Block 7109) the domain registration signal in accordance with the cross-domain coordination protocol in order to extract the request for registration of the voice communication domain 1. Then, the cross-domain coordinator 2 generates (Block 7110) a unique domain ID for the voice communication domain 1, and creates (Block 7111) a domain data record. The domain data record can include the unique domain ID for the domain 1 and/or a reference to an active transport link of a TCP/IP protocol between the voice communication server 13 and cross-domain coordinator 2. Such domain data record is stored (Block 7112) in the cross-domain coordinator 2.

The registering of the voice communication domain 1 also includes generating (Block 7113) a domain registration response signal by the cross-domain coordinator 2, in accordance with the cross-domain coordination protocol. The domain registration response signal can carry information about a status of the domain registration and the assigned unique domain ID of the registered domain. Then, the domain registration response signal is transmitted (Block 7114) to the voice communication server 13 of the voice communication domain 1.

The voice communication server 13 of the voice communication domain 1 receives (Block 7115) the domain registration response signal, and processes the domain registration response signal in accordance with the cross-domain coordination protocol in order to extract information about the status of the domain registration and the assigned unique domain ID of the registered domain 1. The voice communication server 13 of the voice communication domain 1 stores (Block 7116) the assigned unique domain ID.

According to some embodiment of the present invention, the registering (Block 7103) of the users 11 in the system 10 for each user includes: registering the user 11 in the voice communication server 13 of the corresponding voice communication domain 1, and registering the user 11 in the cross-domain coordinator 2. The registering of the user 11 in the voice communication server 13 of the corresponding voice communication domain 1 is performed in order to provide user voice communications within the voice communication domain 1. The registering of the user 11 in the cross-domain coordinator 2 is performed to provide user voice communications across the voice communication domains 1.

Figure 10:
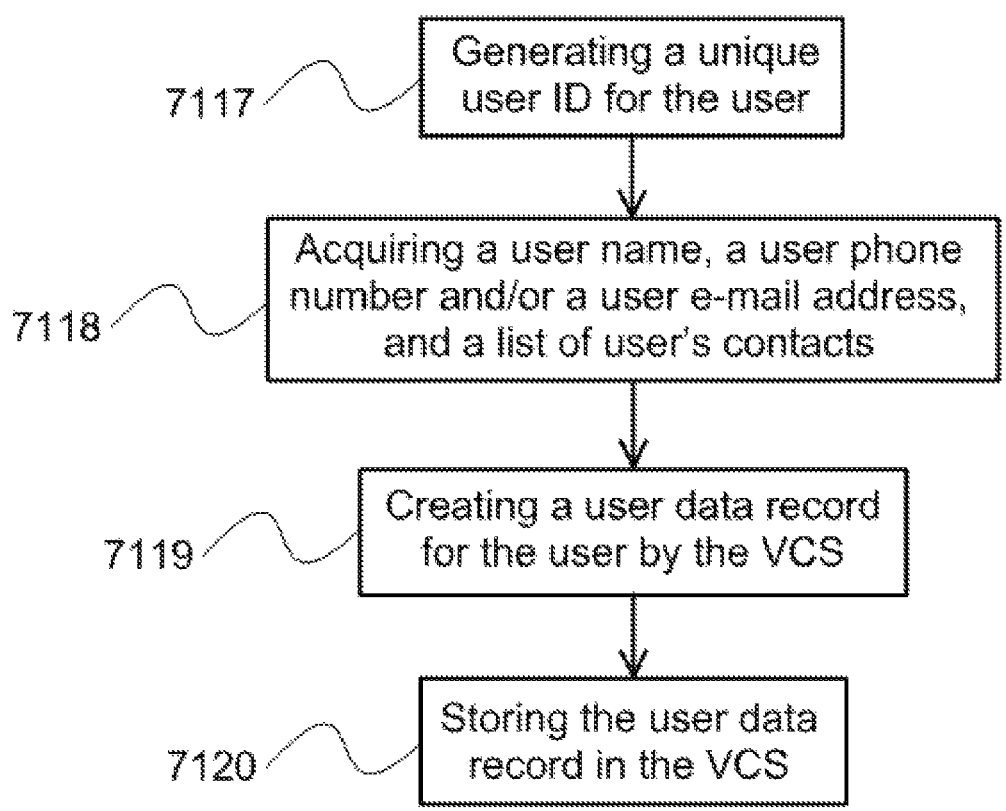
FIG. 10 illustrates a schematic flowchart diagram for the registering of the user in the voice communication server of the corresponding voice communication domain is illustrated, according to some embodiments of the present invention.

Referring to FIGS. 1 and 10 together, a schematic flowchart diagram for the registering of the user 11 in the voice communication server 13 of the corresponding voice communication domain 1 is illustrated, according to some embodiments of the present invention. The registering of the user 11 in the voice communication server 13 includes generating (Block 7117) a unique user ID for the user 11, and acquiring (Block 7118) from the user a user name, a user phone number and/or a user e-mail address, and a list of user's contacts. The list of user's contacts can include names of other users, and phone numbers of the other users and/or e-mail addresses of other users.

The registering of the user 11 in the voice communication server 13 also includes creating (Block 7119) a user data record for the user 11 by the voice communication server 13. The user data record representing the user information that cam include the unique user ID for the user 11 and the user name, the user phone number and/or the user e-mail address, and the list of user's contacts acquired from the user. The user data record is stored (Block 7120) in the voice communication server 13 of the voice communication domain 1.

Figure 11:
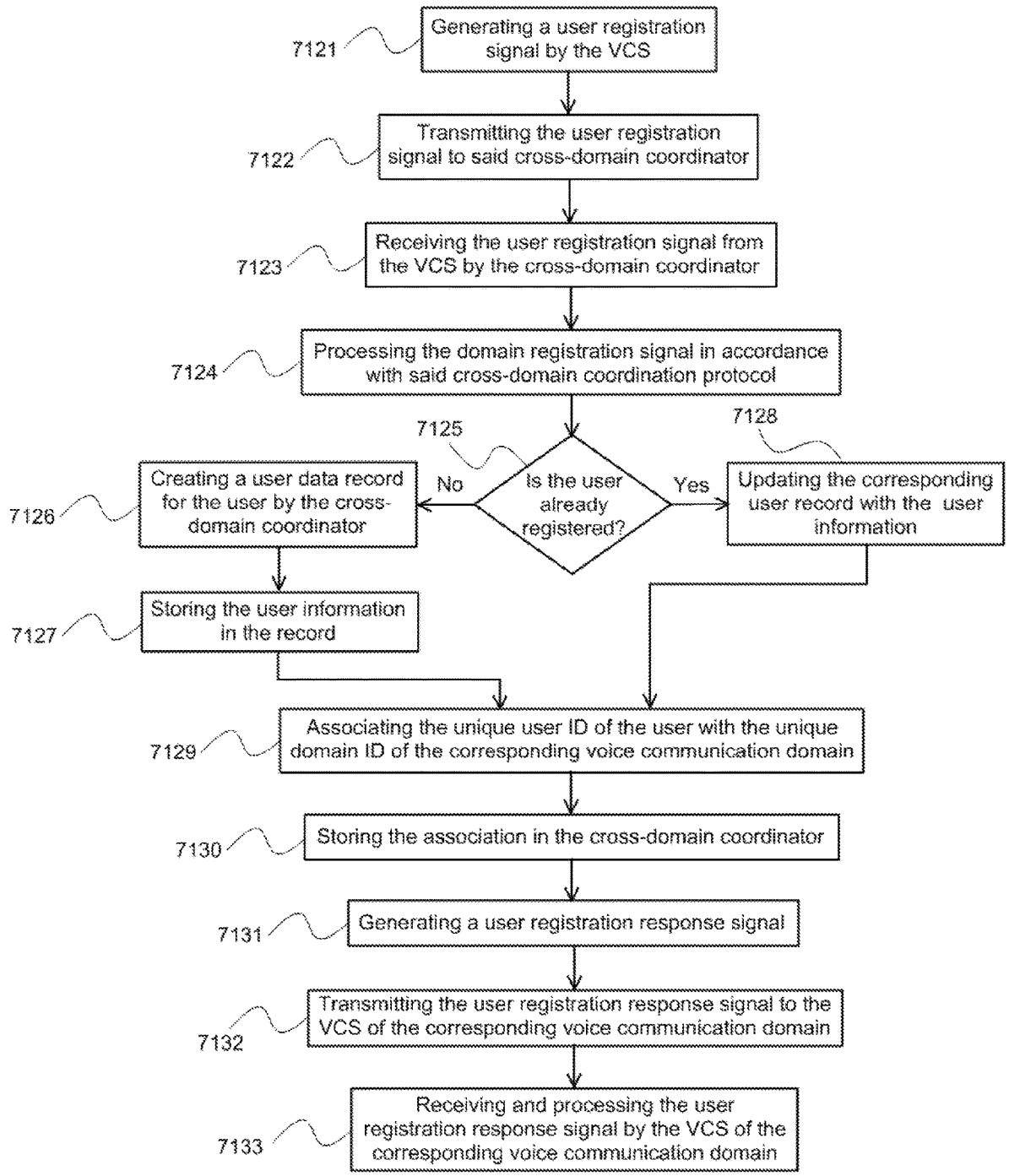
FIG. 11 illustrates a schematic flowchart diagram for the registering of the user in said cross-domain coordinator, according to some embodiments of the present invention.

Referring to FIGS. 1 and 11 together, a schematic flowchart diagram for the registering of the user 11 in the cross-domain coordinator 2 is illustrated, according to some embodiments of the present invention. The registering of the user 11 in the cross-domain coordinator 2 includes generating (Block 7121) a user registration signal by the voice communication server 13 of the voice communication domain 1 indicative of a request for registration of the user 11 of the voice communication domain within the voice communication system 10. The user registration signal carries user information including the unique domain ID of the voice communication domain 1, the unique user ID of the user 11, and the user phone number and/or the user e-mail address. Then, the user registration signal is transmitted (Block 7122) to the cross-domain coordinator 2 over the Internet.

The cross-domain coordinator 2 receives (Block 7123) the user registration signal from the voice communication server 13 of the voice communication domain 1, and processes (Block 7124) the domain registration signal in accordance with the cross-domain coordination protocol in order to extract the user information from the user registration signal. The cross-domain coordinator 2 checks (Block 7125) whether the user is already registered within the system.

Accordingly, if the user is not registered yet, a corresponding user data record for the user 11 in the cross-domain coordinator 2 is created (Block 7126). The extracted user information is added to this created user data record and stored (Block 7127) in the cross-domain coordinator 2. The unique user ID of the user 11 is associated (Block 7129) with the unique domain ID of the corresponding voice communication domain 1. This association is also stored (Block 7130) in the cross-domain coordinator 2.

However, if the user 11 is already registered within the system, the corresponding user record is updated with the extracted user information (Block 7128) in the cross-domain coordinator 2. Then, the unique user ID of the user 11 is associated (Block 7129) with the unique domain ID number of the corresponding voice communication domain 1, and the association is stored (Block 7130) in the cross-domain coordinator 2.

Then, the cross-domain coordinator 2 generates (Block 7131) a user registration response signal in accordance with the cross-domain coordination protocol. The user registration response signal carries information about a status of the user registration. The status can for example, be "Ok", which denotes that the user 11 registration within the voice communication system 10 completed successfully or "Failed", which denotes that the user 11 registration within the voice communication system 10 is failed due to some reasons. A possible reason of the user registration failure can, for example, be provided in an additional text description, which can be added to the status data.). The user registration response signal is transmitted (Block 7132) to the voice communication server 13 of the corresponding voice communication domain 1.

The voice communication server 13 of the corresponding voice communication domain 1 receives (Block 7133) the user registration response signal and processes (Block 7133) the user registration response signal in accordance with the cross-domain coordination protocol in order to extract information about the status of the user registration.

According to some embodiments of the present invention, the providing (Block 80) of the voice communications between the sender user (e.g. User No. 1 in FIG. 1) and the recipient user (e.g. User No. 2 in FIG. 1) of the same the voice communication domain 1, includes at least one of the following actions: (i) establishing a local voice call between the sender PCD 12 and the recipient PCD 12, (ii) terminating the local voice call between the sender and recipient PCDs 12, and (iii) dispatching a local voice message from the sender PCD to the recipient PCD.

Figure 15:
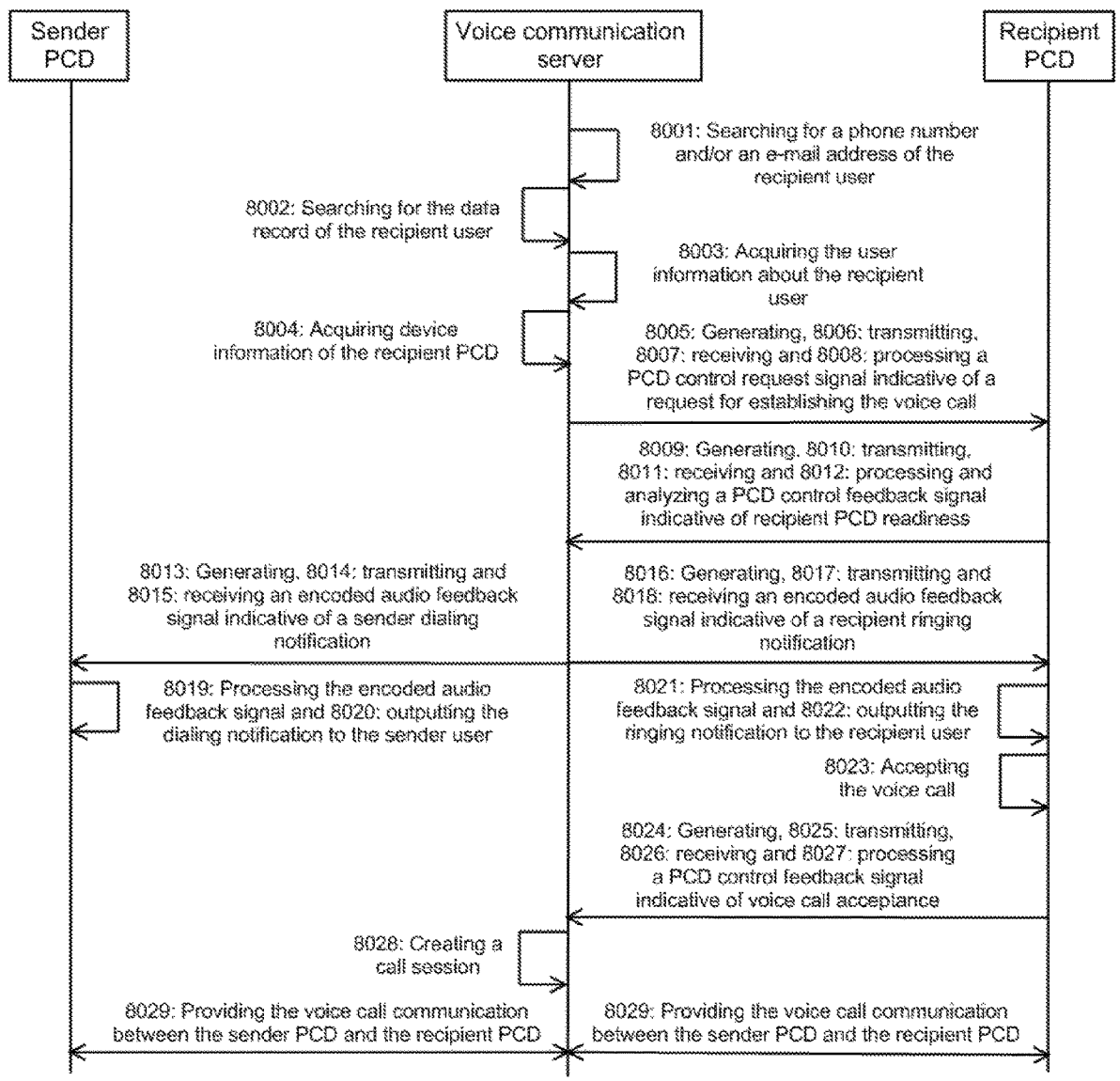
FIG. 15 illustrates a schematic sequence diagram for the establishing of the local voice call between the sender PCD and the recipient PCD is illustrated, according to some embodiments of the present invention.

Referring to FIGS. 1 and 15 together, a schematic sequence diagram for the establishing of the local voice call between the sender PCD and the recipient PCD is illustrated in FIG. 15, according to some embodiments of the present invention. The establishing of the local voice call starts from searching (Step 8001), at the voice communication server 13, for a phone number and/or an e-mail address of the recipient user in the list of user's contacts of the sender user by using a name or an alias of the recipient user provided by the corresponding voice command of the sender user.

The establishing of the local voice call also includes searching (Step 8002), at the voice communication server 13, for a data record of the recipient user within a set of the user data records of the users 11 registered in the voice communication domain 1. This searching (Step 8002), at the voice communication server 13, is carried out by using the phone number and/or the e-mail address of the recipient user that was found within the list of user's contacts included in the user data record of the sender user 11. Then, the user information about the recipient user is acquired (Step 8003) from the data record of the recipient user by the voice communication server 13 of the voice communication domain 1. The user information can include: the unique recipient user ID, the recipient user name, and the recipient user phone number and/or the recipient user e-mail address.

Then, the device information of the recipient PCD 12 associated with the recipient user 11 is acquired (Step 8004) by the voice communication server 13. The device information can include: the unique recipient device ID of the recipient PCD, and the current local IP address of the recipient PCD within the local area communication network 8.

Further, a PCD control request signal is generated (Step 8005) by the voice communication server 13, in accordance with a PCD control protocol. The PCD control request signal is indicative of a request for establishing the local voice call. The PCD control request signal is transmitted (Step 8006) from the voice communication server 13 to the recipient PCD over the local area communication network 8 by using the current local IP address of the recipient PCD.

Then, the PCD control request signal is received (Step 8007) and processed (Step 8008) by the recipient PCD. In response to the PCD control request signal, the recipient PCD generates (Step 8009) a PCD control feedback signal indicative of a status of readiness of the recipient PCD for receiving the local voice call. The recipient PCD transmits (Step 8010) the PCD control feedback signal to the voice communication server 13.

Then, the PCD control feedback signal is received (Step 8011), processed (Step 8012) and analyzed (Step 8012) by the voice communication server 13. The PCD control feedback signal is indicative of the status of readiness of the recipient PCD to receive the local voice call.

If the status indicates that the recipient PCD 12 is ready for receiving the voice call, the voice communication server 13 generates (Steps 8013 and 8016) encoded audio feedback signals indicative of a sender dialing notification (for indicating, at the sender PCD, about the initiation of the local voice call) and a recipient ringing notification (for alerting the recipient PCD of the local voice call). The corresponding encoded audio feedback signal carrying the dialing notification is transmitted (Step 8014) to the sender PCD, while the corresponding encoded audio feedback signal carrying the recipient ringing notification is transmitted (Step 8017) to the recipient PCD.

The corresponding encoded audio feedback signal carrying the sender dialing notification is received (Step 8015) and processed (Step 8019) by the sender PCD, while the corresponding encoded audio feedback signal carrying the recipient ringing notification is received (Step 8018) and processed (Step 8021) by the recipient PCD. The sender dialing notification is outputted (Step 8020) in a sound form to the sender user by the sender PCD, while the recipient ringing notification is outputted (Step 8022) in a sound form to the recipient user by the recipient PCD.

The recipient user of the recipient PCD can either accept (Step 8023) or decline (Step 8030) the local voice call by responding to the ringing notification in accordance with a corresponding interaction of the recipient user with the recipient PCD.

Specifically, if the local voice call is accepted by the recipient user, the corresponding PCD control feedback signal is generated (Step 8024) by the recipient PCD in accordance with the PCD control protocol. The PCD control feedback signal is indicative of the acceptance of the local voice call. This PCD control feedback signal is transmitted (Step 8025) to the voice communication server 13. The voice communication server 13 receives (Step 8026) the PCD control feedback signal and processes (Step 8027) this PCD control feedback signal in accordance with the PCD control protocol in order to extract indication of the acceptance of the local voice call by the recipient user.

In response to the acceptance of the local voice call, the voice communication server 13 creates (Step 8028) a call session object that can include the user information about the sender user and the sender PCD, the user information about the recipient user, and the device information about the recipient PCD.

Then, the local voice call communication between the sender PCD and the recipient PCD is provided (Step 8029).

According to some embodiments of the present invention, in the forward direction from the sender PCD to the recipient PCD, the providing of the local voice call communication includes transmitting the encoded voice communication signals from the sender PCD to the voice communication server 13 over the local area communication network. The voice communication server 13 receives the encoded voice communication signals and forwards the encoded voice communication signals to the recipient PCD over the local area communication network 8. The recipient PCD receives the encoded voice communication signals from the voice communication server 13, and processes the encoded voice communications signal in order to restore the original voice communication signals of the sender user provided verbally. Then, the recipient PCD outputs the original voice communication signals to the recipient user in a sound form.

According to some embodiments of the present invention, in the backward direction from the recipient PCD to the sender PCD, the providing of the local voice call communication includes transmitting the encoded voice communication signals from the recipient PCD to the voice communication server 13 over the local area communication network 8. The voice communication server 13 receives the encoded voice communication signals, and forwards the encoded voice communication signals to the sender PCD over the local area communication network 8. Then, the sender PCD receives the encoded voice communication signals from the voice communication server 13, and processes the encoded voice communication signals in order to restore the original voice communication signals of the recipient user provided verbally. The original voice communication signals are outputted in a sound form to the sender user by the sender PCD.

Figure 16:
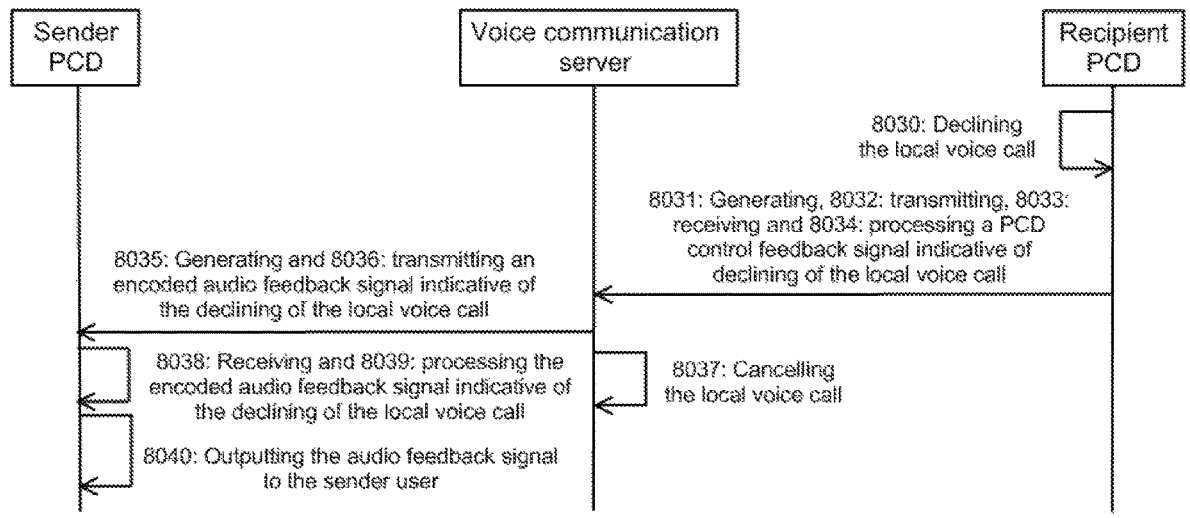
FIG. 16 illustrates a schematic sequence diagram for declining by the recipient user the local voice call between the sender PCD and the recipient PCD, according to some embodiments of the present invention.

Referring to FIGS. 1, 15 and 16 together, a schematic sequence diagram for declining (Step 8030 in FIG. 15), by the recipient user in response to the ringing notification, the local voice call between the sender PCD and the recipient PCD is illustrated in FIG. 16, according to some embodiments of the present invention. Accordingly, if the local voice call is declined (Step 8030) by the recipient user, the recipient PCD generates (Step 8031) a PCD control feedback signal, in accordance with the PCD control protocol. The PCD control feedback signal is indicative of the declining of the local voice call. The PCD control feedback signal is transmitted (Step 8032) from the recipient PCD to the voice communication server 13 of the voice communication domain 1. The voice communication server 13 receives (Step 8033) the PCD control feedback signal and processes (Step 8034) the PCD control feedback signal in accordance with the PCD control protocol in order to extract the information about the declining of the local voice call by the recipient user. In response to the information about the declining of the local voice call by the recipient user, the voice communication server 13 generates (Step 8035), for the sender user, an encoded audio feedback signal indicative of the declining of the local voice call. This generated encoded audio feedback signal is transmitted (Step 8036) from the voice communication server 13 to the sender PCD over the local area communication network 8.

Moreover, the voice communication server 13 cancels (Step 8037) the call by disregarding the information about the sender and the recipient users, which was acquired for establishment of the local voice call.

The sender PCD receives (Step 8038) the encoded audio feedback signal indicative of the declining of the local voice call, processes (Step 8039) the encoded audio feedback signal to decode the encoded audio feedback signal. Then, an audio feedback signal (obtained from decoding the encoded audio feedback signal) is outputted (Step 8040) in a sound form to the sender user. The audio feedback signal is indicative of the declining of the local voice call to the sender user.

Figure 17:
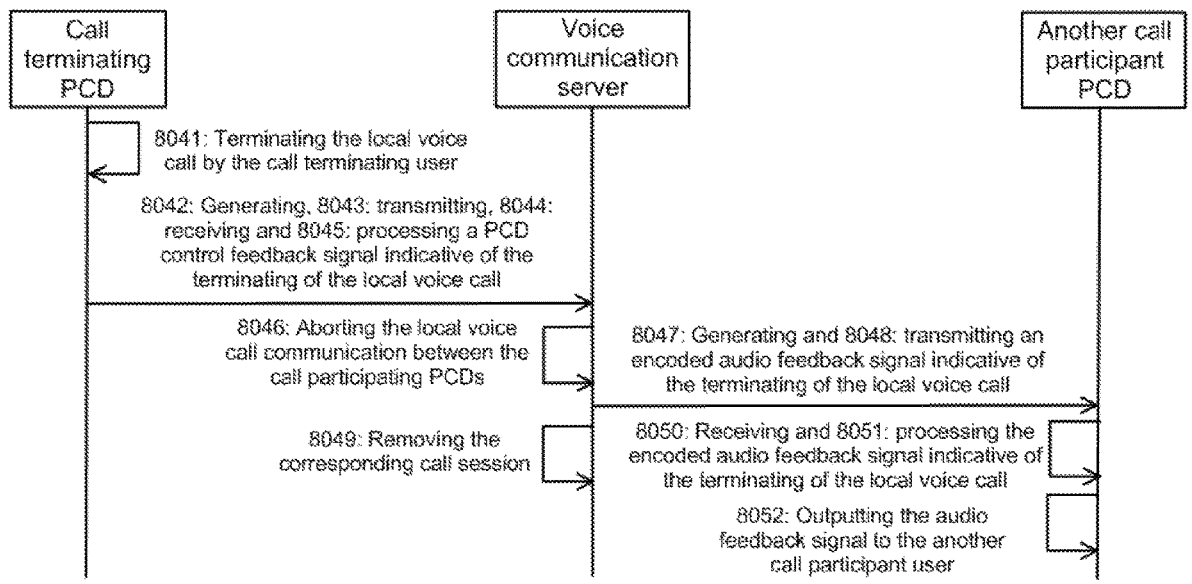
FIG. 17 illustrates a schematic sequence diagram for termination the local voice call between the sender recipient PCDs by a call terminating user, according to some embodiments of the present invention.

Referring to FIGS. 1 and 17 together, a schematic sequence diagram for termination the local voice call between the sender and the recipient PCDs by a call terminating user according to some embodiments of the present invention, is illustrated in FIG. 17.

It should be understood that either the sender user or the recipient user can terminate the local call. The call terminating user can terminate (Step 8041) the local voice call between a call terminating PCD and another call participant PCD via the voice communication server 13 at any moment during their communication. The call termination can be performed in accordance with a corresponding interaction of the call terminating user with the call terminating PCD. For example, the termination can be a result of pressing the button of the manual trigger (1201 in FIG. 4) Likewise, the termination can be just a result of uttering the corresponding command by the call terminating user during the communication.

In response to the interaction of the call terminating user, the call terminating PCD generates (Step 8042) a PCD control feedback signal, in accordance with the PCD control protocol. The PCD control feedback signal is indicative of the terminating of the local voice call. The call terminating PCD transmits (Step 8043) the PCD control feedback signal to the voice communication server 13 of the voice communication domain 1. The voice communication server 13 receives (Step 8044) the PCD control feedback signal, and processes (Step 8045) the PCD control feedback signal in accordance with the PCD control protocol in order to extract information about the terminating of the local voice call by the call terminating user. In response to the extracted information about the terminating of the local voice call by the call terminating user, the voice communication server 13 aborts (Step 8046) the local voice call communication between the call terminating PCD and another call participant PCD, and removes (Step 8049) the corresponding call session object with the corresponding information about the call participants from the voice communication server 13.

According to some embodiments of the present invention, the terminating the local voice call between the PCDs 12, before aborting the local voice call communication, further includes generating (Step 8047), by the voice communication server 13, an encoded audio feedback signal indicative of the terminating of the local voice call for another call participant user associated with this another call participant PCD. The voice communication server 13 transmits (Step 8048) the generated encoded audio feedback signal to the another call participant PCD over the local area communication network 8. The another call participant PCD receives (Step 8050) the encoded audio feedback signal indicative of the terminating of the local voice call, and processes (Step 8051) the encoded audio feedback signal in order to decode the encoded audio feedback signal to restore an original audio feedback signal. Finally, the audio feedback signal, which is obtained from decoding the encoded audio feedback signal, is outputted (Step 8052) to the another call participant user in a sound form. The audio feedback signal is indicative of the terminating of the local voice call.

Figure 18:
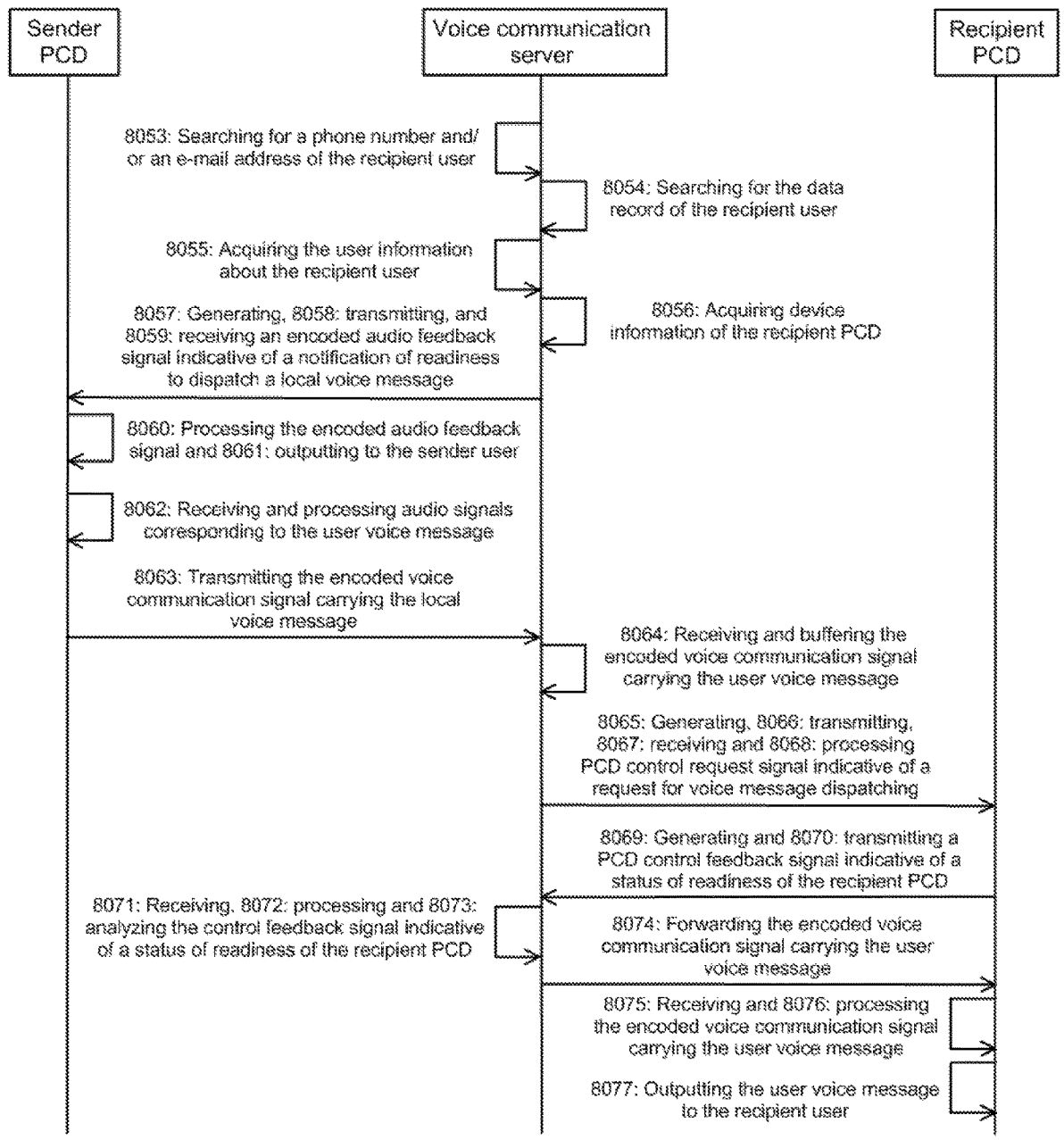
FIG. 18 illustrates a schematic sequence diagram for the dispatching of the local voice message from the sender PCD to the at least one recipient PCD, according to some embodiments of the present invention.

Referring to FIGS. 1 and 18 together, a schematic sequence diagram for the dispatching of the local voice message from the sender PCD to the at least one recipient PCD is illustrated in FIG. 18, according to some embodiments of the present invention. The dispatching of the local voice message starts from searching (Step 8053) for the phone number and the e-mail address of the recipient user within the list of user's contacts of the sender user by the voice communication server 13 by using the name or the alias of a recipient user provided in the corresponding voice command.

The dispatching of the local voice message also includes searching (Step 8054), at the voice communication server 13, for the data record of the recipient user among the user data records of the users 11 registered in the voice communication domain 1 on basis of the phone number and/or the e-mail address of the recipient user found within the list of user's contacts of the sender user.

Then, the voice communication server 13 of the voice communication domain 1 acquires (Step 8055) the user information about the recipient user from the found data record of the recipient user. For example, the user information can include: the unique recipient user ID, the recipient user name, and the recipient user phone number and/or the recipient user e-mail address. The voice communication server 13 also acquires (Step 8056) device information of the recipient PCD associated with the recipient user. For example, the device information can include the unique recipient device ID, and the current local IP address of the recipient PCD within the local area communication network 8.

Then, the voice communication server 13 generates (Step 8057) an encoded audio feedback signal. The encoded audio feedback signal is indicative of a notification for sender user of readiness of the voice communication server to dispatch a voice message. Thereafter, the voice communication server 13 transmits (Step 8058) the encoded audio feedback signal to the sender PCD over the local area communication network 8.

The sender PCD receives (Step 8059) the encoded audio feedback signal indicative of the notification of readiness, and processes (Step 8060) the encoded audio feedback signal to decode the audio feedback signal. Further, the sender PCD outputs (Step 8061) the audio feedback signal indicating the readiness to dispatch a voice message to the sender user in a sound form.

After receiving the sound of audio feedback signal, the user utters the voice message to the microphone system of the sender PCD. The sender PCD receives (Step 8062) audio signals that include a voice communication signal carrying the voice message of the sender user, and processes (Step 8062) the audio signals in order to generate a corresponding encoded voice communication signal. The corresponding encoded voice communication signal carries the local voice message.

Then, the sender PCD transmits (Step 8063) the corresponding encoded voice communication signal to the voice communication server 13 over the local area communication network 8.

The voice communication server 13 receives and buffers (Step 8064) the encoded voice communication signal and then generates (Step 8065) the PCD control request signal in accordance with PCD control protocol. The PCD control request signal being indicative of a request for the local voice message dispatching.

Thereafter, the voice communication server 13 transmits (Step 8066) the generated PCD control request signal to the recipient PCD over the local area communication network.

The recipient PCD in, its turn, receives (Step 8067) and processes (Step 8068) the PCD control request signal from the voice communication server 13.

In response to the PCD control request signal the recipient PCD generates (Step 8069) a PCD control feedback signal indicative of a status of readiness to receive the voice message. The status of readiness includes indication of readiness or non-readiness of the recipient PCD to receive the voice message.

Then the recipient PCD transmits (Step 8070) the generated PCD control feedback signal to the voice communication server 13.

The voice communication server 13 receives (Step 8071), processes (Step 8072) and analyzes (Step 8073) the PCD control feedback signal. If the recipient PCD is ready to receive the voice message, the voice communication server 13 forwards (Step 8074) the buffered encoded voice communication signal carrying the voice message to the recipient PCD over the local area communication network 8.

The recipient PCD, in its turn, receives (Step 8075) the corresponding encoded voice communication signal carrying the voice message from the voice communication server 13 and processes (Step 8076) the received corresponding encoded voice communication signal to decode it and restore the original voice message originated by the sender user. Finally, the recipient PCD outputs (Step 8077) the restored voice message to the recipient user in a sound form.

According to some embodiments of the present invention, the providing (Block 81) of the voice communications between a sender user of a sender domain (e.g., domain No. 1 in FIG. 1) and a recipient user of a recipient domain (e.g., domain No. 1 in FIG. 1) includes at least one of the following actions: (i) establishing a cross-domain voice call between the sender PCD of the sender domain and the at least one recipient PCD of the recipient domain, (ii) terminating the cross-domain voice call between the sender PCD of the sender domain and the at least one recipient PCD of the recipient domain; and (iii) dispatching a cross-domain voice message from the sender PCD of the sender domain and the at least one recipient PCD of the recipient domain.

Figure 19:
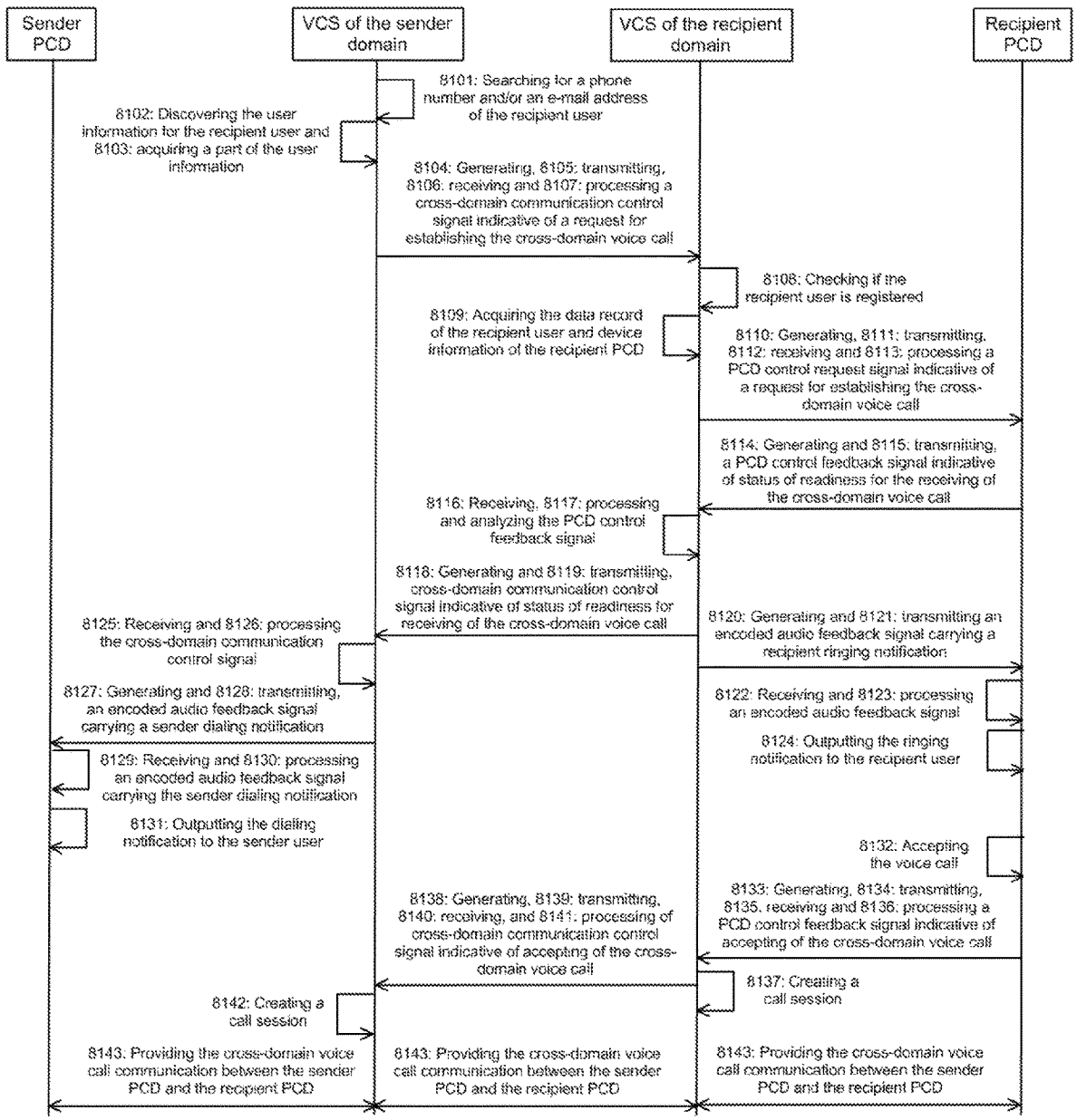
FIG. 19 illustrates a schematic sequence diagram for the establishing of the cross-domain voice call between the sender PCD of the sender domain associated with the sender user and the at least one recipient PCD of the recipient domain associated with the recipient user and the recipient PCD, according to some embodiments of the present invention.

Referring to FIGS. 1 and 19 together, a schematic sequence diagram for the establishing of the cross-domain voice call between the sender PCD of the sender domain associated with the sender user and the at least one recipient PCD of the recipient domain associated with the recipient user and the recipient PCD is illustrated in FIG. 19, according to some embodiments of the present invention.

The establishing of the cross-domain voice call starts from searching (Step 8101), by the voice communication server of the sender domain in the list of the user's contacts of the user data record associated with the sender user, for the phone number and/or the e-mail address of the recipient user. The searching is conducted by using the name or the alias of the recipient user as a search parameter. The name or the alias is provided by the corresponding voice command of the sender user.

The establishing of the cross-domain voice call also include discovering (Step 8102), in the cross-domain coordinator 2, the user information for the recipient user registered in the recipient domain by using the previously found phone number and/or the found e-mail address of the recipient user as the discovery parameters and then acquiring (Step 8103) a part of the recipient user information from the discovered user information. This part of the recipient user information is necessary for establishing the cross-domain voice call. This part of the recipient user information includes: the unique user ID of the recipient user, the unique domain ID of the recipient domain, and the current Internet address of the voice communication server of the recipient domain.

After discovering and acquiring all the necessary user information about the recipient user, the voice communication server of the sender domain generates (Step 8104) a cross-domain communication control signal in accordance with the cross-domain communication control protocol. This cross-domain communication control signal is indicative of a request for establishing the cross-domain voice call. The request includes at least the unique user ID of the recipient user.

Then the voice communication server of the sender domain transmits (Step 8105) the generated cross-domain communication control signal to the voice communication server of the recipient domain over the Internet 3. The transmitting is performed by using the current Internet address of the voice communication server of the recipient domain.

The voice communication server of the recipient domain, in its turn, receives (Step 8106) the cross-domain communication control signal and processes (Step 8107) this signal in accordance with the cross-domain communication control protocol in order to extract information about the request for establishing the cross-domain voice call.

In response to the request for establishing the cross-domain voice call, the voice communication server of the recipient domain checks (Step 8108) that the recipient user is registered with the recipient domain. If the recipient user is registered, with the recipient domain, than the voice communication server of the recipient domain acquires (Step 8109) a data record of the recipient user and a device information of the recipient PCD associated with the recipient user. The device information includes the unique recipient device ID and the current local IP address of the recipient PCD within the local area communication network 8 of the recipient domain.

Then the voice communication server of the recipient domain generates (Step 8110) a PCD control request signal in accordance with the PCD control protocol by using the acquired unique recipient device ID. This PCD control request signal is indicative of a request for establishing the incoming cross-domain voice call.

Thereafter, the voice communication server of the recipient domain transmits (Step 8111) the generated PCD control request signal to the recipient PCD over the local area communication network 8 within the recipient domain. The transmission if performed using the current local IP address of the recipient PCD.

The recipient PCD, in its turn, receives (Step 8112) and processes (Step 8113) the aforementioned PCD control request signal and generates (Step 8114) a PCD control feedback signal indicative of a status of readiness of the recipient PCD for the receiving of the incoming cross-domain voice call. The status of readiness includes indication of readiness or non-readiness of the recipient PCD to receive the incoming cross-domain voice call.

Thereafter the recipient PCD transmits (Step 8115) the generated PCD control feedback signal back to the voice communication server of the recipient domain.

The voice communication server of the recipient domain, in its turn, receives (Step 8116) and processes (Step 8117) the PCD control feedback signal, and analyzes (Step 8117) the status of readiness of the recipient PCD for receiving the cross-domain voice call. If the recipient PCD is ready for receiving the voice call, then the voice communication server of the recipient domain generates (Step 8118) a cross-domain communication control signal indicative of the status of readiness of the recipient PCD to receive the cross-domain voice call.

Thereafter the voice communication server of the recipient domain transmits (Step 8119) the generated cross-domain communication control signal to the voice communication server of the sender domain over the Internet 3. Simultaneously, the voice communication server of the recipient domain generates (Step 8120) an encoded audio feedback signal carrying a recipient ringing notification to alert the recipient user of the incoming cross-domain voice call and transmits (Step 8121) the generated encoded audio feedback signal to the recipient PCD over the local area communication network 8 within the recipient domain.

The recipient PCD receives (Step 8122) and processes (Step 8123) the corresponding encoded audio feedback signal carrying the recipient ringing notification, and then outputs (Step 8124) the recipient ringing notification to the recipient user in a sound form.

Meanwhile, the voice communication server of the sender domain receives (Step 8125) the cross-domain communication control signal indicative of the status of readiness of the recipient PCD to receive the cross-domain voice call.

Then, the voice communication server of the sender domain processes (Step 8126) the received cross-domain communication control signal in accordance with the cross-domain communication control protocol in order to extract the information about the status of readiness of the recipient PCD to receive the incoming cross-domain voice call.

In response to the information about the status of readiness of the recipient PCD to receive the incoming cross-domain voice call, the voice communication server of the sender domain generates (Step 8127) an encoded audio feedback signal carrying a sender dialing notification of the cross-cross-domain voice call.

Thereafter, the voice communication server of the sender domain transmits (Step 8128) the generated encoded audio feedback signal to the sender PCD over the local area communication network 8 within the sender domain.

The sender PCD, in its turn, receives (Step 8129) and processes (Step 8130) the corresponding encoded audio feedback signal carrying the sender dialing notification, and then, outputs (Step 8131) the sender dialing notification to the sender user in a sound form.

The recipient user can either accept (Step 8132) or decline (Step 8144) the incoming cross-domain voice call by responding to the ringing notification in accordance with a corresponding interaction with the recipient PCD.

Specifically, if the cross-domain voice call is accepted by the recipient user, then the recipient PCD generates (Step 8133) a PCD control feedback signal in accordance with the PCD control protocol. The PCD control feedback signal is indicative of the accepting of the cross-domain voice call.

Thereafter, the recipient PCD transmits (Step 8134) the generated PCD control feedback signal to the voice communication server of the recipient domain.

The voice communication server of the recipient domain, in its turn, receives (Step 8135) and processes (Step 8136) the PCD control feedback signal in accordance with the PCD control protocol in order to extract the information about the accepting of the cross-domain voice call by the recipient user.

In response to the accepting of the cross-domain voice call by the recipient user, the voice communication server of the recipient domain generates (Step 8138) a corresponding cross-domain communication control signal in accordance with the cross-domain communication control protocol. This cross-domain communication control signal is indicative of the accepting of the cross-domain voice call.

Then the voice communication server of the recipient domain transmits (Step 8139) the generated cross-domain communication control signal to the voice communication server of the sender domain over the Internet 3, and creates (Step 8137) a call session object at the voice communication server of the recipient domain. The call session object includes the information about the sender user, the sender domain, the recipient user and the recipient PCD, participating in the cross-domain voice call.

Meanwhile, the voice communication server of the sender domain receives (Step 8140) the cross-domain communication control signal indicative of the accepting of the cross-domain voice call, and processes (Step 8141) this signal in accordance with the cross-domain communication control protocol in order to extract the information about the accepting of the cross-domain voice call.

In response to the accepting of the cross-domain voice call, the voice communication server of the sender domain creates (Step 8142) a call session object. This call session object includes the information about the sender user, the sender PCD, the recipient user and the recipient domain, participating in the cross-domain voice call.

Finally, a cross-domain voice call communication is provided (Step 8143) between the sender PCD of the sender domain and the recipient PCD of the recipient domain by exchanging the encoded voice communication signals between the sender PCD, the voice communication server of the sender domain, the voice communication server of the recipient domain, and the recipient PCD.

Figure 20:
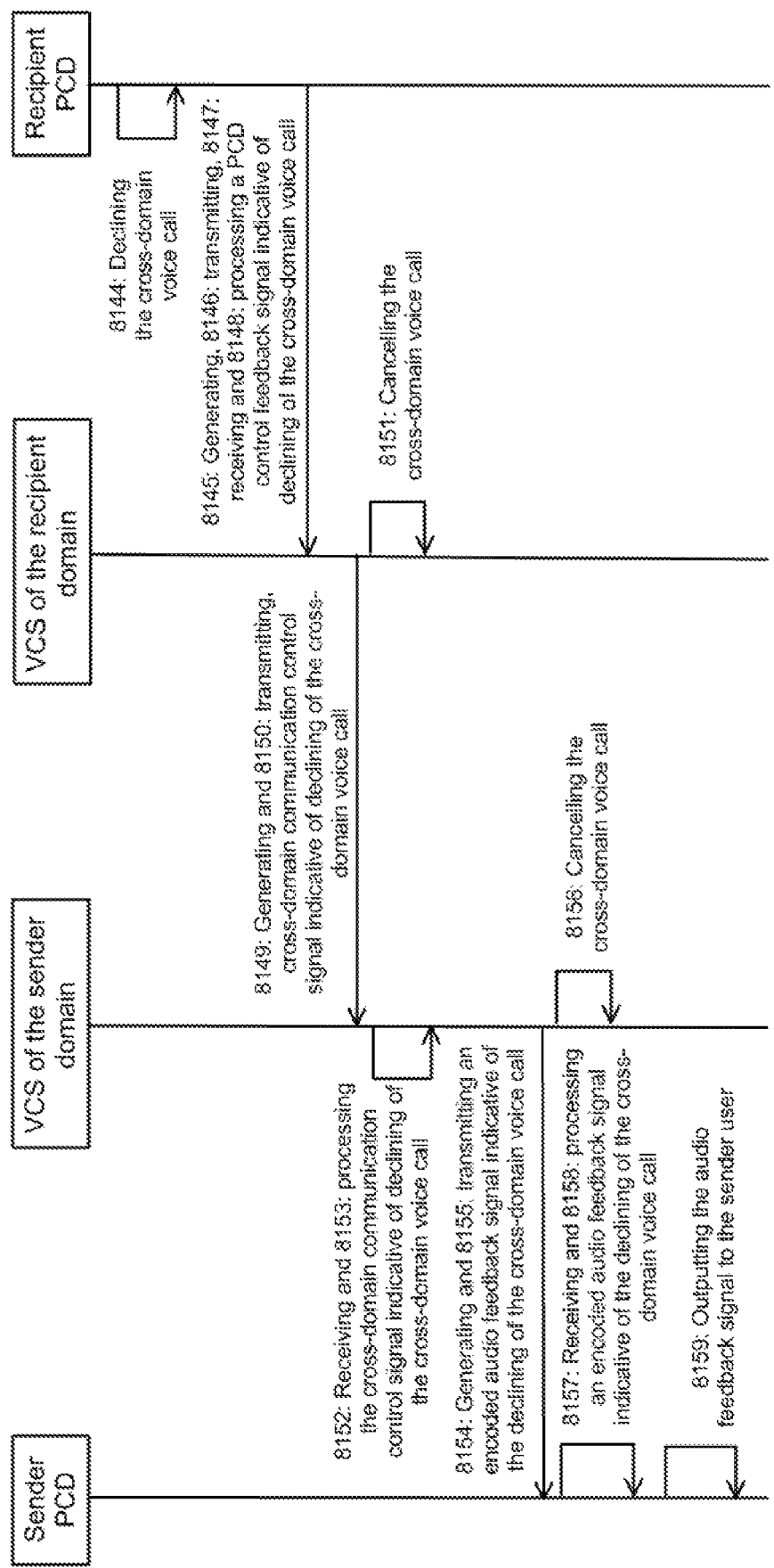
FIG. 20 illustrates a schematic sequence diagram for declining (Step 8144) the cross-domain voice call between the sender PCD and the recipient PCD by the recipient user of the recipient domain in response to the ringing notification, according to some embodiments of the present invention.

Referring to FIGS. 1, 19 and 20 together, a schematic sequence diagram for declining (Step 8144) the cross-domain voice call between the sender PCD and the recipient PCD by the recipient user of the recipient domain in response to the ringing notification is illustrated in FIG. 20, according to some embodiments of the present invention. Accordingly, if the cross-domain voice call is declined (Step 8144) by the recipient user the recipient PCD generates (Step 8145) a PCD control feedback signal in accordance with the PCD control protocol. The PCD control feedback signal is indicative of the declining of the cross-domain voice call.

Thereafter, the recipient PCD transmits (Step 8146) the generated PCD control feedback signal to the voice communication server of the recipient domain.

The voice communication server of the recipient domain, in its turn, receives (Step 8147) the PCD control feedback signal indicative of the declining of the cross-domain voice call, and processes (Step 8148) this signal in accordance with the PCD control protocol in order to extract the information about the declining of the cross-domain voice call by the recipient user.

In response to the information about the declining of the cross-domain voice call by the recipient user, the voice communication server of the recipient domain generates (Step 8149) a corresponding cross-domain communication control signal in accordance with the cross-domain communication control protocol. This cross-domain communication control signal is indicative of the declining of the cross-domain voice call.

Then, the voice communication server of the recipient domain transmits (Step 8150) the generated cross-domain communication control signal to the voice communication server of the sender domain over the Internet 3, and cancels (Step 8151) the cross-domain voice call by disregarding the recipient user information acquired for establishment of this call.

Meanwhile, the voice communication server of the sender domain receives (Step 8152) the cross-domain communication control signal indicative of the declining of the cross-domain voice call and processes (Step 8153) this signal in accordance with the cross-domain communication control protocol in order to extract information about the declining of the cross-domain voice call.

In response to the information about the declining of the cross-domain voice call, voice communication server of the sender domain generates (Step 8154) an encoded audio feedback signal indicative of the declining of the cross-domain voice call for the sender user and transmits (Step 8155) the generated encoded audio feedback signal to the sender PCD over the local area communication network 8 of the sender domain. Thereafter, the voice communication server of the sender domain cancels (Step 8156) the cross-domain voice call by disregarding the sender user information and the recipient user information acquired during establishment of this call.

The sender PCD, in its turn, receives (Step 8157) the encoded audio feedback signal indicative of the declining of the cross-domain voice call, processes (Step 8158) this signal to decode it, and outputs (Step 8159) the resulted audio feedback signal indicative of the declining of the cross-domain voice call to the sender user in a sound form.

It should be noted that the terminating of the cross-domain voice call between the sender PCD of the sender domain and the at least one recipient PCD of the recipient domain can be carried out similar to terminating of the local voice call, mutatis mutandis. The terminating includes exchange of cross-domain communication control signals indicative of the cross-domain call termination between the voice communication server of the sender domain and the voice communication server of the recipient domain over the Internet.

Figure 21:
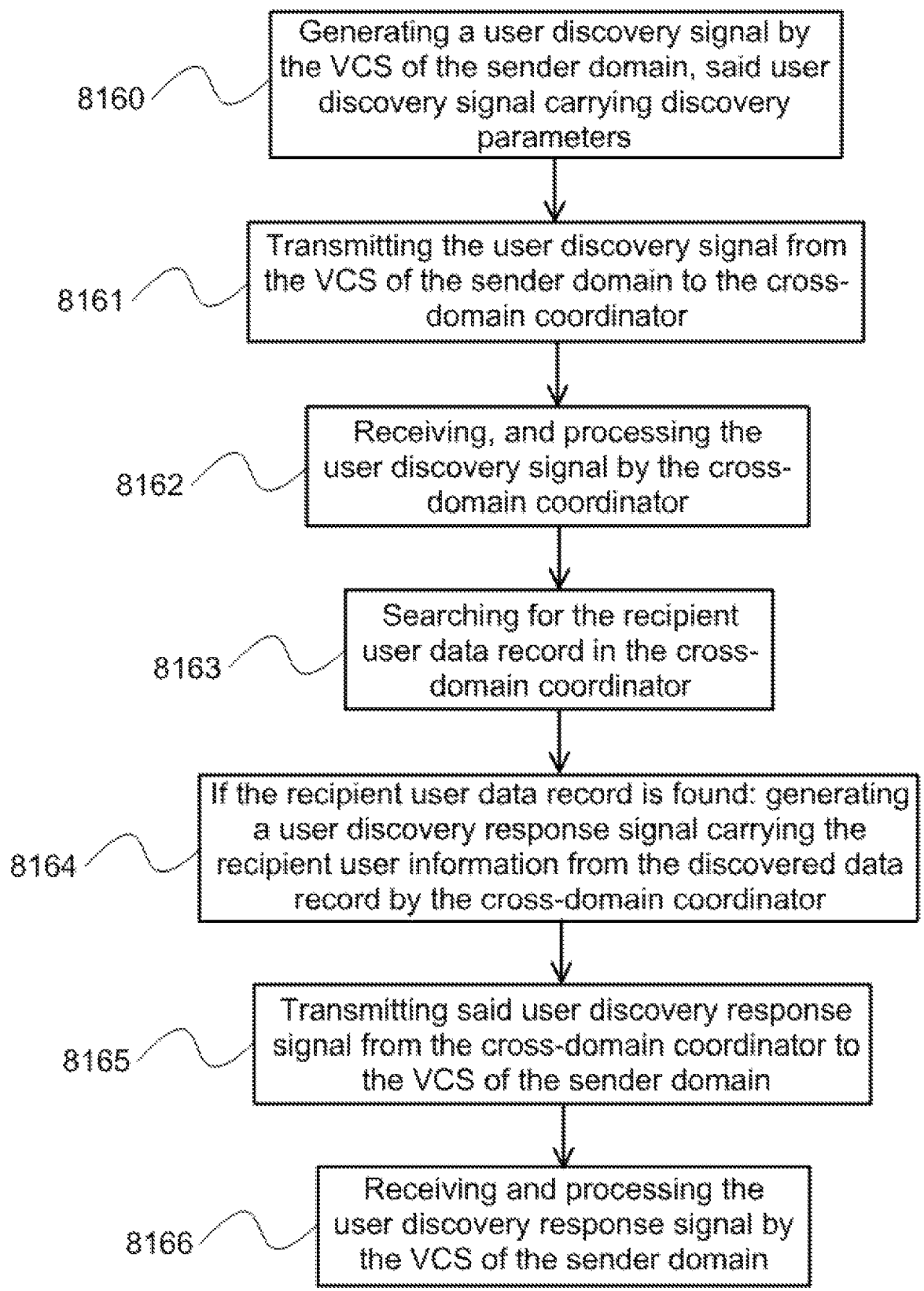
FIG. 21 illustrates a schematic flowchart diagram for the discovering of the user information from the user data record for the recipient user by the cross-domain coordinator, according to some embodiments of the present invention.

Referring to FIGS. 1 and 21 together, a schematic flowchart diagram for the discovering of the user information from the user data record for the recipient user by the cross-domain coordinator is illustrated in FIG. 21, according to some embodiments of the present invention.

The discovering of the user information starts from generating (Block 8160) by the voice communication server of the sender domain, a user discovery signal in accordance with the cross-domain coordination protocol. This user discovery signal carries discovery parameters, including the phone number of the recipient user 11 and/or the user e-mail address of the recipient user.

Then the voice communication server of the sender domain transmits (Block 8161) the generated user discovery signal to the cross-domain coordinator 2 over the Internet 3.

The cross-domain coordinator 2, in its turn, receives (Block 8162) the user discovery signal and processes this signal in accordance with the cross-domain coordination protocol in order to extract the discovery parameters.

Thereafter, the cross-domain coordinator conducts searching (Block 8163) for the recipient user data record. The searching is conducted by matching the discovery parameters with the corresponding user data stored in the data records of the users registered within the system.

If the cross-domain coordinator 2 finds the recipient user data record, it then generates (Block 8164) a user discovery response signal in accordance with the cross-domain coordination protocol. This user discovery response signal carries the user information from the discovered data record of the recipient user.

Thereafter, the cross-domain coordinator 2 transmits (Block 8165) the generated user discovery response signal to the voice communication server of the sender domain over the Internet 3.

The voice communication server of the sender domain, in its turn, receives (Block 8166) the user discovery response signal and processes this signal in accordance with the cross-domain coordination protocol in order to extract the user information about the recipient user.

According to some embodiments of the present invention in a forward direction from the sender PCD to the recipient PCD, the providing of the cross-domain voice call communication between the sender PCD of the sender domain and the recipient PCD of the recipient domain includes transmitting the encoded voice communication signals from the sender PCD to the voice communication server of the sender domain over the local area communication network 8 within the sender domain. The voice communication server of the sender domain receives the encoded voice communication signals and forwards these signals to the voice communication server of the recipient domain over the Internet 3.

The voice communication server of the recipient domain, in its turn, receives the encoded voice communication signals from the voice communication server of the sender domain and forwards these signals to the recipient PCD within the recipient domain over the local area communication network 8 of the recipient domain.

The recipient PCD, in its turn, receives the encoded voice communication signals from the voice communication server 13 of the recipient domain and processes these signals in order to restore the original voice communication signals of the sender user provided verbally.

Thereafter, the recipient PCD outputs the original voice communication signals of the sender user to the recipient user in a sound form.

According to some embodiments of the present invention in a backward direction from the recipient PCD to the sender PCD, the providing of the cross-domain voice call communication between the sender PCD of the sender domain and the recipient PCD of the recipient domain includes transmitting the encoded voice communication signals from the recipient PCD to the voice communication server of the recipient domain over the local area communication network 8 within the recipient domain. The voice communication server of the recipient domain receives the encoded voice communication signals and forwards these signals to the voice communication server of the sender domain over the Internet 3.

The voice communication server of the sender domain, in its turn, receives the encoded voice communication signals from the voice communication server of the recipient domain and forwards these signals to the sender PCD within the sender domain over the local area communication network 8 of the sender domain.

The sender PCD, in its turn, receives the encoded voice communication signals from the voice communication server of the sender domain and processes these signals in order to restore the original voice communication signals of the recipient user provided verbally.

Thereafter, sender PCD outputs the original voice communications signals of the recipient user to the sender user in a sound form.

Figure 22:
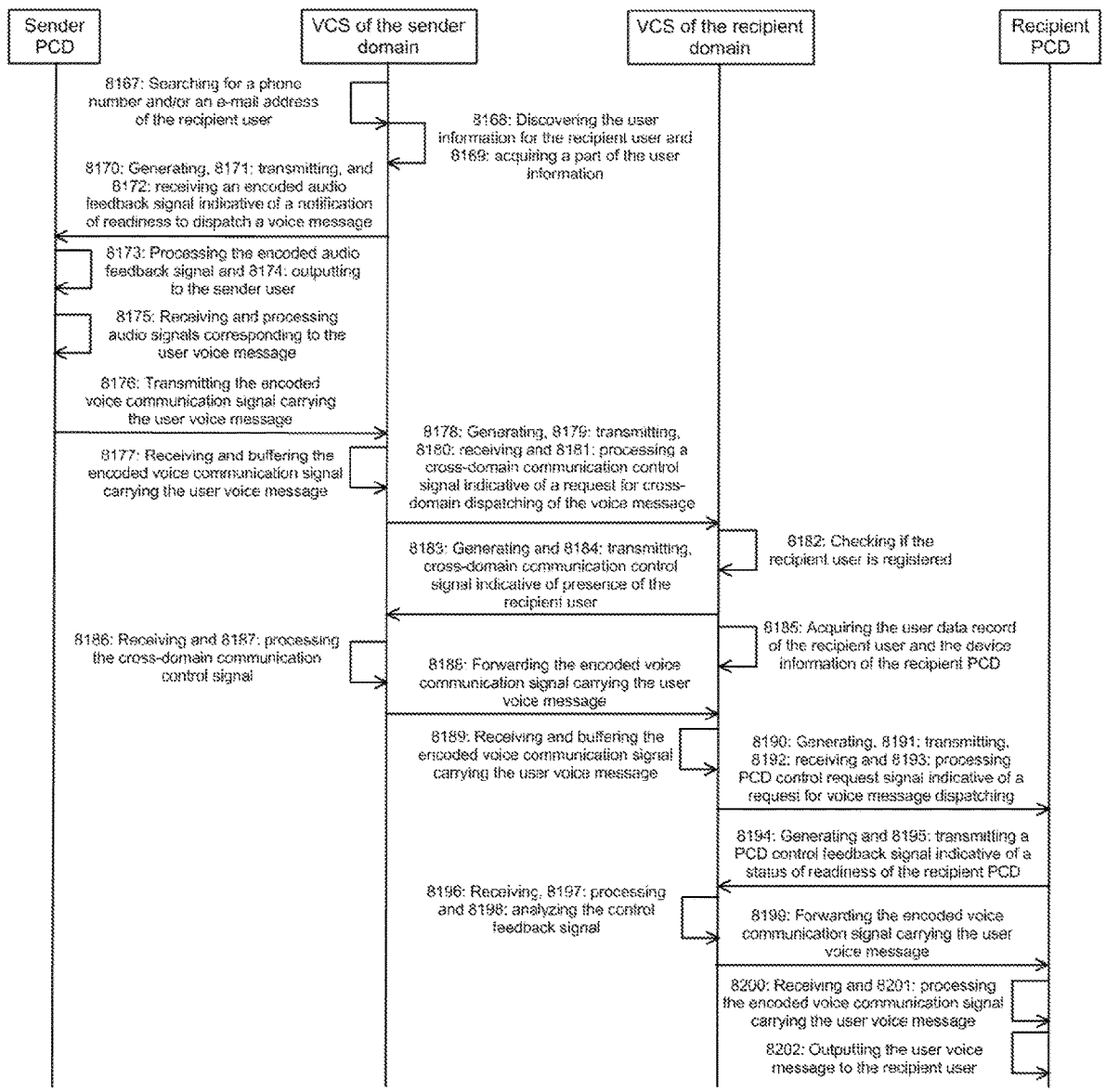
FIG. 22 illustrates a schematic sequence diagram for the dispatching of the cross-domain voice message from the sender PCD of the sender domain and the at least one recipient PCD of the recipient domain, according to some embodiments of the present invention.

Referring to FIGS. 1 and 22 together, a schematic sequence diagram for the dispatching of the cross-domain voice message from the sender PCD of the sender domain and the at least one recipient PCD of the recipient domain is illustrated in FIG. 22, according to some embodiments of the present invention.

The dispatching of the cross-domain voice message starts from searching (Step 8167), by the voice communication server of the sender domain in the list of the user's contacts of the user data record associated with the sender user, for the phone number and/or the e-mail address of the recipient user. The searching is conducted by using the name or the alias of the recipient user as a search parameter. The name or the alias is provided by the corresponding voice command of the sender user.

The dispatching of the cross-domain voice message also include discovering (Step 8168), in the cross-domain coordinator 2, the user information stored in the user data record for the recipient user registered in the recipient domain, by using the found phone number and/or the found e-mail address of the recipient user as the discovery parameters and then acquiring (Step 8169) a part of the recipient user information from the discovered user information. This part of the recipient user information is necessary for cross-domain dispatching of the cross-domain voice message. For example, this part of the recipient user information includes: the unique user ID of the recipient user, the unique domain ID of the recipient domain, and the current Internet address of the voice communication server of the recipient domain.

After discovering and acquiring all the necessary user information about the recipient user, the voice communication server of the sender domain generates (Step 8170) an encoded audio feedback signal indicative of notification of readiness for voice messaging for sender user.

Then voice communication server of the sender domain transmits (Step 8171) the generated encoded audio feedback signal to the sender PCD over the local area communication network 8 of the sender domain.

The sender PCD, in its turn, receives (Step 8172) the encoded audio feedback signal indicative of notification of the status of readiness for voice messaging, processes (Step 8173) this signal to decode it, and then outputs (Step 8174) the audio feedback signal to the sender user in a sound form.

After receiving the sound of audio feedback signal, the sender user utters the voice message to the microphone system of the sender PCD. The sender PCD receives (Step 8175) an audio signals that include a user voice communication signal carrying the cross-domain voice message of the sender user and processes (Step 8175) the received audio signals to generate a corresponding encoded voice communication signal carrying the cross-domain voice message.

Thereafter, the sender PCD transmits (Step 8176) the generated corresponding encoded voice communication signal to the voice communication server of the sender domain over the local area communication network 8 of the sender domain.

The voice communication server of the sender domain, in its turn, receives and buffers (Step 8177) the encoded voice communication signal carrying the cross-domain voice message of the sender user.

Then the voice communication server of the sender domain generates (Step 8178) a cross-domain communication control signal in accordance with the cross-domain communication control protocol. This cross-domain communication control signal is indicative of a request for dispatching of the cross-domain voice message. The request includes at least the unique user ID of the recipient user.

Thereafter, the voice communication server of the sender domain transmits (Step 8179) the generated cross-domain communication control signal to the voice communication server of the recipient domain over the Internet 3.

The voice communication server of the recipient domain, in its turn, receives (Step 8180) the cross-domain communication control signal indicative of a request for dispatching of the voice message and processes (Step 8181) this signal in accordance with the cross-domain communication control protocol in order to extract the request for dispatching of the cross-domain voice message.

In response to the request for dispatching of the cross-domain voice message, the voice communication server of the recipient domain checks (Step 8182) that the corresponding recipient user is registered within the recipient domain.

If the recipient user is registered with the recipient domain, then the voice communication server of the recipient domain generates (Step 8183) a cross-domain communication control signal in accordance with the cross-domain communication control protocol. This cross-domain communication control signal is indicative of a presence of the recipient user in the recipient domain.

Then the voice communication server of the recipient domain transmits (Step 8184) the generated cross-domain communication control signal to the voice communication server of the sender domain over the Internet 3 and acquires (Step 8185) the user data record of recipient user and the device information of the recipient PCD associated with the recipient user of the recipient domain. The device information can include the unique recipient device ID and the current local IP address of the recipient PCD within the local area communication network 8 of the recipient domain.

Meanwhile, the voice communication server of the sender domain receives (Step 8186), the cross-domain communication control signal indicative of the presence of the recipient user, and processes (Step 8187) this signal in accordance with the cross-domain communication control protocol in order to extract information about the presence of the recipient user in the recipient domain.

In response to the extracted information about the presence of the recipient user in the recipient domain, the voice communication server of the sender domain forwards (Step 8188) the buffered encoded voice communication signal carrying the cross-domain voice message to the voice communication server of the recipient domain over the Internet 3.

The voice communication server of the recipient domain, in its turn, receives and buffers (Step 8189) the encoded voice communication signal carrying the cross-domain voice message, and then generates (Step 8190) the PCD control request signal in accordance with the PCD control protocol. This PCD control request signal is indicative of a request for the cross-domain voice message dispatching.

Thereafter, the voice communication server of the recipient domain transmits (Step 8191) the generated PCD control request signal to the recipient PCD over the local area communication network 8 within the recipient domain.

The recipient PCD, in its turn, receives (Step 8192) the PCD control request signal indicative of a request for the cross-domain voice message dispatching and processes (Step 8193) this signal in accordance with the PCD control protocol in order to extract the request for the cross-domain voice message dispatching. In response to the request for the cross-domain voice message dispatching the recipient PCD generates (Step 8194) a PCD control feedback signal indicative of the status of readiness of the recipient PCD for receiving the cross-domain voice message.

Thereafter, the recipient PCD transmits (Step 8195) the generated PCD control feedback signal to the voice communication server of the recipient domain. This PCD control feedback signal is indicative of the status of readiness of the receiver PCD to receive the cross-domain voice message.

The voice communication server of the recipient domain, in its turn, receives (Step 8196) the PCD control feedback signal, processes (Step 8197) this signal in accordance with the PCD control protocol in order to extract the information about the status of readiness of the receiver PCD to receive the cross-domain voice message. Then the voice communication server of the recipient domain analyzes (Step 8198) the extracted information about the status of readiness of the receiver PCD to receive the cross-domain voice message.

If the recipient PCD is ready to receive the cross-domain voice message, then the voice communication server of the recipient domain forwards (Step 8199) the buffered encoded voice communication signal carrying the cross-domain voice message to the recipient PCD over the local area communication network 8 within the recipient domain.

The recipient PCD, in its turn, receives (Step 8200) the encoded voice communication signal carrying the cross-domain voice message and processes (Step 8201) the received signal in order to decode the encoded voice communication signal and to restore the original voice message from the sender user.

Finally, the recipient PCD outputs (Step 8202) the restored original voice message to the recipient user in a sound form.

Turning back to FIGS. 1 and 7, according to some embodiments of the present invention, the providing (Block 82) of the voice interaction between the sender user 11 of the voice communication domain 1 and the external network entity(s) 5, includes exchanging entity information signals between the sender PCD 12 and the voice communication server 13 of the voice communication domain 1, and between the voice communication server 13 and the external network entity 5. The entity information signals include at least entity coordination signals. When required, the entity information signals can further include the encoded voice communications signals carrying user voice communication.

Those skilled in the art to which the present invention pertains, can appreciate that while the present invention has been described in terms of preferred embodiments, the concept upon which this disclosure is based may readily be utilized as a basis for the designing of other structures, systems and processes for carrying out the several purposes of the present invention.

Also, it is to be understood that the phraseology and terminology employed herein are for the purpose of description and should not be regarded as limiting.

Finally, it should be noted that the words "having", "comprising" and "including" as used throughout the appended claims is to be interpreted to mean "including but not limited to".

It is important, therefore, that the scope of the invention is not construed as being limited by the illustrative embodiments set forth herein. Other variations are possible within the scope of the present invention as defined in the appended claims.

The invention claimed is:

1. A voice communication system for providing voice communication between sender users and recipient users, and between the sender users and at least one external network entity, the system comprising:
   a plurality of voice communication domains interacting with each other and with the at least one external network entity, at least some of the voice communication domains configured to operate for their own predetermined purpose different from the purposes of other voice communication domains, each voice communication domain having a corresponding unique domain identifier (ID), and being configured to provide voice communication between a sender user and a recipient user within the same voice communication domain over a local area communication network deployed in a predetermined area, to provide voice communication between communicating users located in different domains over an external global communication network, and to interact with the at least one external network entity coupled to the voice communication domain over the external global communication network; and
   a cross-domain coordinator having at least one publicly accessible Internet address, and configured to coordinate interaction between the voice communication domains over the Internet by exchanging cross-domain coordination signals with the voice communication domains; the cross-domain coordination signals including domain registration signals, user registration signals, and user discovery signals;
   each voice communication domain comprising:
       a plurality of personal communication devices (PCDs) associated with corresponding users, each PCD being controlled and operated by voice user commands provided verbally, and being configured to provide voice communication between the sender user and the recipient user within the same voice communication domain, between the sender user and the recipient user located in different voice communication domains, and between the sender user and the at least one external network entity; and
       a voice communication server (VCS) deployed within the voice communication domain, the voice communication server configured (i) to control operation of the PCDs by exchanging PCD control protocol signals, and to provide voice communication between the PCDs by exchanging encoded voice information signals within the same voice communication domain over the local area network; (ii) to coordinate interaction of a sender voice communication domain with recipient voice communication domains over the Internet by exchanging cross-domain coordination signals between the sender voice communication domain and the cross-domain coordinator, and between the cross-domain coordinator and the recipient voice communication domains, and by exchanging cross-domain communication control signals between the sender voice communication domain and the recipient voice communication domains; to provide voice communication between the sender voice communication domain and the recipient voice communication domains over the Internet by exchanging the encoded voice information signals between the sender voice communication domain and the recipient voice communication domains; and (iii) to control interaction of the sender voice communication domain with said at least one external networked entity by exchanging entity information signals.

2. The system of claim 1, wherein the cross-domain coordination signals include domain registration signals, user registration signals, and the user discovery signals.

3. The system of claim 1, wherein the entity information signals includes entity coordination signals and the encoded voice information signals.

4. The system of claim 1, wherein said local area communication network comprising:
a network infrastructure deployed within the predetermined area, the network infrastructure including:
a wired segment,
at least one wireless access point coupled to the wired segment via wired links, and configured to provide wireless access of the PCDs to the voice communication server, and
an internet gateway coupled to the wired segment to provide access of the corresponding voice communication domain to the Internet;
the plurality of PCD coupled to said at least one wireless access point via wireless links, and
the voice communication server, interacting through the network infrastructure.

5. The system of claim 1, wherein the personal communication device (PCD) includes:
a device function controller;
a manual trigger coupled to said device function controller;
a microphone system;
an audio signal processing system coupled to the microphone system;
a speaker system coupled to said audio signal processing system;
a control protocol handler coupled to said device function controller;
an Internet protocol (IP) network communicator coupled to said audio signal processing system and to said control protocol handler;
a wireless network connector coupled to said IP network communicator and to said device function controller;
a local configuration manager coupled to said device function controller and;
a local configuration storage coupled to the local configuration manager.

6. The system of claim 5,
wherein the device function controller is configured to control the configuration and functionality of the personal communication device;
wherein the manual trigger includes a control button for manual interaction of the user with the PCD to generate user manual alert signals and transmit the user manual alert signals to the device function controller; the device function controller being responsive to the user manual alert signals for generating activation signals for corresponding activation and deactivation of operational functions of the PCD;
wherein the microphone system includes at least one microphone to receive the audio signals produced by the user and by environment surrounding the user, and to convert the audio signals into corresponding analog electrical audio signals;
wherein the audio signal processing system is configured to receive and process the analog electrical audio signals, and to generate encoded voice information signals;
wherein the speaker system includes at least one speaker configured to receive analog electrical audio signals from the audio signal processing system and to output analog electrical audio signals in the form of sound;
wherein the control protocol handler is configured to provide exchange of the PCD control protocol signals between the PCD and the voice communication server within the voice communication domain; the PCD control protocol signals including control request signals generated by the voice communication server; the control request signals carrying control commands and corresponding parameters of the control commands for coordination of the functionality of the PCD; the PCD control protocol signals further including control feedback signals; the control feedback signals carrying feedback information corresponding to results of execution of the control commands; the control feedback signals can also carry information corresponding to notification of events that occurred on the side of the PCD; the device function controller being responsive to the control commands to generate corresponding instruction signals during execution of the control commands, and to generate the feedback information for relaying the feedback information to the control protocol handler;
wherein the IP network communicator is configured to provide exchange of the encoded voice information signals between the audio signal processing system and the voice communication server, and to provide exchange of the PCD control protocol signals between the control protocol handler and the voice communication server in both directions, in accordance with transmission control protocol/Internet protocol (TCP/IP) protocols;
wherein the wireless network connector is configured to provide wireless signal exchange of the encoded voice information signals and the control protocol signals between the PCD and the voice communication server over the local area network within the voice communication domain;
wherein the local configuration manager is configured to control access to configuration data of the PCD; and
wherein the local configuration storage is configured for non-volatile storing the configuration data that includes a set of configuration data items.

7. The system of claim 6, wherein the PCD further comprising a voice activation trigger coupled to said device function controller and to said audio signal processing system; said voice activation trigger being configured to receive and recognize a user communication signal from the audio signal processing system, to generate a wake-up alert signal and to transmit the wake-up alert signal to the device function controller; the device function controller being responsive to the wake-up alert signal for awaking the personal device from a sleep mode.

8. The system of claim 1, wherein said voice communication server (VCS) of the voice communication domain comprising:
a network connector;
an Internet protocol (IP) network communicator coupled to said network connector;
a voice command recognizer coupled to the IP network communicator;
a VCS central controller coupled to the voice command recognizer;
a PCD controller coupled to the VCS central controller and to the IP network communicator;
a call session controller coupled to the VCS central controller and to the PCD controller;
a voice communication domain registry coupled to the call session controller, to the PCD controller, and to the VCS central controller;
a call traffic dispatcher coupled to the call session controller and to the IP network communicator;
a voice message dispatcher coupled to the VCS central controller, to the PCD controller, to said voice communication domain registry, and to the IP network communicator;
an audio feedback generator coupled to the VCS central controller and to the IP network communicator;
a cross-domain communicator the coupled to the VCS central controller and to the IP network communicator;
an external interface handler coupled to the VCS central controller and to the IP network communicator; external interface handler configured to provide interaction of voice communication server with said at least one external network entity;
wherein the network connector is configured to provide signal exchange of said encoded voice information signals, said PCD control protocol signals, said cross-domain coordination signals, said cross-domain communication control signals, and an entity coordination signals;
wherein the IP network communicator is configured to
provide signal exchange of said encoded voice information signals said PCD control protocol signals, said cross-domain coordination signals, said cross-domain communication control signals, and an entity coordination signals in accordance with transmission control protocol/Internet protocol (TCP/IP) protocols; and to separate of said exchanged signals into said encoded voice command signals, said encoded voice communication signals, said PCD control protocol signals, said cross-domain coordination signals, said cross-domain communication control signals, and said entity coordination signals; and
to relay said encoded voice command signals to said voice command recognizer,
to relay said encoded voice communication signals to said call traffic dispatcher and/or to said voice message dispatcher,
to relay said PCD control protocol signals to the PCD controller,
to relay said cross-domain coordination signals to said cross domain communicator,
to relay said cross-domain communication control signals to said cross domain communicator, and
to relay said entity coordination signals to said external interface handler;
wherein the voice command recognizer is configured:
to receive of said encoded voice command signals dispatched by said IP network communicator;
to decode the encoded voice command signals for restoring the original voice command signals provided verbally the user,
to recognize speech carried in said voice command signals,
to transform the voice command signals from a speech into a text,
to parse the text to extract names of the user voice commands and their associated parameters, required for executing the voice commands, and
to generate voice command notification signals comprising the extracted names of the user voice commands, and the corresponding associated parameters;
wherein the VCS central controller is configured to receive voice command notifications from said voice command recognizer; the VCS central controller being responsive to said voice command notifications to execute voice commands by generating corresponding control instructions and relaying, for execution, the generated control instructions to one of the following VCS components: the PCD controller, the call session controller, the voice message dispatcher, and the external interface handler;
wherein the PCD controller is responsive to the control instructions generated by said VCS central controller to control functionality of the PCDs by transmitting generated control request signals to the PCDs through the IP network communicator;
wherein the call session controller is configured to control voice call sessions between the PCDs within the corresponding voice communication domain, to participate in control of call sessions between the PCDs of different voice communication domains, and to control call sessions between the PCDs and said at least one external network entity;
wherein the voice communication domain registry is configured for non-volatile storage and management of user information about the users of the PCDs, and device information about the PCDs of the corresponding domain;
wherein the call traffic dispatcher is configured to provide exchange of said encoded voice communication signals between the PCDs participating in the corresponding voice call sessions;
wherein the voice message dispatcher is configured to provide exchange of encoded voice communication signals carrying voice messages between the PCDs of the same voice communication domain, between the PCDs of the corresponding voice communication domain and the voice communication server of at least one another voice communication domain, and between the PCDs and at least one external entity;
wherein the audio feedback generator is configured to generate and transmit encoded audio feedback signals to the PCDs of the corresponding voice communication domain for providing notification and audio feedback to the users participating in the communication;

wherein the cross-domain communicator is configured to exchange said cross-domain coordination signals with cross-domain coordinator, and said cross-domain communication control signals with a voice communication server associated with another voice communication domain.

9. The system of claim 1, wherein the cross-domain coordinator comprising:
a network connector configured to provide signal exchange of said cross-domain coordination signals over the Internet between said cross domain coordinator and a plurality of voice communication servers of the corresponding voice communication domains, said cross-domain coordination signals include domain registration signals, user registration signals and user discovery signals;
an IP network communicator coupled to said network connector configured to provide signal exchange of said cross-domain coordination signals between the cross domain coordinator and said plurality of voice communication servers associated with the corresponding voice communication domains in accordance with transmission control protocol/Internet protocol (TCP/IP) protocols;
a cross-domain coordination protocol handler coupled to the Internet protocol (IP) network communicator and configured to exchange said cross-domain coordination signals between the cross domain coordinator and said plurality of voice communication servers associated with the corresponding voice communication domains in accordance with the cross-domain coordination protocol;
a system registrator coupled to said cross-domain coordination protocol handler configured to register the voice communication domains and the users associated with said corresponding voice communication domains;
a discovery engine coupled to said cross-domain coordination protocol handler, and configured to search the user information about the users registered by the system registrator and the corresponding voice communication domains;
a central registry coupled to said system registrator and to the discovery engine and configured to provide non-volatile storage of domain information of the voice communication domains registered within the voice communication system, and the user information of the users registered within the voice communication system and associated with the corresponding voice communication domains.

10. A method for providing voice communication between sender users and recipient users and/or between the sender users and at least one external network entity, comprising:
configuring a voice communication system comprising: a plurality of voice communication domains interacting with each other and with at least one external network entity system, each voice communication domain having a corresponding unique domain identification (ID), and configured to operate within a local area communication network deployed in a predetermined area; said each voice communication domain configured to operate for its own predetermined purpose independently from operation of other voice communication domains, and a cross-domain coordinator having at least one publicly accessible Internet address and configured to coordinate interaction between voice communication domains over the external global communication network by exchanging cross-domain coordination signals with the voice communication domains, said cross-domain coordination signals including domain registration signals, user registration signals, and user discovery signals; each voice communication domain comprising a plurality of personal communication devices (PCD) associated with the corresponding users for the voice communication therebetween, and a voice communication server (VCS) deployed within the voice communication domain, said voice communication server configured to store user information for each user registered in said voice communication domain;
activating a sender personal communication device of the voice communication domain by a sender user;
generating encoded voice information signals by said sender PCD, the encoded voice information signals including encoded voice command signals carrying user voice commands of the sender user and encoded voice communication signals carrying user voice communications of the sender user;
transmitting the encoded voice information signals from said sender personal communication device (PCD) to the voice communication server (VCS) of the corresponding voice communication domain;
receiving the encoded voice information signals by the voice communication server of said voice communication domain;
separating, by the voice communication server, the received encoded voice information signals into the encoded voice command and the encoded voice communication signals;
processing the encoded voice command signals by the voice communication server to extract information about said user voice commands carried by the encoded voice command signals;
executing said user voice commands by the voice communication server, the executing including at least one of the following actions, depending on the voice commands and a current location of a recipient user:
controlling functionality of the sender PCD;
providing voice communications between the sender user and the recipient user of the same said voice communication domain;
providing voice communications between the sender user of the sender domain and the recipient user of the recipient domain; and
providing voice interaction between the sender user of the sender domain and said at least one external network entity.

11. The method of claim 10, wherein the configuring of the voice communication system includes:
configuring said cross-domain coordinator to coordinate interaction between said voice communication domains over the Internet; said cross-domain coordinator having a predetermined address in the Internet; and
configuring the plurality of the voice communication domains to interact with each other and with said cross-domain coordinator.

12. The method of claim 11, wherein the configuring of said cross-domain coordinator includes:
deployment of a hardware and a software of said cross-domain coordinator;
connecting said cross-domain coordinator to the Internet, and providing public access to said cross-domain coordinator by assigning at least one publicly accessible Internet address.

13. The method of claim 11, wherein the configuring of the plurality of the voice communication domains, for each domain, includes:
providing connection of the voice communication server of the voice communication domains to a local area communication network of the voice communication domains; the voice communication server (VCS) storing said at least one publicly accessible Internet address of the cross-domain coordinator;
registering the voice communication domain within the voice communication system;
registering the users of the voice communication domain within the voice communication system;
providing connection of the PCDs of the users of the voice communication domain to the corresponding local area communication network;
associating the PCDs of the voice communication domains with the corresponding users of the voice communication domain within the system; and
storing a corresponding device information of the PCDs in the voice communication server, said corresponding device information include: unique device IDs of the PCDs, PCD names of the PCDs, unique user IDs of corresponding users currently associated with the PCDs, and a current local IP addresses of the PCDs within said local area communication network.

14. The method of claim 13, wherein the registering of the voice communication domain within the voice communication system includes:
generating a domain registration signal by the voice communication server of the voice communication domain, said domain registration signal carrying a request for registration of said voice communication domain within the voice communication system;
transmitting said domain registration signal to said cross-domain coordinator over the Internet;
receiving, by said cross-domain coordinator, said domain registration signal from the voice communication server of the voice communication domain, and
processing said domain registration signal to extract the request for registration of said voice communication domain;
generating a unique domain ID by said cross-domain coordinator for the voice communication domain;
creating a domain data record by said cross-domain coordinator; the domain data record including: the unique domain ID for the domain, and/or a reference to an active transport link of a transmission control protocol/Internet protocol (TCP/IP) protocol between the voice communication server and cross-domain coordinator,
storing said domain data record in the cross-domain coordinator;
generating a domain registration response signal by the cross-domain coordinator, said domain registration response signal carrying information about a status of the domain registration and the assigned unique domain ID of the registered domain;
transmitting the domain registration response signal to the voice communication server of the voice communication domain;
receiving and processing the domain registration response signal by the voice communication server of the voice communication domain to extract information about a status of the domain registration and the assigned unique domain ID of the registered domain;
storing the assigned unique domain ID by the voice communication server of the voice communication domain.

15. The method of claim 14, wherein the registering of the users in the system, for each user, includes:
registering the user in the voice communication server of the corresponding voice communication domain to provide user voice communications within the voice communication domain; and
registering the user in the cross-domain coordinator, to provide user voice communications across the voice communication domains.

16. The method of claim 15, wherein said registering of the user in the voice communication server of the corresponding voice communication domain includes:
generating the unique user ID for the user;
acquiring from the user a user name, a user phone number and/or a user e-mail address, and a list of user's contacts; the list of user's contacts including names of other users and at least one of phone numbers of said other users and e-mail addresses of other users;
creating a user data record for the user by the voice communication server, the user data record representing said user information including said unique user ID for the user and the user name; the user phone number and/or the user e-mail address, and said list of user's contacts acquired from the user; and
storing the user data record in the voice communication server of the voice communication domain.

17. The method of claim 16, wherein the registering of the user in said cross-domain coordinator includes:
generating a user registration signal by the voice communication server of the voice communication domain, the user registration signal being indicative of a request for registration of the user of said voice communication domain within the voice communication system; said user registration signal carrying user information including the unique domain ID number of the voice communication domain, the unique user ID of the user, and the user phone number and/or the user e-mail address;
transmitting said user registration signal to said cross-domain coordinator over the Internet;
receiving said user registration signal from the voice communication server of the voice communication domain by said cross-domain coordinator; and
processing said domain registration signal to extract the user information from the corresponding said user registration signal;
checking, by the cross-domain coordinator, whether the user is already registered within the system;
if the user is not registered yet, then
creating a user data record for the user in the cross-domain coordinator and storing said extracted user information in the record, and
associating the unique user ID of the user with the unique domain ID number of the corresponding voice communication domain, and
storing the association in the cross-domain coordinator;
if the user is already registered within the system, then updating the corresponding user record with said extracted user information in the cross-domain coordinator;

associating the unique user ID of the user with the unique domain ID number of the corresponding voice communication domain; and storing the association in the cross-domain coordinator; and generating a user registration response signal in accordance with a cross-domain coordination protocol, said user registration response signal carrying information about the status of the user registration; and transmitting said user registration response signal to the voice communication server of said corresponding voice communication domain;

receiving said user registration response signal by the voice communication server of said corresponding voice communication domain, and processing the user registration response signal in accordance with said cross-domain coordination protocol to extract information about the status of the user registration.

18. The method of claim 10, wherein said personal communication device (PCD) includes:
a device function controller,
a manual trigger coupled to said device function controller,
a microphone system;
an audio signal processing system coupled to said microphone system;
a speaker system said coupled to audio signal processing system;
a control protocol handler coupled to said device function controller;
an IP network communicator coupled to said audio signal processing system and to said control protocol handler;
a wireless network connector coupled to said IP network communicator and to said device function controller;
a local configuration manager coupled to said device function controller and;
a local configuration storage coupled to the local configuration manager, and configured for non-volatile storing the configuration data including a set of configuration data items; and
wherein the activating of a personal communication device 12, includes:
activating the manual trigger by the user;
generating a user manual alert signal by the manual trigger;
relaying said user manual alert signal to said device function controller;
operating said device function controller to activate the microphone system, the speaker system, said audio signals processing device, said Internet protocol (IP) network connector, said wireless network connector, said PCD control protocol handler, said local configuration manager, and said local configuration storage by said device function controller.

19. The method of claim 10, wherein the generating of the encoded voice information signals by said personal communication device, includes:
receiving audio signals from a surrounding environment of the personal communication device, the audio signals including:
voice signals generated by a user of said personal communication device, said voice signals include:
voice command signals of the user corresponding to user commands provided verbally, and voice communication signals of the user corresponding to voice communication provided verbally, collateral sound noise, and echo signals;
extracting said voice signals generated by the user of said personal communication device from said audio signals by suppressing the collateral sound noise and cancelling the echo signals; and
encoding the extracted voice signals generated by a user of said personal communication device by applying an audio codec to generate corresponding encoded voice information signals of the user of the personal communication device.

20. The method of claim 10, wherein the processing of the encoded voice command signals separated from the received encoded voice information signals by the voice communication server includes:
decoding the encoded voice command signals to restore the original user voice commands provided verbally by the sender user;
recognizing user's speech from the voice command signals of the user to transform the voice command signals from a speech into a text phrase;
parsing the text phrase representing the voice command signals to extract names of the user voice commands and their associated parameters required for executing the voice commands.

21. The method of claim 10, wherein the controlling of the functionality of the sender PCD by the voice communication server includes:
generating PCD control request signals in accordance with a PCD control protocol by the voice communication server, said PCD control request signals carrying control commands and corresponding parameters of said control commands for coordination of functionality of the sender PCD, said control commands are indicative of the corresponding user voice commands;
transmitting said PCD control request signals from the voice communication server to said sender PCD over the local area communication network;
receiving said PCD control request signals by said sender PCD and processing said PCD control request signals in accordance with the PCD control protocol to extract the information about the control commands that the sender PCD needs to execute and the corresponding parameters of the control commands; and
executing said control commands by the sender PCD.

22. The method of claim 17, wherein the providing of the voice communications between the sender user and the recipient user of the same said voice communication domain, includes at least one of the following actions:
establishing a local voice call between the sender PCD and said at least one recipient PCD;
terminating the local voice call between the PCDs, and dispatching a local voice message from the sender PCD to said at least one recipient PCD.

23. The method of claim 22, wherein the establishing of the local voice call between the sender PCD and said at least one recipient PCD includes:
searching, at the voice communication server, for the phone number and/or the e-mail address of the recipient user in the list of user's contacts of the sender user by using the name of the recipient user provided by the corresponding voice command of the sender user;
by using the phone number and/or the e-mail address of the recipient user found within the list of user's contacts included in the user data record of the sender user 11, searching, at the voice communication server, for a data record of the recipient user within the set of the user data records of the users registered in the voice communication domain;

acquiring, from the data record of the recipient user, the user information about the recipient user by the voice communication server of said voice communication domain, the user information comprising: the unique recipient user ID, the recipient user name, and the recipient user phone number and/or the recipient user e-mail address;

acquiring device information of the recipient PCD associated with the recipient user by the voice communication server of said voice communication domain, the device information includes the unique recipient device ID, and the current local IP address of the recipient PCD within said local area communication network;

generating the PCD control request signal by said voice communication server in accordance with a PCD control protocol, the PCD control request signal being indicative of a request for establishing the local voice call;

transmitting the PCD control request signal from the voice communication server to the recipient PCD over the local area communication network by using said current local IP address of the recipient;

receiving and processing the PCD control request signal by the recipient PCD;

generating, by the recipient PCD, a PCD control feedback signal indicative of a status of readiness of the recipient PCD for the receiving of said local voice call;

transmitting, by the recipient PCD, said PCD control feedback signal to said voice communication server;

receiving, processing and analyzing said PCD control feedback signal by said voice communication server, said PCD control feedback signal being indicative of the status of readiness of the recipient PCD to receive said local voice call;

if the recipient PCD is ready for the voice call, generating by the voice communication server, an encoded audio feedback signals indicative of a sender dialing notification indicating initiation of said local voice call, and a recipient ringing notification alerting the recipient PCD of said local voice call, and transmitting the corresponding encoded audio feedback signal carrying the dialing notification to the sender PCD, and the corresponding encoded audio feedback signal carrying the recipient ringing notification to the recipient PCD;

receiving and processing the corresponding encoded audio feedback signal carrying the sender dialing notification by the sender and encoded audio feedback signal carrying the recipient ringing notification by the recipient PCD, and outputting the corresponding sender dialing notification to the sender user by the sender PCD and the recipient ringing notification to the recipient user by the recipient PCD in a sound form;

accepting or declining, by the recipient user of the recipient PCD, said local voice call by responding to the ringing notification in accordance with a corresponding interaction of the recipient user 11 with the recipient PCD;

if said local voice call being accepted by the recipient user, generating said PCD control feedback signal by the recipient PCD in accordance with the PCD control protocol, the PCD control feedback signal indicative of accepting of the local voice call, and transmitting said PCD control feedback signal to the voice communication server;

receiving said PCD control feedback signal by the voice communication server, and processing said PCD control feedback signal in accordance with the PCD control protocol to extract indication of acceptance of the local voice call by the recipient user, and in the case of acceptance of the local voice call, creating a call session object on the voice communication server, the call session object including the user information about the sender user, the sender PCD, the user information about the recipient user and the device information about the recipient PCD, participating in the local voice call, and providing a local voice call communication between the sender PCD and the recipient PCD.

24. The method of claim 23, wherein the providing of the local voice call communication between the sender PCD and the recipient PCD, includes:

in a forward direction from the sender PCD to the recipient PCD, transmitting said encoded voice communication signals from the sender PCD to the voice communication server over the local area communication network;

receiving said encoded voice communication signals by the voice communication server and forwarding said encoded voice communication signals to the recipient PCD over the local area communication network;

receiving said encoded voice communication signals from the voice communication server by the recipient PCD, processing said encoded voice communications signal to restore the original voice communication signals of the sender user provided verbally, and outputting to the recipient user by the recipient PCD in a sound form; and in a backward direction from the recipient PCD to the sender PCD, transmitting said encoded voice communication signals from the recipient PCD to the voice communication server over the local area communication network;

receiving said encoded voice communication signals by the voice communication server, and forwarding said encoded voice communication signals to the sender PCD over the local area communication network; and receiving said encoded voice communication signals from the voice communication server by the sender PCD;

processing said encoded voice communication signals to restore original voice communication signals of the recipient user provided verbally; and outputting said original voice communication signals to the sender user by the sender PCD in a sound form.

25. The method of claim 23, wherein, if said local voice call is declined by the recipient user, the method comprising:

generating a PCD control feedback signal by the recipient PCD in accordance with the PCD control protocol, said PCD control feedback signal being indicative of the declining of the local voice call;

transmitting said PCD control feedback signal from the recipient PCD to the voice communication server of the voice communication domain;

receiving said PCD control feedback signal by the voice communication server, and processing said PCD control feedback signal in accordance with said PCD control protocol to extract the information about the declining of the local voice call by the recipient user;

in response to the information about the declining of the local voice call by the recipient user;

generating, by the voice communication server, an encoded audio feedback signal indicative of the declining of the local voice call for the sender user;

transmitting said generated encoded audio feedback signal from the voice communication server to the sender PCD over the local area communication network;

canceling the call, by the voice communication server, by disregarding the sender user and the recipient user information acquired for establishment of the local voice call;

receiving said encoded audio feedback signal indicative of the declining of the local voice call by the sender PCD;

processing said encoded audio feedback signal to decode said encoded audio feedback signal; and outputting said audio feedback signal indicative of the declining of the local voice call to the sender user in a sound form.

26. The method of claim 22, wherein the terminating of the local voice call between the PCDs including:

terminating, by a call terminating user, said local voice call between a call terminating PCD and another call participant PCD via the voice communication server, said terminating being performed in accordance with a corresponding interaction of a call terminating user with the call terminating PCD;

in response to the interaction of the call terminating user, generating a PCD control feedback signal by the call terminating PCD in accordance with the PCD control protocol, said PCD control feedback signal being indicative of the terminating of the local voice call;

transmitting said PCD control feedback signal from the call terminating PCD to the voice communication server of the voice communication domain;

receiving said PCD control feedback signal by the voice communication server, and processing said PCD control feedback signal in accordance with said PCD control protocol to extract information about the terminating of the local voice call by the call terminating user;

in response to the extracted information about the terminating of the local voice call by the call terminating user, aborting the local voice call communication between the call terminating PCD and another call participant PCD, and removing, from the voice communication server, the corresponding call session object with the corresponding information about the call participants.

27. The method of claim 26, wherein the terminating the local voice call between the PCDs before aborting the local voice call communication, further comprising:

generating, by the voice communication server, an encoded audio feedback signal indicative of the terminating of the local voice call for another call participant user associated with said another call participant PCD;

transmitting the generated encoded audio feedback signal from the voice communication server to said another call participant PCD over the local area communication network;

receiving, by said another call participant PCD, said encoded audio feedback signal indicative of the terminating of the local voice call;

processing said encoded audio feedback signal to decode said encoded audio feedback signal; and outputting said audio feedback signal indicative of the terminating of the local voice call to said another call participant user in a sound form.

28. The method of claim 22, wherein the local dispatching of the local voice message from the sender PCD to said at least one recipient PCD, includes:

searching, by the voice communication server, the phone number and/or the e-mail address of the recipient user in the list of user's contacts of the sender user within the list of user's contacts of the sender user by using the name of the recipient user provided in the corresponding voice command;

searching for the data record of the recipient user among the user data records of the users registered in the voice communication domain on basis of the phone number and/or the e-mail address of the recipient user discovered within the list of user's contacts included in the user data record of the sender user;

acquiring the user information about the recipient user by the voice communication server of said voice communication domain from data record of the recipient user; the information comprising: the unique recipient user ID, the recipient user name, and the recipient user phone number and/or the recipient user e-mail address;

acquiring the device information of the recipient PCD associated with the recipient user by the voice communication server of said voice communication domain; the device information includes the unique recipient device ID, and the current local IP address of the recipient PCD within said local area communication network;

generating an encoded audio feedback signal by the voice communication server; said encoded audio feedback signal indicative of a notification for sender user of a status of readiness of the voice communication server to dispatch a voice message;

transmitting said encoded audio feedback signal to the sender PCD over the local area communication network;

receiving, by said sender PCD, the encoded audio feedback signal indicative of the notification of the status of readiness;

processing said encoded audio feedback signal to decode said audio feedback signal;

outputting said audio feedback signal indicating the status of readiness to dispatch a voice message to the sender user in a sound form;

receiving, by the sender PCD, audio signals including voice communication signal of the sender user corresponding to the voice message;

processing said audio signals to generate a corresponding encoded voice communication signal by the sender PCD, said corresponding encoded voice communication signal carrying said voice message;

transmitting said corresponding the encoded voice communication signal from said sender PCD to said voice communication server over the local area communication network;

receiving and buffering said encoded voice communication signal by said voice communication server;

generating, by said voice communication server, a PCD control request signal in accordance with PCD control protocol, the PCD control request signal being indicative of a request for the local voice message dispatching;

transmitting the PCD control request signal from the voice communication server to the recipient PCD over the local area communication network;

receiving and processing the PCD control request signal by the recipient PCD;

generating a PCD control feedback signal indicative of a status of readiness of the recipient PCD to receive the voice message, the status of readiness including indication of readiness or non-readiness of the recipient PCD to receive the voice message;

transmitting said PCD control feedback signal to said voice communication server by the recipient PCD;

receiving, processing, and analyzing said PCD control feedback by said voice communication server;

if the recipient PCD is ready to receive the voice message, forwarding said encoded voice communication signal carrying the voice message from the voice communication server to the recipient PCD over the local area communication network;

receiving by recipient PCD said corresponding encoded voice communication signal carrying the voice message from the voice communication server;

processing said corresponding encoded voice communication signal to decode it and restore the original voice message originated by the sender user, and outputting said voice message to the recipient user in a sound form.

29. The method of claim 17, wherein the providing of the voice communications between the sender user of the sender domain and the recipient user of the recipient domain includes at least one of the following actions:

establishing a cross-domain voice call between the sender PCD of the sender domain and said at least one recipient PCD of the recipient domain;

terminating the cross-domain voice call between the sender PCD of the sender domain and the at least one recipient PCD of the recipient domain; and dispatching a cross-domain voice message from the sender PCD of said sender domain and said at least one recipient PCD of said recipient domain.

30. The method of claim 29, wherein establishing a cross-domain voice call between the sender PCD of the sender domain associated with the sender user and said at least one recipient PCD of the recipient domain associated with the recipient user includes:

searching, by the voice communication server of the sender domain in the list of the user's contacts of the user data record associated with the sender user, for the phone number and/or e-mail address of the recipient user; the searching is conducted by using the name of the recipient user as a search parameter, the name being provided by the corresponding voice command of the sender user;

discovering, in the cross-domain coordinator, the user information for the recipient user registered in the recipient domain by using the found phone number and/or the found e-mail address of the recipient user as the discovery parameters;

acquiring a part of the recipient user information from the discovered user information, the part of the recipient user information being necessary for establishing said cross-domain voice call; the part of the recipient user information including: the unique user ID of the recipient user, the unique domain ID of the recipient domain, and the current Internet address of the voice communication server of the recipient domain;

generating a cross-domain communication control signal by said voice communication server of said sender domain in accordance with cross-domain communication control protocol, the cross-domain communication control signal being indicative of a request for establishing the cross-domain voice call; the request including at least the unique user ID of the recipient user;

transmitting, over the Internet, the generated cross-domain communication control signal from the voice communication server of the sender domain to the voice communication server of the recipient domain; the transmitting is performed by using the current Internet address of the voice communication server of the recipient domain;

receiving said cross-domain communication control signal by the voice communication server of the recipient domain and processing said cross-domain communication control signal in accordance with the cross-domain communication control protocol to extract information about the request for establishing the cross-domain voice call;

in response to said request for establishing the cross-domain voice call, checking that the recipient user is registered with the recipient domain by the voice communication server of said recipient domain, and if the recipient user is registered, with the recipient domain, acquiring, at the voice communication server of the recipient domain, a data record of the recipient user and a device information of the recipient PCD associated with the recipient user; the device information including the unique recipient device ID, and the current local IP address of the recipient PCD within the local area communication network of the recipient domain;

generating, by the voice communication server of the recipient domain, a PCD control request signal in accordance with the PCD control protocol by using said unique recipient device ID, said PCD control request signal being indicative of a request for establishing the incoming cross-domain voice call;

transmitting, over the local area communication network within the recipient domain, the generated PCD control request signal from the voice communication server to the recipient PCD by using said current local IP address of the recipient PCD;

receiving and processing said PCD control request signal by the recipient PCD;

generating a PCD control feedback signal indicative of a status of readiness of the recipient PCD for the receiving of said incoming cross-domain voice call; the status of readiness including indication of readiness or non-readiness of the recipient PCD to receive said incoming cross-domain voice call;

transmitting, by the recipient PCD, said PCD control feedback signal back to said voice communication server of the recipient domain;

receiving, processing, and analyzing said PCD control feedback signal by the voice communication server of the recipient domain, the said PCD control feedback signal being indicative of a status of readiness of the recipient PCD to receive said cross-domain voice call; and if the recipient PCD being ready for receiving the voice call, generating, by the voice communication server of the recipient domain, a cross-domain communication control signal indicative of the status of readiness of the recipient PCD to receive said cross-domain voice call;

transmitting, by the voice communication server of the recipient domain, said cross-domain communication control signal to the voice communication server of the sender domain over the Internet;

generating, by the voice communication server of the recipient domain, an encoded audio feedback signal carrying a recipient ringing notification alerting the recipient PCD of said incoming cross-domain voice call;

transmitting the encoded audio feedback signal carrying the recipient ringing notification to the recipient PCD over the local area communication network within the recipient domain;

receiving and processing by the recipient PCD, the corresponding encoded audio feedback signal carrying the recipient ringing notification; and outputting the recipient ringing notification to the recipient user in a sound form;

receiving, by the voice communication server of the sender domain, the cross-domain communication control signal and processing said cross-domain communication control signal in accordance with the cross-domain communication control protocol to extract the information about the status of readiness of the recipient PCD to receive the incoming cross-domain voice call;

in response to the information about the status of readiness of the recipient PCD to receive the incoming cross-domain voice call, generating, by the voice communication server of the sender domain, an encoded audio feedback signal carrying a sender dialing notification of said cross-domain voice call; the generating of said sender dialing notification being performed simultaneously with the generating of the recipient ringing notification;

transmitting the generated encoded audio feedback signal carrying the sender dialing notification to the sender PCD within the sender domain over the local area communication network 8 within the sender domain;

receiving and processing, by the sender PCD, the corresponding sender encoded audio feedback signals carrying the sender dialing notification, and outputting the sender dialing notification to the sender user in a sound form;

accepting or declining said cross-domain voice call by the recipient user of the recipient PCD by responding to the ringing notification in accordance with a corresponding interaction of the recipient user with the recipient PCD;

if said cross-domain voice call being accepted by the recipient user, generating a PCD control feedback signal by the recipient PCD in accordance with the PCD control protocol, said PCD control feedback signal being indicative of the accepting of the cross-domain voice call;

transmitting said PCD control feedback signal to the voice communication server of the recipient domain;

receiving said PCD control feedback signal by the voice communication server of the recipient domain, and processing said PCD control feedback signal in accordance with said PCD control protocol to extract the information about the accepting of the cross-domain voice call by the recipient user, in response to the accepting of the cross-domain voice call by the recipient user, generating, by the voice communication server of the recipient domain, a corresponding cross-domain communication control signal in accordance with the cross-domain communication control protocol, said cross-domain communication control signal being indicative of the accepting of the cross-domain voice call, transmitting the cross-domain communication control signal to the voice communication server of the sender domain over the Internet; and creating a call session object at the voice communication server of the recipient domain, the call session object including the information about the sender user, the sender domain, the recipient user and the recipient PCD, participating in the cross-domain voice call;

receiving said cross-domain communication control signal by the voice communication server of the sender domain, and processing said cross-domain communication signal in accordance with said cross-domain communication control protocol to extract information about the accepting of the cross-domain voice call; and in response to the accepting of the cross-domain voice call:

creating a call session object at the voice communication server of the sender domain, the call session including the information about the sender user, the sender PCD, the recipient user and the recipient domain, participating in the cross-domain voice call; and providing a cross-domain voice call communication between the sender PCD of the sender domain and the recipient PCD of the recipient domain by exchanging the encoded voice communication signals between the sender PCD, the voice communication server of the sender domain, the voice communication server of the recipient domain, and the recipient PCD.

31. The method of claim 30, wherein if said cross-domain voice call is declined by the recipient user 11, the method comprising:

generating a PCD control feedback signal by the recipient PCD in accordance with the PCD control protocol, said PCD control feedback signal being indicative of the declining of the cross-domain voice call;

transmitting said PCD control feedback signal to the voice communication server 13 of the recipient domain;

receiving said PCD control feedback signal by the voice communication server of the recipient domain, and processing said PCD control feedback signal in accordance with said PCD control protocol to extract the information about the declining of the cross-domain voice call by the recipient user, in response to the information about the declining of the cross-domain voice call by the recipient user 11:

generating, by the voice communication server of the recipient domain, a corresponding cross-domain communication control signal in accordance with the cross-domain communication control protocol, said cross-domain communication control signal being indicative of the declining of the cross-domain voice call;

transmitting the cross-domain communication control signal from the voice communication server of the recipient domain to the voice communication server of the sender domain over the Internet, and canceling the call by the voice communication server of the recipient domain by disregarding the recipient user information acquired for establishment of the cross-domain voice call;

receiving said cross-domain communication control signal by the voice communication server of the sender domain, and processing said cross-domain communication signal in accordance with said cross-domain communication control protocol to extract information about the declining of the cross-domain voice call; and in response to the information about the declining of the cross-domain voice call:
generating an encoded audio feedback signal indicative of the declining of the cross-domain voice call for the sender user;

transmitting said generated encoded audio feedback signal from the voice communication server of the sender domain to the sender PCD over the local area communication network of the sender domain, and cancelling the call by the voice communication server of the sender domain by disregarding the sender user and the recipient user information acquired during establishment of the cross-domain voice call; and receiving said encoded audio feedback signal indicative of the declining of the cross-domain voice call by the sender PCD, processing said encoded audio feedback signal to decode said encoded audio feedback signal, and outputting said audio feedback signal indicative of the declining to the sender user in a sound form.

32. The method of claim 30, wherein the discovering of the user information from the user data record for the recipient user by the cross-domain coordinator includes:
generating a user discovery signal by the voice communication server of the sender domain in accordance with the cross-domain coordination protocol, said user discovery signal carrying discovery parameters including the phone number of the recipient user and/or the user e-mail address of the recipient user;

transmitting the generated user discovery signal from the voice communication server of the sender domain to the cross-domain coordinator over the Internet;

receiving, by the cross-domain coordinator, said user discovery signal and processing said user discovery signal in accordance with the cross-domain coordination protocol to extract the discovery parameters;

searching for the recipient user data record in the cross-domain coordinator by matching the discovery parameters with the corresponding user data stored in the data records of the users registered within the system;

if the recipient user data record being found, generating a user discovery response signal by the cross-domain coordinator in accordance with said cross-domain coordination protocol, said user discovery response signal carrying the user information from the discovered data record of the recipient user;

transmitting said user discovery response signal from the cross-domain coordinator to the voice communication server of the sender domain over the Internet; and receiving said user discovery response signal by said voice communication server of the sender domain and processing said user discovery response signal in accordance with said cross-domain coordination protocol to extract said user information about the recipient user.

33. The method of claim 30, wherein the providing of the cross-domain voice call communication between the sender PCD of the sender domain and the recipient PCD of the recipient domain includes:
in a forward direction from the sender PCD to the recipient PCD,
transmitting said encoded voice communication signals from the sender PCD to the voice communication server of the sender domain over the local area communication network within the sender domain;

receiving said encoded voice communication signals by the voice communication server of the sender domain and forwarding said encoded voice communication signals to the voice communication server of the recipient domain over the Internet;

receiving said encoded voice communication signals by the voice communication server of the recipient domain and forwarding said encoded voice communication signals to the recipient PCD within the recipient domain over the local area communication network of the recipient domain;

receiving said encoded voice communication signals from the voice communication server of the recipient domain by the recipient PCD;

processing said encoded voice communication signals to restore the original voice communications signals of the sender user provided verbally, and outputting said original voice communication signals of the sender user to the recipient user by the recipient PCD in a sound form; and in a backward direction from the recipient PCD to the sender PCD:
transmitting said encoded voice communication signals from the recipient PCD to the voice communication server of the recipient domain over the local area communication network within the recipient domain;

receiving said encoded voice communication signals by the voice communication server of the recipient domain and forwarding said voice communications signals to the voice communication server of the sender domain over the Internet;

receiving said encoded voice communication signals by the voice communication server of the sender domain and forwarding said encoded voice communications signals to the sender PCD within the sender domain over the local area communication network of the sender domain;

receiving said encoded voice communication signals from the voice communication server of the sender domain by the sender PCD; and processing said received encoded voice communication signals to restore the original voice communications signals of the recipient user provided verbally, and outputting said original voice communications signals of the recipient user to the sender user by the sender PCD in a sound form.

34. The method of claim 29, wherein the dispatching of the cross-domain voice message from the sender PCD of the sender domain and said at least one recipient PCD of the recipient domain, includes:

> searching, by the voice communication server of the sender domain in the list of the user's contacts of the user data record associated with the sender user, for the phone number and/or the e-mail address of the recipient user; the searching is conducted by using the name of the recipient user as a search parameter, the name being provided by the corresponding voice command of the sender user;
>
> discovering, in the cross-domain coordinator, the user information stored in the user data record for the recipient user registered in the recipient domain by using the found phone number and/or the found e-mail address of the recipient user as the discovery parameters;
>
> acquiring a part of the recipient user information from said discovered user information, said part of the recipient user information being necessary for cross-domain dispatching a voice message; the part of the recipient user information including: the unique user ID of the recipient user, the unique domain ID of the recipient domain, and the current Internet address of the voice communication server of the recipient domain;
>
> generating an encoded audio feedback signal indicative of notification of a status of readiness for voice messaging for sender user by the voice communication server of the sender domain;
>
> transmitting said generated encoded audio feedback signal from the voice communication server of the sender domain to the sender PCD over the local area communication network of the sender domain;
>
> receiving said encoded audio feedback signal indicative of notification of the status of readiness for voice messaging by the sender PCD;
>
> processing said encoded audio feedback signal to decode said encoded audio feedback signal;
>
> outputting said audio feedback signal to the sender user in a sound form;
>
> receiving, by the sender PCD, an audio signals including user voice communication signal of the sender user provided verbally and corresponding to the voice message of the sender user;
>
> processing, by the sender PCD, said audio signals to generate a corresponding encoded voice communication signal carrying said voice message;
>
> transmitting the generated corresponding encoded voice communication signal from the sender PCD to the voice communication server of the sender domain over the local area communication network of the sender domain;
>
> receiving and buffering, by the voice communication server, the encoded voice communication signal carrying the voice message of the sender domain;
>
> generating a cross-domain communication control signal by the voice communication server of the sender domain in accordance with the cross-domain communication control protocol, the cross-domain communication control signal being indicative of a request for dispatching of the cross-domain voice message, said request including at least the unique user ID of the recipient user;
>
> transmitting the cross-domain communication control signal from the voice communication server of the sender domain to the voice communication server of the recipient domain over the Internet;
>
> receiving said cross-domain communication control signal by the voice communication server of the recipient domain, and processing said cross-domain communication control signal in accordance with the cross-domain communication control protocol to extract the request for dispatching of the cross-domain voice message;
>
> in response to said request for dispatching of the cross-domain voice message, checking, by the voice communication server of the recipient domain, that the corresponding recipient user is registered within the recipient domain, and
>
> if the recipient user is registered with the recipient domain:
>
>> generating a cross-domain communication control signal by the voice communication server of the recipient domain in accordance with the cross-domain communication control protocol, the cross-domain communication control signal being indicative of a presence of the recipient user in the recipient domain;
>>
>> transmitting the generated cross-domain communication control signal from the voice communication server of the recipient domain to the voice communication server of the sender domain over the Internet; and acquiring, by the voice communication server of the recipient domain, the user data record of recipient user and the device information of the recipient PCD associated with the recipient user of the recipient domain, the device information including the unique recipient device ID, and the current local IP address of the recipient PCD within the local area communication network of the recipient domain;
>
> receiving, by the voice communication server of the sender domain, said cross-domain communication control signal indicative of the presence of the recipient user, and processing said cross-domain communication control signal in accordance with the cross-domain communication control protocol to extract information about the presence of the recipient user in the recipient domain;
>
> in response to the extracted information about the presence of the recipient user in the recipient domain, forwarding the buffered encoded voice communication signal carrying the cross-domain voice message from the voice communication server of the sender domain to the voice communication server of the recipient domain over the Internet;
>
> receiving and buffering said encoded voice communication signal carrying the cross-domain voice message by the voice communication server of the recipient domain;
>
> generating the PCD control request signal by the voice communication server of the recipient domain in accordance with the PCD control protocol, the PCD control request signal being indicative of a request for cross-domain voice message dispatching;
>
> transmitting said generated PCD control request signal from the voice communication server of the recipient domain to the recipient PCD over the local area communication network within the recipient domain;
>
> receiving and processing the PCD control request signal, by the recipient PCD, and generating a PCD control feedback signal indicative of the status of readiness of the recipient PCD to receiving said cross-domain voice message;

transmitting said PCD control feedback signal to the voice communication server of the recipient domain by the recipient PCD, the PCD control feedback signal being indicative of the status readiness of the receiver PCD to receive said cross-domain voice message;

receiving, processing and analyzing, by the voice communication server of the recipient domain, of said PCD control feedback signal being indicative of the status of readiness of the receiver PCD to receive said cross-domain voice message;

if the recipient PCD is ready to receive said cross-domain voice message, forwarding said buffered encoded voice communication signal carrying the cross-domain voice message from the voice communication server of the recipient domain to the recipient PCD over the local area communication network within the recipient domain;

receiving, by the recipient PCD, said encoded voice communications signal carrying said cross-domain voice message from the voice communication server of the recipient domain;

processing said received encoded voice communications signal to decode said encoded voice communications signal and to restore the original voice message from the sender user; and outputting the restored original voice message to the recipient user in a sound form.

35. The method of claim 10, wherein the providing of the voice interaction between the sender user of the voice communication domain and said at least one external network entity, includes exchanging entity information signals between said sender PCD and said voice communication server of said voice communication domain and between said voice communication server and said external network entity, said entity information signals including at least entity coordination signals.

36. The method of claim 35, wherein said entity information signals further include the encoded voice communications signals carrying user voice communication.

* * * * *